US012717691B2

(12) United States Patent
Prakash et al.

(10) Patent No.: US 12,717,691 B2
(45) Date of Patent: Aug. 25, 2026

(54) PROCESS MAPPING AND MONITORING USING ARTIFICIAL INTELLIGENCE

(71) Applicant: AVEVA Software, LLC, Lake Forest, CA (US)

(72) Inventors: Ravi Kumar Herunde Prakash, Lake Forest, CA (US); Sudhir Gonugunta, Lake Forest, CA (US); Vinay Kamath, Lake Forest, CA (US); Sripraneeth Nara, Lake Forest, CA (US)

(73) Assignee: Aveva Software, LLC, Lake Forest, CA (US)

(*) Notice: Subject to any disclaimer, the term of this patent is extended or adjusted under 35 U.S.C. 154(b) by 17 days.

(21) Appl. No.: 18/418,713

(22) Filed: Jan. 22, 2024

(65) Prior Publication Data

US 2024/0160550 A1 May 16, 2024

Related U.S. Application Data

(63) Continuation of application No. 16/791,423, filed on Feb. 14, 2020, now abandoned.

(Continued)

(51) Int. Cl.
*G06F 11/00* (2006.01)
*G06F 11/07* (2006.01)
(Continued)

(52) U.S. Cl.
CPC .......... *G06F 11/327* (2013.01); *G06F 11/076* (2013.01); *G06F 11/079* (2013.01);
(Continued)

(58) Field of Classification Search
CPC .... G06F 11/076; G06F 11/079; G06F 11/327; G06F 11/3409; G06F 11/3452; G06N 20/00
See application file for complete search history.

(56) References Cited

U.S. PATENT DOCUMENTS 6,535,122 B1 3/2003 Bristol et al.
7,047,114 B1 5/2006 Rogers
(Continued)

FOREIGN PATENT DOCUMENTS

EP 3001317 A 3/2016
EP 3001317 A1 * 3/2016 ............ G06F 11/079
(Continued)

OTHER PUBLICATIONS

International Search Report and Written Opinion from International Patent Application No. PCT/US2020/018289, mailed Jun. 9, 2020.

*Primary Examiner* — Elmira Mehrmanesh

(74) *Attorney, Agent, or Firm* — Dergosits & Noah LLP; Todd A. Noah

(57) ABSTRACT

The disclosure describes a system for the advanced delivery of information. In some embodiments, the system creates a display in response to an alarm. In some embodiments, the information on the display is a function of attribute mapping and/or analysis performed by the system. The system uses one or more of manual links, statistical analysis, correlations, maintenance data, and/or historical data as tools during determination of what to display according to some embodiments. In some embodiments, the system uses one or more of these tools in conjunction with one or more of process simulators, artificial intelligence, machine learning, and/or real process feedback in the analysis to determine what to display to a user during an emergency and/or an anomalous event.

19 Claims, 42 Drawing Sheets

Related U.S. Application Data

(60) Provisional application No. 62/806,572, filed on Feb. 15, 2019.

(51) Int. Cl.
*G06F 11/32* (2006.01)
*G06F 11/34* (2006.01)
*G06N 20/00* (2019.01)

(52) U.S. Cl.
CPC ...... *G06F 11/3409* (2013.01); *G06F 11/3452* (2013.01); *G06N 20/00* (2019.01)

(56) References Cited

U.S. PATENT DOCUMENTS

| | | | |
|---|---|---|---|
| 7,233,781 | B2 | 6/2007 | Hunter et al. |
| 7,612,661 | B1 | 11/2009 | Johnson et al. |
| 7,783,744 | B2 | 8/2010 | Garg et al. |
| 8,639,729 | B2 | 1/2014 | Patil |
| 8,743,121 | B2 | 6/2014 | De Peuter |
| 9,009,185 | B2 | 4/2015 | Bakalov |
| 9,497,072 | B2 * | 11/2016 | Gates .................. H04L 41/0631 |
| 10,642,719 | B1 | 5/2020 | Balasubramanian et al. |
| 10,728,126 | B2 | 7/2020 | Wu et al. |
| 2006/0242288 | A1 | 10/2006 | Masurkar |
| 2007/0150581 | A1 | 6/2007 | Banerjee et al. |
| 2007/0266151 | A1 | 11/2007 | Friedland et al. |
| 2009/0070744 | A1 | 3/2009 | Taylor et al. |
| 2013/0024835 | A1 | 1/2013 | Stein et al. |
| 2013/0067365 | A1 | 3/2013 | Shrufi et al. |
| 2014/0005979 | A1 | 1/2014 | Rao et al. |
| 2014/0244325 | A1 | 8/2014 | Cartwright et al. |
| 2015/0097681 | A1 | 4/2015 | Fadell et al. |
| 2015/0280968 | A1 | 10/2015 | Gates et al. |
| 2016/0098018 | A1 | 4/2016 | Van Camp |
| 2016/0300475 | A1 * | 10/2016 | Childs ................ G05B 23/0278 |
| 2016/0378583 | A1 | 12/2016 | Nakano et al. |
| 2017/0168993 | A1 | 6/2017 | Prakash et al. |
| 2018/0088565 | A1 | 3/2018 | Joshi et al. |
| 2018/0276266 | A1 | 9/2018 | Diwakar et al. |
| 2019/0102469 | A1 * | 4/2019 | Makovsky .......... G06F 11/0781 |
| 2019/0258557 | A1 | 8/2019 | Mazzitelli et al. |
| 2020/0104402 | A1 | 4/2020 | Burnett et al. |
| 2020/0327029 | A1 * | 10/2020 | Prakash ................... G06N 5/04 |

FOREIGN PATENT DOCUMENTS

| | | | |
|---|---|---|---|
| KR | 10-2014-0051568 | A | 5/2014 |
| KR | 10-2018-0058063 | A | 5/2018 |

* cited by examiner

| Tag Name | Description | min-max EU | Historian | Real time | Ignore values outside defined EU |
|---|---|---|---|---|---|
| CRK2Extruder. Cooling_Zone_1 | Cooling water to zone 1 | on/off | localHisori | MX | ☑ |
| CRK2Extruder. ExtruderPressure | Gear box (pressure in the extruder ) | 200-380 PPI | localHistori | MX | ☐ |
| CRK2Extruder. ExtruderTotalFlow | Total ingredient extruder (water +powder) | 0-20 kgs/minute | localHistori | MX | ☑ |
| CRK2Extruder. ExtruderWaterFlow_1 | amount of water being injected into the extruder | 0-5 gallons/minu | cloudHistor | MX | ☑ |

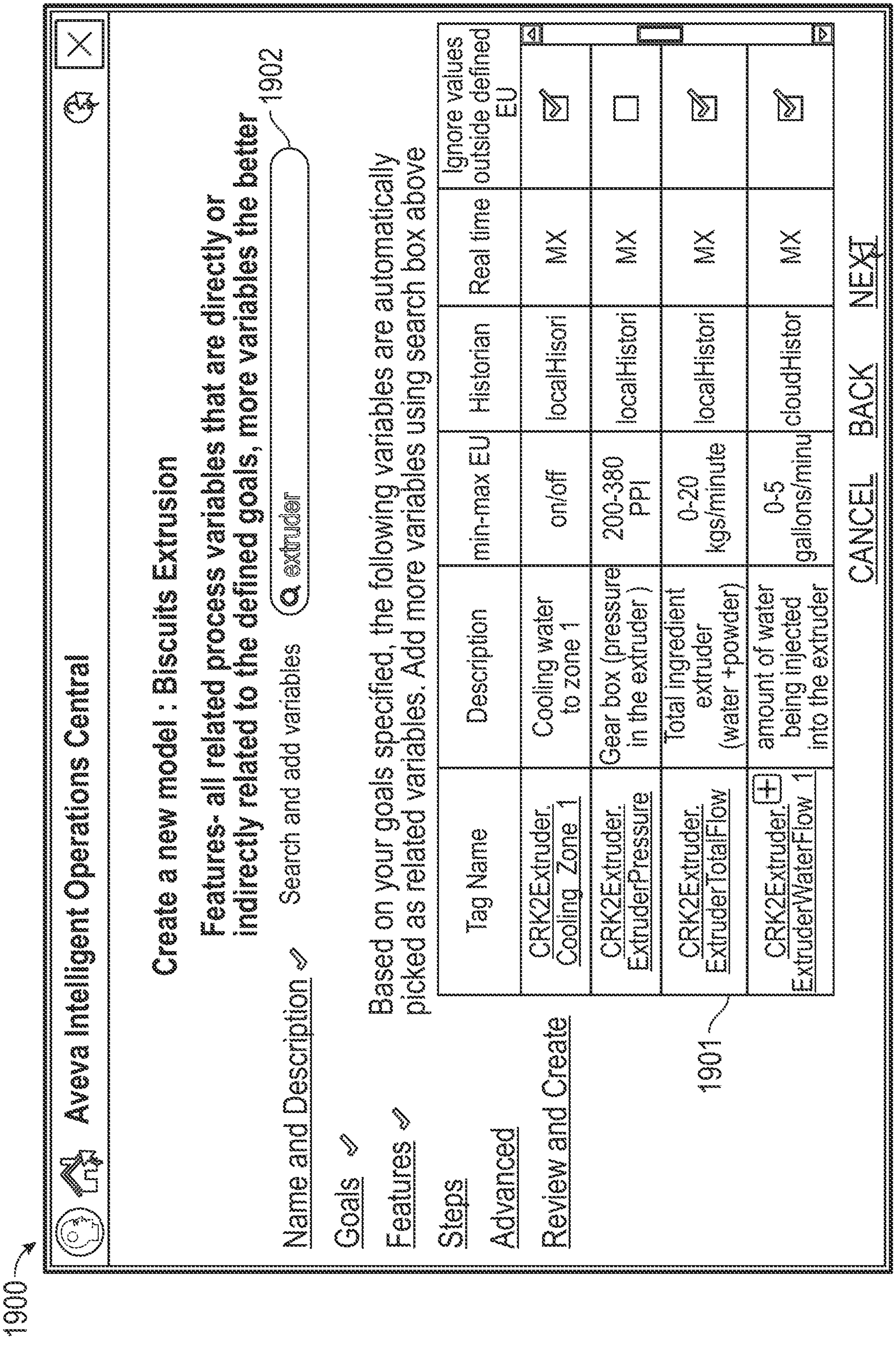

FIG. 19

PROCESS MAPPING AND MONITORING USING ARTIFICIAL INTELLIGENCE

CROSS-REFERENCE TO RELATED APPLICATIONS

This application is a continuation of U.S. application Ser. No. 16/791,423, filed Feb. 14, 2020, which claims the benefit of U.S. Application and priority to U.S. Provisional Application No. 62/806,572, filed Feb. 15, 2019, entitled "System and Server for Asset Search-Based Visualization of Alarms with Dynamic Grouping", the entire contents of both which are incorporated herein by reference.

BACKGROUND

During times of emergency, quick action is difference between a near miss and a catastrophe. Often times, alarms can come in seemingly all at once, and in an unrelated fashion. Prioritizing those alarms can be a time-consuming task; the time spent on sorting and displaying alarm data in a coherent fashion can be the difference between success and failure.

In addition, some alarms only occur at remote locations are do not have a direct connection to an integrated monitoring system. In addition, some alarms are manually triggered by human intervention. A current problem in industry is missed abnormal situations or product review due to distractions.

The current state of the prior art is one where a user is responsible for building displays to provide reports on one or more assets. Asset information for the report can include industrial system assets such as sensors and quality assurance measurement equipment, but can also include any other parameter that can be reported in a visualized form, such as market trends or traffic patterns. Prior art report visualizations are not adaptable to different display types. Viewing the same information designed for a screen on a cell phone, for example, results in the graphs becoming too small to be intelligible.

The prior art also requires that all links between the asset information used in reports be performed manually. For example, in the prior art a graph representing correlation between two attributes of the same or different assets needs to be manually created, saved, and selected for display. A typical correlation graph in the prior art is obtained by manually selecting two sets of raw data, and then plotting each on a different axis to visually determine if there is relationship (i.e., inspect the display to determine if there is a slope change in a fitted line). If in the case of an emergency the correlation graph does not exist, precious time must be taken in order to create the graph. Even if the graph does exist, it is most likely stored in a folder that is specific to the user, and a search for the graph, or a report including the graph, can be a fruitless undertaking, resulting in more wasted time. In the case of industries such as semiconductors, for example, a single hour wasted can result in millions of dollars in lost production capability.

The prior art uses alarms to alert personnel when one or more asset parameters exceed an alarm limit. These alarms are usually generated from a monitoring a system in the form of flashing text, sometimes accompanied by the setpoint and exceeded value. In the prior art, a user must then log onto a computer, load the monitoring system, and then manually pull the "tags" associated with each alarm. These tags are then loaded into the manually configured graphs and/or reports for visual analysis. Statistical analysis requires a manual setup of more graphs and reports. In the case of an alarm for a measurement tool, there could be numerous different types of equipment (e.g., shredders, conveyors, ovens, robotics) between measurement nodes. In the prior art, a user must determine what equipment is between the nodes, which attributes to graph, and try to determine what the root cause for the anomaly and what actions to take in response.

Therefore, there is a need for a system that automatically monitors production environments and generates a display with items generated from relevant information from enormous amounts of asset data (e.g., tags) stored on a database, such that timely action can be taken to prevent the loss of profit.

SUMMARY

Some embodiments disclosed herein include a system for improving the delivery of emergency information. In some embodiments, a computer processor reads instructions stored on a non-transitory processor readable medium (i.e., computer code stored on computer memory). In some embodiments, the instructions are configured and arranged to read asset data from a database. In some embodiments, assets can include industrial system assets such as sensors and quality assurance measurement equipment. In some embodiments, asset data can also include any other asset parameter that can be reported using a picture, graph, table, and/or link form: monitors for market trends or traffic patterns are non-limiting examples of such assets. In some embodiments, asset data is a digital representation of an analog or digital signal received from and asset. In some embodiments, one or more control limits and/or spec limits are associated with a parameter of the asset data. In some embodiments, the parameter of the asset data is a sensor "tag" that has delivered sensor data to the system for storage in the database. In some embodiments, the database is a local database located on-site; in some embodiments, the database is a historian database that also includes the processor and non-transitory computer readable medium. In some embodiments, the system generates an alarm when one or more control limits and/or spec limit are exceeded.

In some embodiments, aspects of the system include a novel way of presenting relevant information associated with an alarm. In some embodiments, the system is configured and arranged to read asset data from a database; compare the asset data to one or more alarm limits; display alarm information when a primary asset's parameter exceeds the one or more alarm limits; and determine secondary information to display in conjunction with the alarm.

In some embodiments, reading asset data includes reading the asset data from not only the alarming asset's tag, but tags associated with the asset. In some embodiments, the system comprises instructions to perform large scale statistical analysis on some or all tag data to determine relationships between one or more assets (i.e., if the inputs/outputs of an asset are dependent on the input/output of another asset). In some embodiments, the system uses an assets attributes to perform the statistical analysis.

In some embodiments, attributes of an asset can include an asset's measurement parameters (i.e., tags) such as time, temperature, pressure, power, amps, voltage, flowrate, and/or any measurement that can be delivered visually or through an electrical signal. In some embodiments, an asset's attributes can include color, texture, age, material location, size, shape, mass, density, failure specifications, or any other physical characteristic of an asset. In some embodiments, an asset's attributes can be the effect an input/output of the asset has on an upstream and/or downstream asset and/or process. In some embodiments, any or all of an asset's attributes are used in the system's statistical and/or presentation analysis. In some embodiments, the system uses an attribute map that includes one or more links between a primary asset and a secondary asset to determine which attributes should be included in the analysis, prediction, and/or information to display. In some embodiments, the attribute map is used by the system to determine the information to display in conjunction with an alarm.

In some embodiments, the statistical analysis can be performed by the system on-demand, continuously, intermittently, and/or some combination thereof. In some embodiments, statistical analysis is performed by the selection of one or more inputs on a graphical user interface (GUI). In some embodiments, when a user chooses a link and/or breadcrumb, statistical analysis is performed for a particular asset and/or a hierarchy of assets. In some embodiments, the system executes conventional known statistical analysis techniques and/or algorithms. In some embodiments, the system executes proprietary statistical analysis techniques and/or algorithms. In some embodiments, the system automatically generates one or more displays including graphs, charts, tables, reports, root cause analysis, suggested action items, and/or countermeasures. As used herein, a reference to a system generated item and/or information for display is also a reference to an icon, breadcrumb, and/or link that leads to a different display comprising the item and/or information; generates that item and/or information on the current display; expands, highlights, and/or jumps to a portion of the display with the item and/or information.

In some embodiments, the system uses identified asset attribute dependencies to identify inputs to the process that may be the root cause of the alarm. For example, in some embodiments, multiple alarms are received from different areas of a plant: in response the system performs a root cause analysis and determines that that parameter that has alarmed at a downstream asset step is correlated to an equipment parameter that the system has determined causes a product defect (i.e., an upstream equipment and/or setpoint problem caused a defective output that is now the input to the downstream step, causing an equipment malfunction resulting in an alarm). A display according to some embodiments presented herein is generated with relevant alarm information. In some embodiments, precious time is saved by the system prioritizing the alarms for display in the order that they need to be addressed. In some embodiments, precious time is saved by the system automatically providing one or more of: a report that explains why the alarm(s) have occurred; evidence and historical data (i.e., past actions taken for similar events) to support the conclusion; a list of action items for how to most efficiently address the problem; historical asset data displayed as a graph (e.g., bar, pie, pareto) and/or report; and/or maintenance reports.

In some embodiments the system includes a cloud based or cloud/on-site hybrid historian system, collectively referred to herein as a historian and/or a historian database. In some embodiments, the use of a historian allows for the centralization of asset and/or process data obtained from multiple locations (e.g., industrial plants, fleet vehicles, business servers, and/or any source of data). In some embodiments, centralization allows for the system to perform one or more analyses discussed above and/or throughout this disclosure using data from some and/or all of the multiple locations. In some embodiments, this improves system accuracy by providing a larger dataset for analysis. In some embodiments, a larger dataset improves the accuracy of proprietary and/or conventional artificial intelligence, machine learning, and/or deep learning algorithms (collectively referred to herein as AI) that is used in conjunction with the statistical analysis and relevant information determination as described above.

In some embodiments, AI is used in one, some, or all analysis and/or embodiments presented in this disclosure. In some embodiments, AI is used to determine the most relevant items to display, and/or the type of display used to convey the information (e.g., a chart, graph, report, link, etc.). In some embodiments, algorithms that do not comprise AI executes one or more actions described herein. In some embodiments, the system uses processor readable instructions stored on memory that when read by a processor implement one or more aspects of the system. Throughout this disclosure the use of the phrases that include "the system," "the system determines," "the system determines," "the system executes," "the system generates," "the system displays," "the system compares" and/or similar language, includes the use of AI and/or non-AI algorithms in execution of the action and/or step performed by "the system."

In some embodiments, the system can automatically process and display items and/or information specific to a user. In some embodiments, the system identifies the specific user by login identification, facial recognition, maintenance records, approvals, and/or any stored data linking a user to a particular role in an organization. In some embodiments, each specific user receives a tailored alarm display based on his/her role in the organization. In some embodiments, the system uses AI in conjunction with stored data to determine relevant items/information to display based on an individual's role. In some embodiments, the system uses an algorithm that does not include AI to execute an analysis on stored data to determine relevant items/information to display based on an individual's role. For example, in some embodiments specific users can include a manager, a process engineer, and an equipment technician. In some embodiments, the process engineer receives an alarm list that comprises product measurements, a technician receives alarms that relate to equipment sensors, and the manager receives an alarm list that includes both product measurements and sensor data: those of ordinary skill would recognize that any combination of items/information can be conveyed as desired.

In some embodiments, the system determines the content and/or format for the display. In some embodiments, a "display" as used herein is defined as an electronic display configured to present a visual representation of information. For example, in some embodiments, the system reads asset data from one or more databases. The system then compares the asset data to one or more alarm limits In some embodiments, the comparison is done regularly and the results stored in the database. When a primary asset's parameter exceeds the one or more alarm limits, an alarm is generated according to some embodiments. As a result, in some embodiments, the system determines information to display in conjunction with a visual representation of the alarm. As described above, the system executes various algorithms and analysis to determine the best information content to display for a particular alarm and/or user.

For example, if a robot alarms because it's sensors do not detect the presence of an expected object, information about an exit counter sensor from a previous processing step may be included with the alarm display according to some embodiments. When, during analysis, the system determines the exit counter accounted for the missing object, the system determines that the missing object must have been lost somewhere between the two processing steps. In some embodiments, the system can review maintenance history and determine that this error is common with several root causes, such as a broken conveyor belt, a malfunctioning actuator, and/or some operator error. In some embodiments, these each of these root causes may have occurred and been recorded in the system and/or fed to the system at different facilities spread across different states. In some embodiments, the system collects action items and/or standard operating procedures that are needed to fix the issue. In some embodiments, the system displays one or more of the alarm, the root cause list (several in this case), and a link to the action items and/or standard operating procedures. As evident from this non-limiting example, massive amounts of precious production time can be saved, as even someone unfamiliar with the process could implement and/or start the implementation of the solution.

In some embodiments, the system selects the information (primary information, secondary information, etc.) to display based on one or more attributes of the primary asset (e.g., time, temperature, pressure, power, amps, voltage, flowrate, etc.). In some embodiments, the information. For example, as is known in the art, pressure and temperature share a direct relationship. Therefore, when a pressure alarm occurs, the system automatically provides the user with both a temperature and pressure time series chart (of course, other types of information displays are possible) according to some embodiments. In some embodiments, if the system determines that the alarm is often caused by a faulty sensor that delivers a power spike at failure, the system can automatically include that information in the form of a sensor line graph and/or in the root cause analysis, as a non-limiting example.

In some embodiments, the system comprises a process model simulator. In some embodiments, the simulator optimizes 2D and/or 3D model component performance. In some embodiments, the simulator improves 2D and/or 3D model design, and offers operational analysis and/or performing engineering studies. For example, in some embodiments, the simulator is designed to perform rigorous heat and material balance calculations for a wide range of processes.

In some embodiments, AI is trained using simulator data, production data, and/or a combination of simulator data and/or production data. For example, during simulation of abnormal conditions (e.g., during training and/or new facility planning), the system uses the simulated trends to train the AI model for prediction purposes according to some embodiments. In some embodiments, the system AI is trained on which process parameters correlated to each other by randomizing simulator values and performing analysis on the result (e.g., regression analysis). In some embodiments, system analysis performed in simulation is feed to an AI training model to improve the model's accuracy. In some embodiments, this novel use of a simulator to "pre-train" an AI model allows the system to predict trend conditions never actually recorded in a real system. In some embodiments steps labeled in continuous simulated trends are feed to the AI during training so that those steps can be excluded from the model and/or used in a different model and/or analysis.

In some embodiments, the system allows the user to do one or more of the following: design new processes; evaluate alternate model configurations; modernize or revamp existing models; assess and document compliance within environmental regulations; troubleshoot and debottleneck plant processes; monitor, optimize, and/or improve plant yields and/or profitability; all of which are non-limiting examples of the system's capability. In some embodiments, the system uses the simulator to predict the effects of an alarm on one or more parts of a process. In some embodiments, the prediction is done at the time of the alarm. In some embodiments, the prediction is done during or after an alarm has occurred. In some embodiments, the system uses the simulator to establish correlation links between asset attributes. In some embodiments, the correlation links created during simulations are used to create an attribute map. In some embodiments, simulations are used to create importance rankings used to determine information to display to a user. In some embodiments, simulations are run manually. In some embodiments, simulations are run by system algorithms continuously, intermittently, and/or in response to alarms. In some embodiments, simulations are run by system AI continuously, intermittently, and/or in response to alarms. In some embodiments, actual response data is used by the system to improve prediction modeling.

In some embodiments, the system comprises capability for add-on modules. In some embodiments, add-on modules comprise modules designed to be integrated into the system. In some embodiments, the system includes application programming interfaces (i.e., APis) that work together with third-party software and/or system software. In some embodiments, in some embodiments, the system includes one or more programming applications (APPs), such as conventional and/or proprietary AI APPs, for example. In some embodiments, third-party software comprises licensable add-ons. In some embodiments, add-on modules extend the functionality of the system in various ways.

In some embodiments, the system comprises operation training In some embodiments, a copy of the entire model can run a process using the simulator. In some embodiments, process changes can be made in the simulation without affecting the real process model. In some embodiments, the system can be used for one or more of the following: train operators on the user interface, run drills, provide training for new equipment and/or system upgrades, and/or any other type of training need. In some embodiments, training simulation models can be integrated into the system as the actual control interface for a factory process. In some embodiments, personnel are trained on AI monitoring predictions using the simulator.

In some embodiments, the system displays new information and/or reconfigures information when a user changes displays. In some embodiments, the information and/or format of the display is customized by the system for a display's screen size. For example, in some embodiments, if a user pulls up a display comprising alarm information on a first display, a first information format is used to display the information. If the alarm information is pulled up on a second display, a second information format is used to display the same information according to some embodiments. In some embodiments, the different format is due to the second display having a visualization area that is different from the first display. In addition, in some embodiments, there can be more or less information presented to a user on the second display, based on the available visualization area as determined by the system. For example, if a user is viewing alarm data from a piece of equipment on a portable computer, such as a cell phone, for example, then the user may see one or more equipment control charts with the alarm points highlighted, a list of alarms, and breadcrumbs at the top of the browser that leads to a hierarchy of equipment and/or shows a link to previously viewed items.

When the user accesses the same alarm data from a larger monitor, such as a desktop monitor or television screen, the same information that was presented on the portable computer is shown, and additionally, a process flow diagram can be displayed, where each item in the process flow has countermeasure links that comprise instruction for how to fix the alarm and fix the root cause.

In some embodiments, if a user is viewing the information in a window (e.g., a browser window) and that window is resized, the system automatically determines how to display the information initially provided. In some embodiments, the determination includes which section to keep on the display and which section to hide upon a resizing of the display. In some embodiments, the determination is based at least in part on an analysis performed by the system. In some embodiments, the determination is based at least in part on an importance ranking In some embodiments, the importance ranking is obtained through system analysis. In some embodiments, the importance ranking is created manually for one or more assets. In some embodiments, the importance ranking is based on one or more of: production flow impact, historical data, maintenance data, simulation data, AI training, or any other data source available to the system. In some embodiments, the importance ranking is different for different assets. In some embodiments, the importance ranking can cause different information to be hidden for a primary asset than is hidden for a secondary asset upon a display and/or window resizing. In some embodiments, a new set of information (e.g., one or more new headers, graphs, charts, time control, breadcrumbs, etc.) is displayed upon a resizing of a window and/or display.

In some embodiments one or more items on the display can be annotated and/or marked with a comment. In some embodiments, the alarm view page is divided into a plurality of windows or sections including one or more processes and/or alarms related to one or more industrial process systems. In some embodiments, one or more sections and/or columns can be hidden based one or more priorities as a displayed resolution reduces and width available for the visualization on the at least one user display is reduced. In some embodiments, a grouping of alarms of the alarm related information to be correlated to individual alarms based on one or more automatically assigned markers, the markers including a manual and/or system determined link In some embodiments, AI is used to mark trends, as further discussed below.

In some embodiments, the alarm view page includes a header section, and/or breadcrumb section, and/or chart area section, and/or grid area section, and/or a time control section. Some embodiments further comprise program logic executed by the at least one processor that enables a display on the at least one user display of asset hierarchy within the breadcrumbs section. In some embodiments, each asset in the asset hierarchy is separated by a conventional character, graphic, token, and/or symbol.

Some embodiments further comprise program logic executed by the at least one processor that enables a user to interact with the at least one user display to show one or more asset children under a selected asset, where upon selecting a child asset, the breadcrumbs section is updated with a new asset hierarchy, and/or the chart area section is updated, and/or the grid area section is updated. Some embodiments further comprise a program logic (i.e., processor readable instructions) executed by the at least one processor that enables a further analysis of the alarm related information through single or multiple filters of groups of alarms to automatically provide a view of multiple alarms groups, and/or detailed alarm records of a set of one or more groups of alarms.

Some embodiments further comprise program logic executed by the at least one processor that enables a display on the at least one user display of one or more sections and/or columns of a grid with one or more sections and/or columns comprising one or more of a “time,” “severity,” “duration,” “condition,” “in alarm or not,” “sparkline,” “status,” “tag,” “object,” “area,” “value,” “limit,” and/or “unacknowledged.”

Some embodiments of the invention are related to training AI for production monitoring. In some embodiments, the system AI can be trained to recognize trend abnormalities. In some embodiments, the AI can be trained to project an event with a certain amount of certainty. In some embodiments, AI can be trained to recognize patterns in continuous trend data and label those patterns as steps. In some embodiments, AI can be trained to recognize visual defects using images and/or video feeds. In some embodiments, once an AI model is trained, the AI can raise alarms and feed relevant information to the system so that the most relevant alarm information is displayed.

DRAWINGS DESCRIPTION

FIG. 19 shows a features page according to some embodiments.

DETAILED DESCRIPTION

Figure 1:
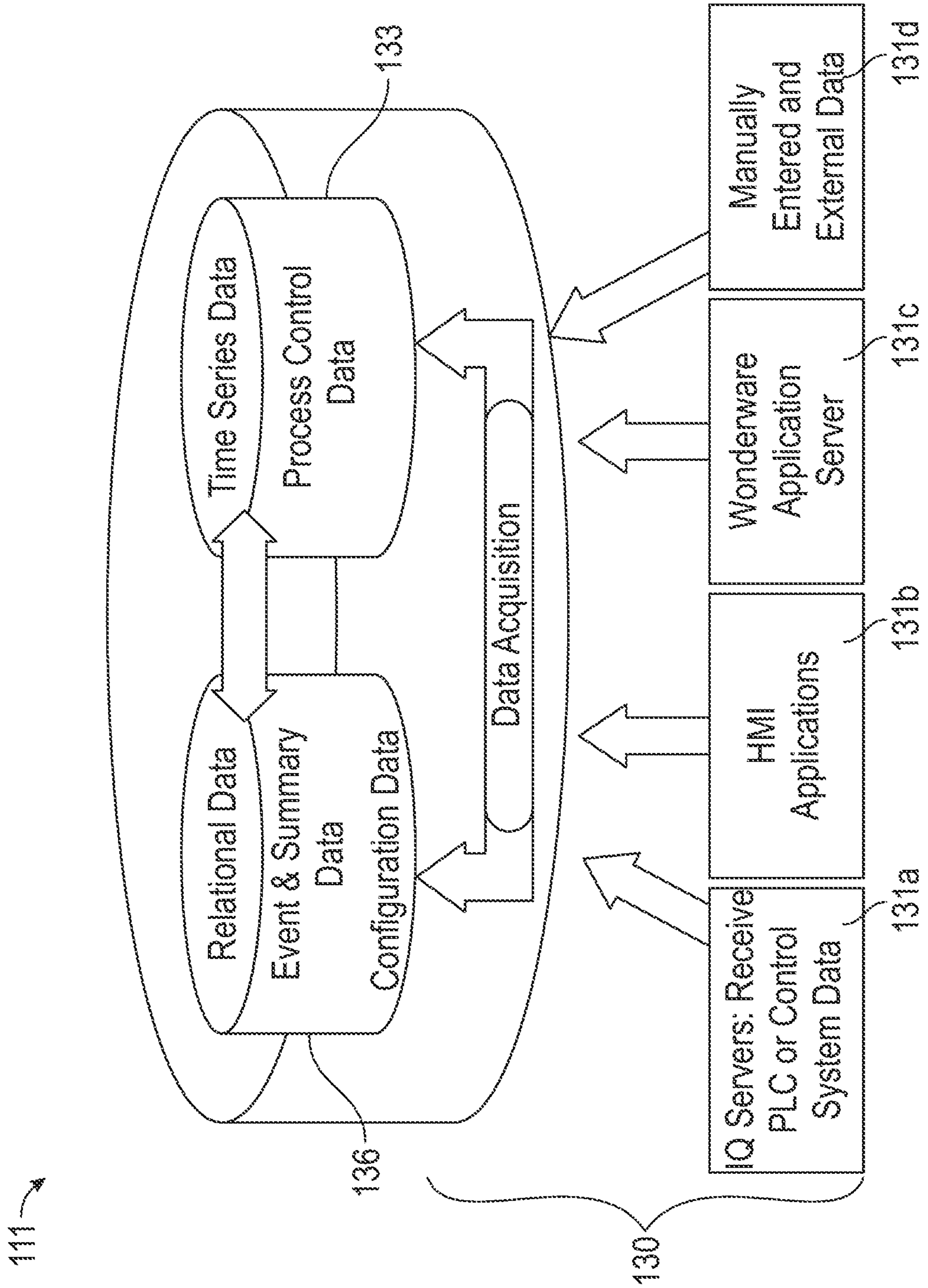
FIG. 1 depicts a non-limiting example historian comprising a computer system for securely providing and obtaining configuration data according to some embodiments.

FIG. 1 depicts a non-limiting example historian 111 comprising a computer system for securely providing and obtaining configuration data according to some embodiments. In some embodiments, an operational historian can store (e.g., "historize") various types of data related to an industrial process. Some example data can include, but is not limited to, time-series data, metadata, event data, configuration data, raw time-series binary data, tag metadata, diagnostic log data, and the like. An operational historian can also be adapted to record trends and historical information about the industrial process for future reference. An operational historian can analyze process related data stored in an operational historian database and transform that data into timely reports that are communicated to one or more user displays. In this manner, an operational historian can filter (e.g., curate) data to raise the visibility of the data to users (e.g., via user displays) without overwhelming them and/or overburdening communications networks.

In some embodiments, the historian I11 can include a time-series database 133 and a relational database 136. In at least one embodiment, the time-series database 133 and the relational database 136 can each derive data from various sources during data acquisition 130, including, but not limited to, one or more servers 131*a*, one or more human-machine-interface (HMI) applications 131*b*, at least one application server 131*c*, and/or manually entered and/or external data 131*d*. In some embodiments, time-series data can be provided in part by process control data stored in the time-series database 133, where the time-series data can be representative of historical plant or facility process information such as, for example, a continuum of process flow values measured over a period of time. In some embodiments, configuration data can, at least in part, be provided by the relational database 136, such as, configuration settings for a cloud service and associated storage capability utilized by the historian 111.

Figure 2:
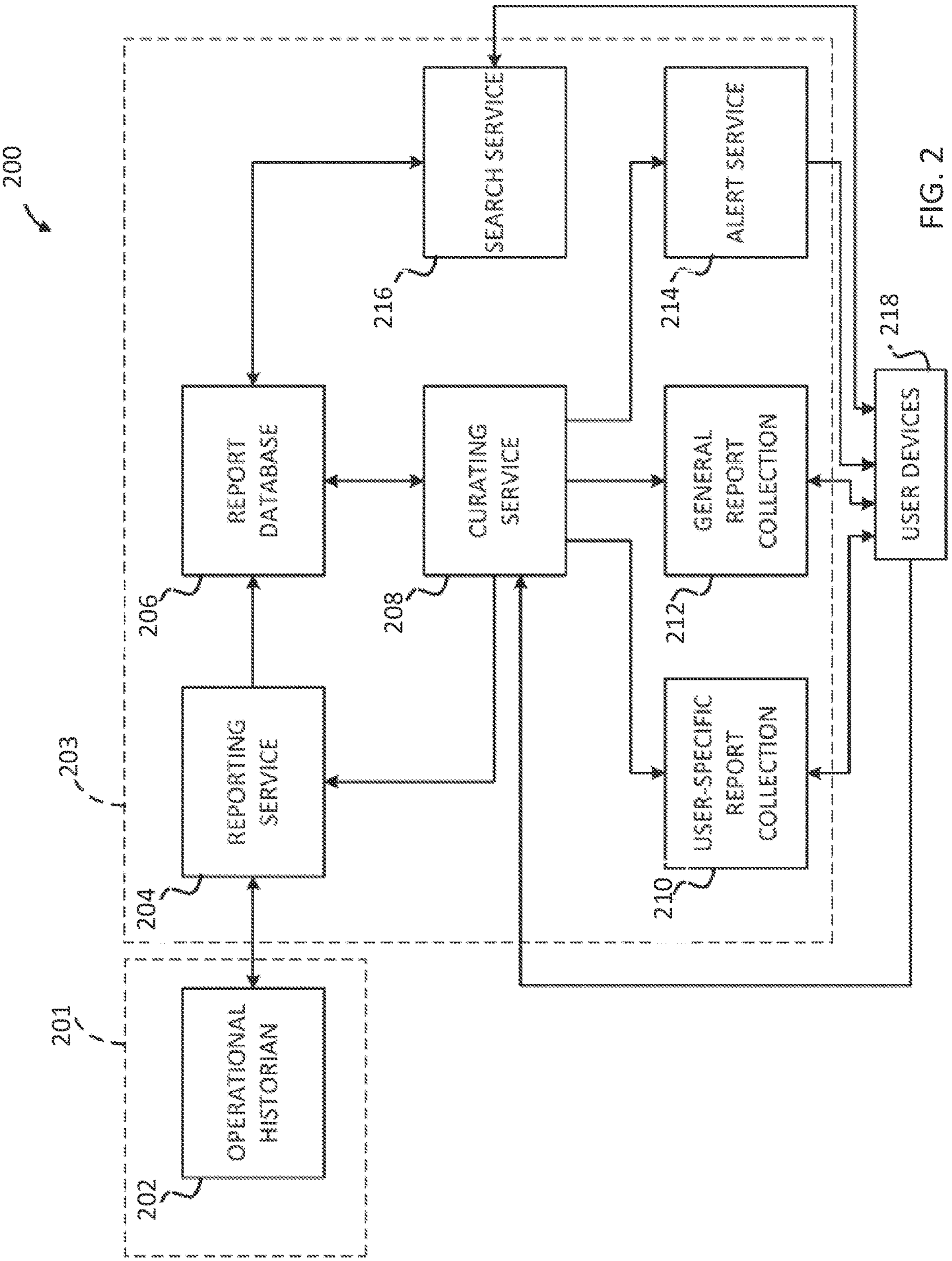
FIG. 2 illustrates a non-limiting example of an operational historian data pattern detection and communication services system according to some embodiments.

FIG. 2 illustrates a non-limiting example of an operational historian data pattern detection and communication services system according to some embodiments. In some embodiments, the system 200 can analyze data stored in at least one operational historian and transform that data into timely reports that are communicated to one or more user displays. In this manner, aspects of the system 200 can filter (e.g., curate) the data to raise the visibility of the data to users (e.g., via the user displays) without overwhelming them and/or overburdening communications networks. In some embodiments, the system 200 can include an operational historian 202 (e.g., comprising historian I11 of FIG. 1), and/or a reporting service 204, and/or a report database 206, and/or a curating service 208, and/or a user-specific report collection 210, and/or a general report collection 212, and/or an alert service 214, and/or a search service 216. In at least one embodiment, system 200 can generate one or more data reports or summaries for users based on data provided by an operational historian 202 and/or other providers. In some embodiments, historian 202 can comprise processor-executable instructions embodied on a storage memory (e.g., as part of a computer server) to provide the operational historian 202 via a software environment. An exemplary operational historian 202 includes Wonderware® Historian and Wonderware® Online provided by AVEVA Group plc and its affiliates, which also own the trademarks associated with such products.

In some embodiments, the operational historian 202 can be adapted to store (e.g., "historize") various types of data related to an industrial process. In some embodiments, the data includes, but is not limited to, time-series data, metadata, event data, configuration data, raw time-series binary data, tag metadata, diagnostic log data, and the like. In some embodiments, the operational historian 202 can be adapted to record trends and historical information about one or more industrial processes for future reference. For example, in some embodiments, the operational historian 202 can store data about various aspects of a facility process such as, but not limited to, an industrial process, in quantities that humans cannot interpret or analyze. For example, an operational historian may receive two million or more data values (e.g., tags relating to process control components, process variables, etc.) every second.

In some embodiments, the reporting service 204 can be adapted to retrieve data from operational historian 202, detect patterns in the retrieved data, generate reports that include information about the detected patterns, and store the generated reports in the report repository, such as a database 206. In some embodiments, reporting service 204 comprises processor-executable instructions embodied on a storage memory to provide reporting service 204 via a software environment and communications network. For example, in some embodiments, the reporting service 204 may be provided as processor-executable instructions that comprise a procedure, a function, a routine, a method, and/or a subprogram utilized independently or in conjunction with additional aspects of system 200 by computer 203 according to some embodiments of the disclosure. Further details of reporting service 204 are provided herein.

In some embodiments, the computer 203 can be adapted to provide the reporting service 204, report database 206 (or an interface to a computer-readable storage medium storing report database 206), curating service 208, user-specific report collection 210, general report collection 212, alert service 214, and search service 216, as further described herein. In some embodiments, the report database 206 can be adapted to store reports generated by reporting service 204 as an organized collection of data, as further described herein. In some embodiments, the user displays 218 can be adapted to receive from and transmit data to a user-specific report collection 210, and/or a general report collection 212, and/or an alert service 214, and/or search service 216, as further described herein. For example, in some embodiments, the reporting service 204 can be adapted to retrieve data from operational historian 202 by transmitting a query to operational historian 202, which operational historian 202 receives and uses to select stored data that matches the query. In some embodiments, the operational historian 202 can then transmit the selected data to reporting service 204. In some embodiments, the reporting service 204 can retrieve data continuously or at intervals. In some embodiments, the reporting service 204 can retrieve and/or receive data from additional sources, including reporting applications 206 (e.g., via an Application Programming Interface (API) of reporting service 204), built-in reporting services 208 (e.g., Wonderware® Online built-in reporters), application specific reporting services based on a client application configuration, and/or a "Human Machine Interface" (HMI), and/or any other conventional reporting service.

In some embodiments, the reporting service 204 can be adapted to analyze the data using algorithms and/or AI to detect certain patterns (e.g., "pattern of interest") and/or non-conformities in the data for reporting and/or for triggering an alarm. For example, some algorithms include statistical algorithms, machine learning AI algorithms, rules-based algorithms, and the like, and upon the system detecting certain patterns, reporting service 204 can generate a report about these detected patterns according to some embodiments. In some embodiments, a report includes text, graphics (e.g., graphs, images, etc.), and/or metadata, and/or one or more alarms or alarm data. In some embodiments, the reports may include the information about the detected patterns in a format that is amenable to the curating service 208 and/or a format that is human-understandable when displayed via a display and/or an HMI. In some embodiments, a reporting service 204 can transform the data from a format that is unintelligible to curating service 208 and humans into a format that is intelligible to curating service 208 and humans when displayed via user devices (e.g., displays, screens, projectors, augmented reality glasses, headsets, and/or anything capable of presenting information visually) 218. Further, in some embodiments, after generating the reports, the reporting service 204 can transmit the reports to the report database 206 for storage.

In some embodiments, the report database 206 can be adapted to store reports as an organized collection of data. In some embodiments, report database 206 can store the reports in a central location for access by various systems and displays. In some embodiments, system 200 includes a plurality of reporting services 204 that are each able to retrieve data from operational historian 202, detect patterns in the data, generate reports, and store the reports in report database 206. In some embodiments that utilize a plurality of reporting services, each reporting service may operate independently or the collective operating services may operate in parallel on portions of a larger reporting task. In some embodiments, reports in database 206 can be available for accessing via the search service 216, and/or from a user-specific report collection 210, and/or general report collection 212, and/or a report can be transmitted in real-time in the form of an alert to one or more user displays 218 via an alert service 214. In some embodiments, the user displays 218 can be embodied as mobile displays with a mobile application ("app"). For example, aspects of the disclosure may be installed via app stores and aspects may be optimized for touchscreen according to some embodiments. In some embodiments, aspects of the disclosure may be browser-based, and can comprise data components including charts, trends, grids, etc.

Figure 3:
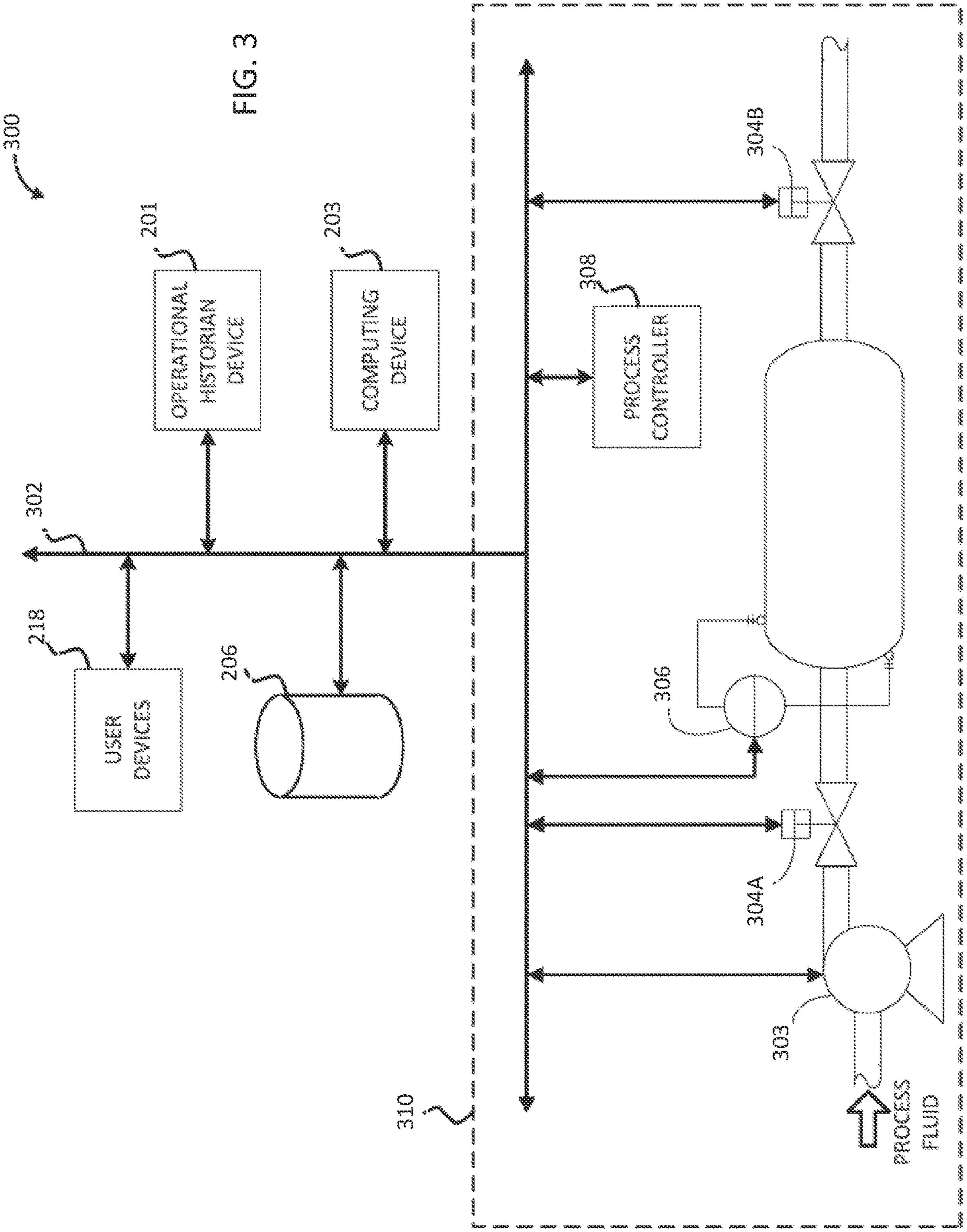
FIG. 3 illustrates a non-limiting example embodiment of a facility process system according to some embodiments.

FIG. 3 illustrates a non-limiting example embodiment of a facility process system 300 according to some embodiments. In some embodiments, the facility process system 300 can include at least one computer 203, at least one operational historian 201, at least one report database 206, at least one user device 218 (comprising a processor and/or display), at least one communication network 302, and a coupled fluid processing system 310. In some embodiments, the historian 201 can be adapted to provide an operational historian 202, which can be adapted to store (e.g., "historize") various types of data related to fluid processing system 310, as further described herein. In some embodiments, the fluid processing system 310 of this non-limiting embodiment includes at least one pump 303, one or more valves 304, at least one sensor 306, and at least one process controller 308.

In some embodiments, within the facility process system 300, the computer 203, operational historian 201, report database 206, user devices 218, and various components of the fluid processing system 310 (e.g., pump 303, valves 304, sensor 306, process controller 308) can be communicatively connected via the communication network 302. In some embodiments, the communication network 302 can facilitate the exchange of data among historian 201, computer 203, report database 206, one or more user devices 218, and components of fluid processing system 310.

In some embodiments, the communication network 302 in the embodiment of FIG. 3 can be a local area network (LAN) that is coupled to other telecommunications networks, including other LANs or portions of the Internet or an intranet. In some embodiments, the communication network 302 may be any telecommunications network that facilitates the exchange of data, such as those that operate according to the IEEE 802.3 (e.g., Ethernet) and/or the IEEE 802.11 (e.g., Wi-Fi) protocols. In another embodiment, the communication network 302 is any medium that allows data to be physically transferred through serial or parallel communication channels (e.g., copper, wire, optical fiber, computer bus, wireless communication channel, etc.). In some embodiments, the communication network 302 can comprise at least in part a process control network.

In some embodiments, the fluid processing system 310 can be adapted for changing or refining raw materials to create end products (e.g., in the chemical, oil and gas, food and beverage, pharmaceutical, water treatment, and power industries). In some embodiments, the system is configured to optimize processes and processing systems other than fluid processing system 310. Example processes can include, but are not limited to, those in the chemical, oil and gas, food and beverage, pharmaceutical, water treatment, and power industries. In some embodiments, the process controller 308 can provide an interface or gateway between components of fluid processing system 310 (e.g., pump 303, valves 304, sensor 306) and other components of system 300 (e.g., historian 201, computer 203, report database 206, user devices 218). In some embodiments, components of fluid processing system 310 can communicate directly with the historian 201, and/or computer 203, and/or report database 206, and/or user devices 218 via communication network 302. In some embodiments, the process controller 308 can transmit data to and receives data from pump 303, and/or valves 304, and/or sensor 306 for controlling and/or monitoring various aspects of fluid processing system 310.

Some embodiments relate to improved processing and display of data in electronics including, for example, a computer and/or computer server (e.g., such as a computer system or server functioning as a manufacturing execution system) that provides a technological solution where users can efficiently monitor processes, retrieve, process, and view data. Some embodiments include a system and methods for arranging, structuring, and transmitting data or datasets in a computer or computer server using one or more data or data streams. In some embodiments, the data or datasets can comprise one or more alarms or alerts related to at least one asset.

Some embodiments include a computer-implemented method comprising program logic executed by at least one processor of a computer system that can provide an environment that allows users to utilize a graphical user interface (GUI) to visualize data or blocks of data, monitor data and alarms, including one or more transitions to or from an alarm or alert state (e.g., such as those that may be received from the industrial process system 300). For example, in some embodiments, the historian I11 may provide a tool for use by a user that enables the user to monitor storage blocks and functionality. Further, some embodiments enable a user to observe incoming event data, the merging of snapshots in a storage block, and responses to queries. In some embodiments, this information may be conveyed to a user in the form of text and/or graphics in the GUI. In some embodiments, the GUI may have a variety of icons indicating different event data, storage blocks, or snapshots, and alarms. Further, some embodiments include a computer-implemented method that includes: retrieving, by a computer system from a data store, a file comprising a plurality of data; displaying data or updating the display based at least in part on data or information related to the file via a display screen of a user interface in communication with the computer system.

Some embodiments include a system, server and computer-implemented program logic executed by at least one processor configured to represent hierarchical assets, along with various properties of each asset that can be uploaded to enable one or more users to search for higher level assets, rather than and/or addition to individual properties of assets, and then visualize at least one available alert and/or alarm for each matching asset.

In some embodiments, the system, server and method can include an audible alert or alarm correlated to a visual display, such as a display on one or more user devices 218. In some embodiments, the system can process a visualization that includes an automatic grouping of alarms of an asset, based on attributes of assets. In some embodiments, attributes of an asset can include monitored parameters of an asset such as time, temperature, pressure, power, flowrate, and/or any measurement that can be delivered visually or through an electrical signal. In some embodiments, the system can detect attributes such as visual changes and/or anomalies associated with a physical asset using a camera and/or any sensor that can detect propagated electromagnetic energy and convert that detection into an electrical signal. In some embodiments, the system can correlate the anomalies occurring in secondary assets to the conditions that caused an alarm in a primary asset. In some embodiments, the system predicts anomalies that will occur in secondary assets based on historical data including maintenance records, statistical analysis, continuous or intermittent correlation analysis, root cause analysis algorithms, AI training, and/or any other data source available.

In some embodiments, the system uses artificial intelligence, machine learning, and/or deep learning (collectively referred to herein as AI) to detect and/or sort through images and/or sensor data to perform analysis. In some embodiments, the system can analyze two or more assets in a process flow and generate reports, written or visual, that describe the effects that one asset's alarm condition can have on both upstream and downstream processes. In some embodiments the system can learn in real time if predicted effects match observed effects, and adjust predictions for both the present excursion and future events. In some embodiments, the system, server and method can provide rapid and readily understood visualization of alarms and reports on one or more displays. In some embodiments, the display can include a display of a computer system, a personal digital assistant, a cellular or smart phone, a digital tablet, and/or other fixed or mobile Internet appliances.

Some embodiments provide a computer-implemented system and method comprising program logic executed by at least one processor enabling a grouping of alarms, (e.g., such as one or more alarms of the aforementioned example embodiment of a facility process system 300), that can be correlated to individual alarms based on one or more automatically assigned markers. In some embodiments, the correlation between groups and individual alarm instances can be based on one to one and/or one to many mappings of attribute values for effective summarization of alarms, and/or unambiguous identification of one or more causes for individual alarm instances as well as the actions to take in response. In some embodiments, a further alarm analysis can be done through single or multiple filters of groups, which can automatically provide a view of multiple alarms groups, detailed alarm records, causes, and/or response actions of a set of one or more groups.

Some embodiments include a computer-implemented system and method comprising program logic executed by at least one processor enabling one or more users to visualize all related alarms for an asset based on one or more asset searches (e.g., such as one or more searches initiated through search service 216). Some embodiments can include an automatic grouping of alarms based on attributes of alarms and/or analysis done on those attributes. In some embodiments, the system can provide a cause and/or effect correlation between groups and individual alarm instances. In some embodiments, the system and method can automatically process (e.g., using AI) and display one or more intuitive groupings and corresponding details, and/or view a large number of alarms based on one or more assets, so that users can focus on the problem areas (such as which area of my plan has the most number of alarms yesterday) without needing to spend significant time to find the area with the most number of alarms.

Figure 4:
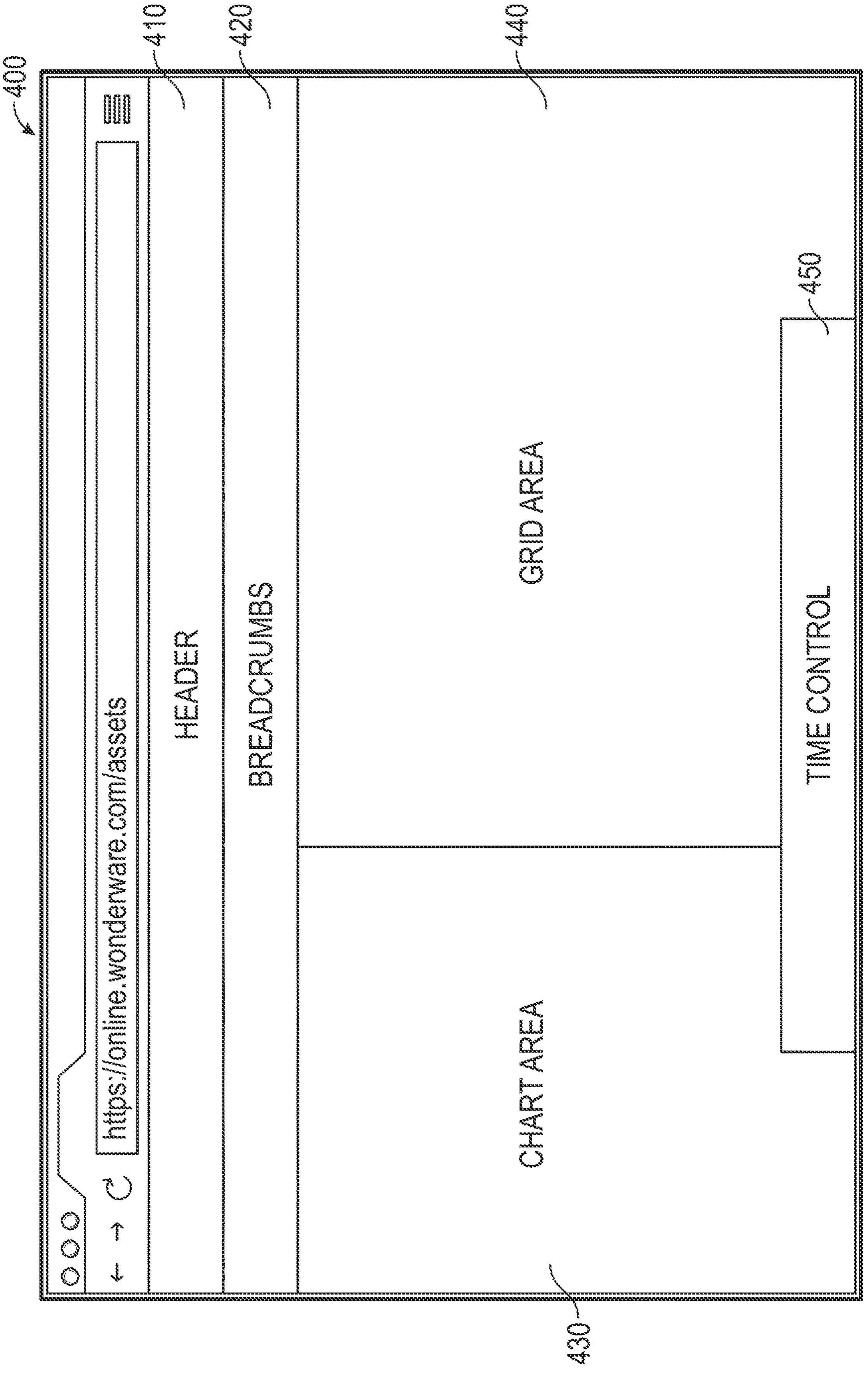
FIG. 4 is an alarm view page according to some embodiments.

FIG. 4 is an alarm view page 400 according to some embodiments. As shown, in some embodiments, the system and method can process and display an alarm view page 400 that is divided into a plurality of windows or sections that can allow one or more users to view various details about one or more alarms on a user device 218. For example, in some embodiments, the sections can include, but not be limited to, a header section 410, and/or breadcrumb section 420, and/or chart area section 430, and/or grid area section 440, and/or a time control section 450. The header section 410 can be the same as it is in an explore section, the only difference being the header section will not contain search control according to some embodiments.

In some embodiments, within the breadcrumbs section 420, the asset hierarchy is represented using breadcrumbs that can display directory paths of the current folder or webpage and provide access to each of the parent directories. In some embodiments, each asset in the asset hierarchy can be separated by a conventional graphic, token, symbol, and/or character (e.g., such as a special token ">" or any other suitable character or combination of characters and graphics). In some embodiments, by pressing the special token, a user can show one or more children under the selected asset. In some embodiments, by selecting a child asset, the system can refresh the breadcrumbs with the new asset hierarchy and/or update the chart area section 430, and/or grid area section 440. In some embodiments, the hierarchy leads to additional analysis that includes causes and/or action items. In some embodiments, the additional analysis is specific to the user.

In some embodiments, system can display one or more sections and/or columns of a grid (grid area section 440) with higher resolutions, including, but not limited to alarm information such as one or more of a, "time," "severity," "duration," "condition," "in alarm or not," "sparkline," "status," "tag," "object," "area," "value," "limit,", and/or "unacknowledged." In some embodiments, as the resolution reduces (i.e., display size available for the grid is reduced), at least some of the columns can be hidden based one or more priorities specified by the user, the system, an administrator or other person or system. For example, in some embodiments, the system and method can process and display a shrinkage of the width and/or height of a "sparkline" as resolution reduces. In some embodiments, a "sparkline" is a conventional small line chart that displays the general shape of measurement variation. In some embodiments, the system can process and display one or more columns based on: time in alarm; the "unacknowledged" bar graph; an "object;" "area;" "limit;" and/or "value" column. In some embodiments, the system can process and display one or more columns based on text label for the alarm type (e.g. "High-High"), while the associated icon can remain In some embodiments, a column comprises links to message boards, reports, causes, and/or action items previously saved in the system and/or provided by the system (e.g., through AI).

Figure 5:
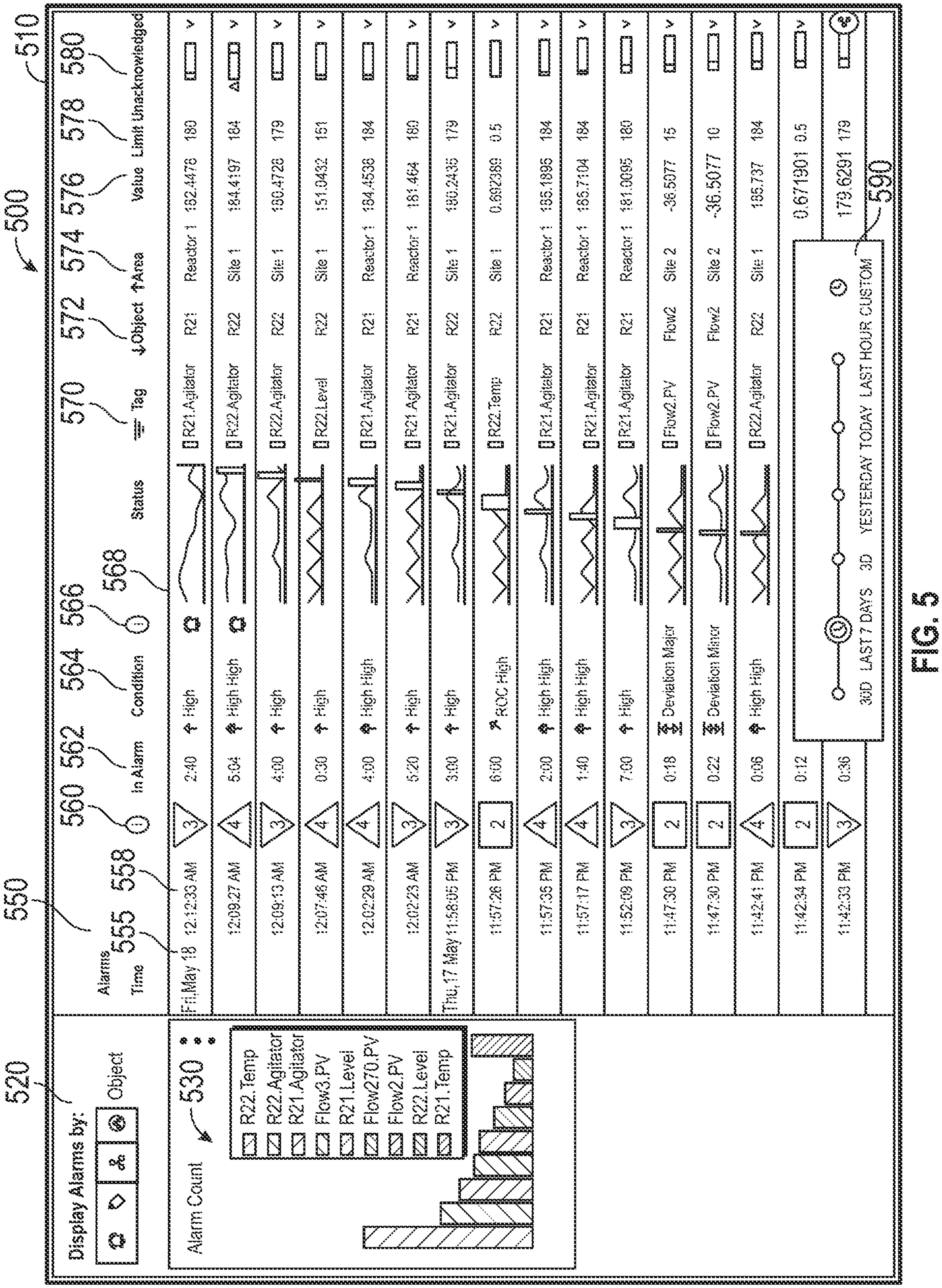
FIG. 5 illustrates a non-limiting example embodiment of an alarm view page according to some embodiments.
Figure 6A:
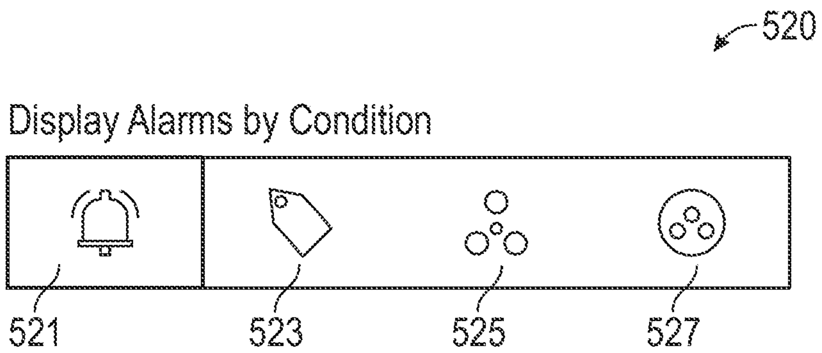
FIG. 6A illustrates an alarm display in accordance with some embodiments.

FIG. 5 illustrates a non-limiting example embodiment of an alarm view page 500 according to some embodiments. In some embodiments, the grid 510 can show a list of all alarms generated for the selected asset as well as for its children. Some further embodiments include one or more additional, adjoining and/or overlapping designs including alarm display and statistics. In some embodiments, the system and method can process and provide a chart area (shown on the left side of FIG. 5 and shown enlarged in FIGS. 6A and 6B) that can be used to display useful alarm summary information where the user is provided a snapshot of alarm activity. For example, some embodiments include an alarm display 520 and alarm count 530. In some embodiments, the user can interact with the Pareto chart 530 to access more specific data in the grid area. In some embodiments, the chart area can comprise a Pareto chart 530 (FIG. 6B) that can display the number of alarms of the given time period.

In some embodiments, the grid 510 can include an alarms column 550, including, but not limited to a data column 555, time column 558, and/or alert column 560 for displaying one or more different alert symbols. Further, in some embodiments, the grid 510 can include an "in alarm" column 562, condition column 564, alarm signal column 566, signal chart status column 568, tag column 570, and/or object column 572. Further, in some embodiments, the grid 510 can include an area column 574, value column 576, limit column 578, and/or unacknowledged column 580. In some other embodiments, the alarm view page 500 can be filtered by time or date using selection filter 590 shown at the bottom of the alarm view page 500.

In some embodiments, alarms can be grouped by alarm, tag, area and/or object according to a "Group By" control. In some embodiments, alarms can be selected based on condition using the selector 520, including, but not limited to, selected conditions 521, 523, 525, and 527. In reference to FIG. 6A, in some embodiments, the "Group By" control (selector 520) can sit at the top of the chart area. In some embodiments, "Group By" label can comprise a set of buttons or other conventional interface features that can allow the user to display alarm data in the Pareto chart 530 based on alarm (condition), tags, areas or objects, where the label explains the current grouping. In some embodiments, the system and method can enable a default condition by alarm (condition). In some embodiments, when a user changes the grouping by clicking one of the buttons, the grid and Pareto chart 530 can be redrawn based at least in part on the user's input.

In some embodiments, the grid can show color key rectangles next to data in all cells of the columns represented by the currently selected group (shown as alert column 560).

Figure 6B:
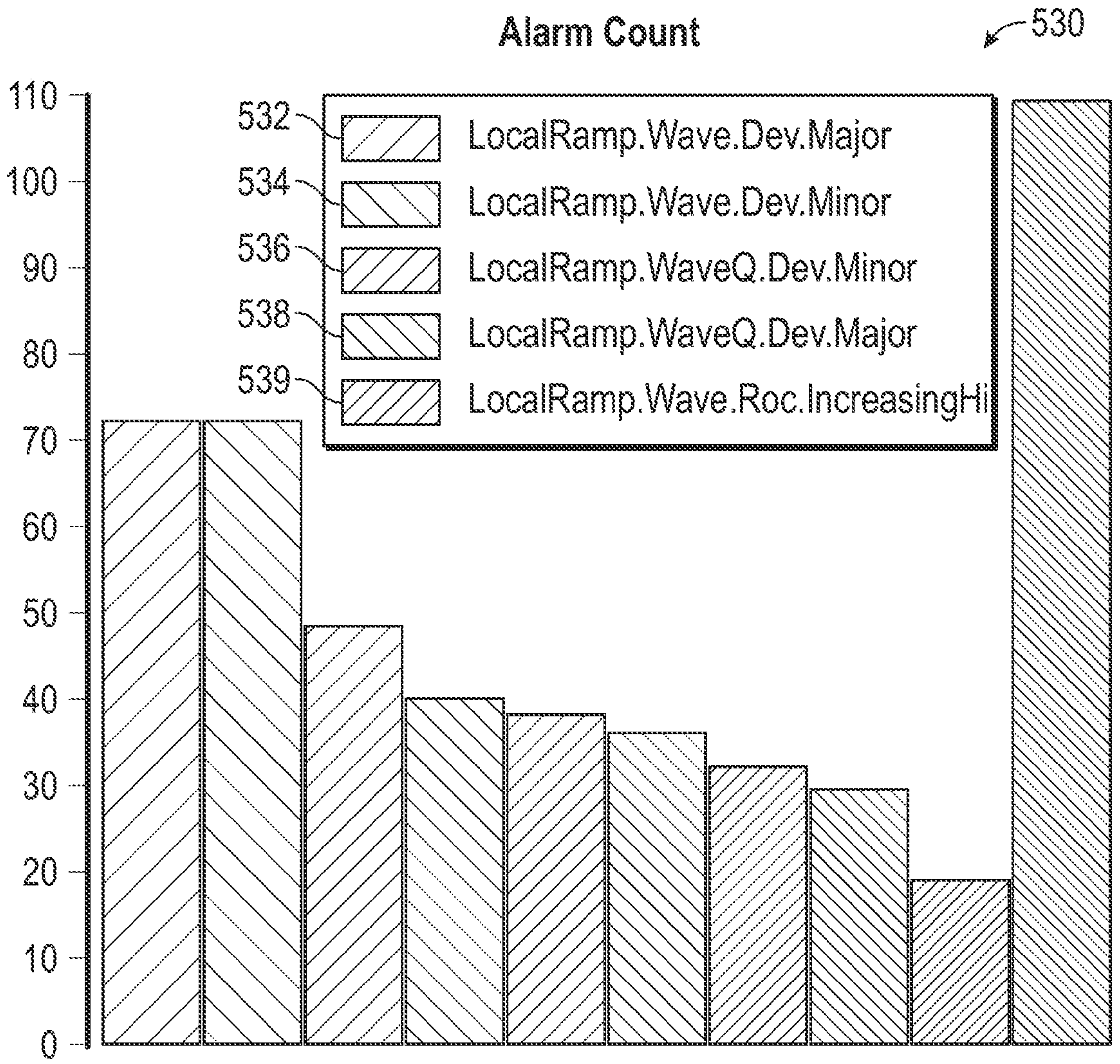
FIG. 6B illustrates a chart display in accordance with some embodiments.

In some embodiments, the Pareto chart 530 can then show a set of data representing the number of alarms grouped by current selection. In FIG. 6B, alarm counts 532, 534, 536, 538, 539 are shown according to some embodiments. In some embodiments, the color of columns and legend item color key rectangles can match the color key rectangles found in the grid (of alert column 560). In the case of grouping by alarm (condition), the grid can show two color key rectangles in the tag and condition columns. In the case of tag, area and object columns, one color key rectangle can appear per cell of the one corresponding column in the grid. In some embodiments, the "Group By" selection can be indicated by a highlight color (e.g., such as blue) of the corresponding button on the control. In some embodiments, all buttons on the "Group By" control can have tooltips that explain the grouping.

Referring back to FIG. 5, and FIG. 6B, in some embodiments, the Pareto chart 530 can be displayed below the "Group By" control described earlier. In some embodiments, in one or more of the columns described, the Pareto chart 530 can depict the number of alarms per alarm (condition), tag, area or object (depending on the "Group By" control.) In some embodiments, the chart 530 can show up to ten columns; however the number of columns can vary, and can include more or less columns than shown in the non-limiting embodiment of FIG. 5. In some embodiments, the columns can be arranged in descending order, where the first nine columns are the top nine columns. In some embodiments, the tenth column, if it exists, can represent the sum of all other data. In some embodiments, if fewer than nine items exist, then the other column is not shown and the remaining columns can share the chart width.

Referring to FIG. 6B, in some embodiments, the chart 530 can show a title at the top describing the charted data (e.g., such as "Alarm Count"). In some embodiments, the chart 530 can include a y-axis that is marked with numbered ticks and can have grey grid lines extending across the chart 530. In some embodiments, the chart 530 can include a legend that has a legend item per each column depicted in the chart. In some embodiments, the legend item can contain a color key rectangle that corresponds with the color of columns in the chart and contains a label of the ID or name of the current items 532, 534, 536, 538, 539 represented. In some embodiments, if the legend text exceeds the container size, it can be truncated using an ellipsis and a tooltip that can appear showing the full name if the user hovers over the truncated legend item text.

In some embodiments, item highlighting can occur when clicking columns or legend items of grid 510. In some embodiments, when the user first clicks on a column or legend item, that column and legend item can become highlighted, and all other columns or legend items can dim. In some embodiments, the user can click other columns or legend items that are dimmed to add them to the highlight. In some embodiments, when a highlight is in place, columns and legend items that are highlighted (i.e., not dimmed) can be clicked to remove items from the highlight. In some embodiments, once either all columns are highlighted, or all highlights are removed, the chart 530 can reenter the original state where no columns or legend items are dimmed.

In some embodiments, the Pareto chart 530 can be a fixed size when the screen height is tall, and once the screen is reduced in height below the initial height, the chart 530 can also shrink. In some embodiments, the legend area height can normally be a fixed height such that all legend items can display, and when the screen size is too small to show meaningful data in the column chart section, the legend area can shrink and include a scroll bar so the user can still access all legend items. In some embodiments, when the screen width reduces such that the time control overlaps the chart 530, the chart 530 container automatically resizes so that no overlap occurs. In some embodiments, a chart, such as the Pareto chart 530, is replace with a different chart upon resizing the screen or window.

In some embodiments, the system presents one or more of information, settings, and/or links on an explore page. In some embodiments, an explore page (or section) is a display that prioritizes information based on previously viewed and/or searched items. In some embodiments, using this time control, the system can quickly select predefined time selections and retrieve alarms records from the server based on past user interaction. In some embodiments, the start and end times can be customized in the explore page.

In some embodiments, the system and methods associated therewith can process data based on an asset hierarchy and selected time duration, where raw alarms are fetched from a system server such as computer 203. In some embodiments, during this phase, a grid area section can be displayed showing a basic skeleton, outline or template, (including some animation in some further embodiments) to indicate that the grid is waiting for data from the server, as well as to indicate conversion of raw data to grid format. In some embodiments, once the data is fetched from the server, the client can consolidate relevant records, and show the consolidated view in the grid.

In some embodiments, the system and method can process one or more rules that are applied during the alarm record consolidation. For example, in some embodiments, processed rules can group all records based on an alarm ID. In some embodiments, an end-time ('et') is calculated based on the current time ('ct') and an end time specified in the time control ('tc.et'). In some embodiments, if 'ct' is greater than 'tc.et,' then 'et' will be 'tc.et' (i.e., the end time displayed to the user by the system is that which is specified in the time control). In some embodiments, if 'ct' is less than or equal to 'et,' then 'et' will be 'ct' (i.e., the end time is chosen as the current time by the system). In some embodiments, if end time 'et' is current time 'ct' then the display will continuously update with current time data as the current time changes.

In some embodiments, if the group contains an 'alarm.set' (alarm set) record, then an 'unack' (i.e., unacknowledged) duration is retrieved from 'alarm_unackdurationms' (alarm unacknowledged duration) property in the 'alarm.aacknowledged' (alarm acknowledged) record if it is present in the group. If not, then unack duration and/or an in-alarm duration are fetched from 'alarm_durationms' (alarm durations) in the 'alarm.clear' (alarm clear) record according to some embodiments. If both records (ack and clear) are not present, then unack duration and in-alarm duration are both calculated based on the end time 'et' as discussed above.

In some embodiments related to rule-based processing, if the group contains an 'alarm.acknowledged' record, then unacknowledged duration IS retrieved from an 'alarm_unackdurationms' property in the 'alarm.aacknowledged' record. Later, "in-alarm" duration information is calculated based on the start time specified in the time control and event time registered in the 'alarm.clear' record if the 'alarm.clear' record is present. In some embodiments, if the 'alarm.clear' record is not present, then in alarm duration is calculated based on the start time specified in the time control and end time 'et.'

In some embodiments, if the group contains only an 'alarm.clear' record, then unack duration and in alarm durations are calculated based on the start time specified in the time control and event time registered in the 'alarm.clear' record. Later, additional properties (such as "in-alarm", "is-silenced", and "is-shelved") are calculated. For example, some embodiments include rule-based processing definitions that can comprise one or more of:

A "In-Alarm": Within the queried duration, this property is set to true for each alarm if the 'Alarm.Clear' record is not present for that alarm. If not, this property is set to false.

B. "Is-Shelved": Within the queried duration, this property is retrieved from the last record of each alarm.

C. "Is-Silenced": Within the queried duration, this property is retrieved from the last record of each alarm.

In some embodiments, spark lines (e.g., small inline or overlaid charts) are constructed by fetching process values from the system server for a specific tag mentioned in each alarm record. In some embodiments, if process values are empty for a given tag, then an empty spark line (which is indicated by filling spark line charts with a solid color in some embodiments) can be shown in the grid or grid section. In some embodiments, if the process values are present, then the spark line is drawn using process values. In some embodiments, after drawing the spark line, a section of the spark line is highlighted based on the 'in alarm' duration and colored according to the severity of the alarm.

In some embodiments, the system and method can process tests including, but not limited to: verify that the all the sections are present in the rendered page; verify predefined time selections can be selected in the time control; and/or verify custom time selection can be made in the time control.

Figure 7:
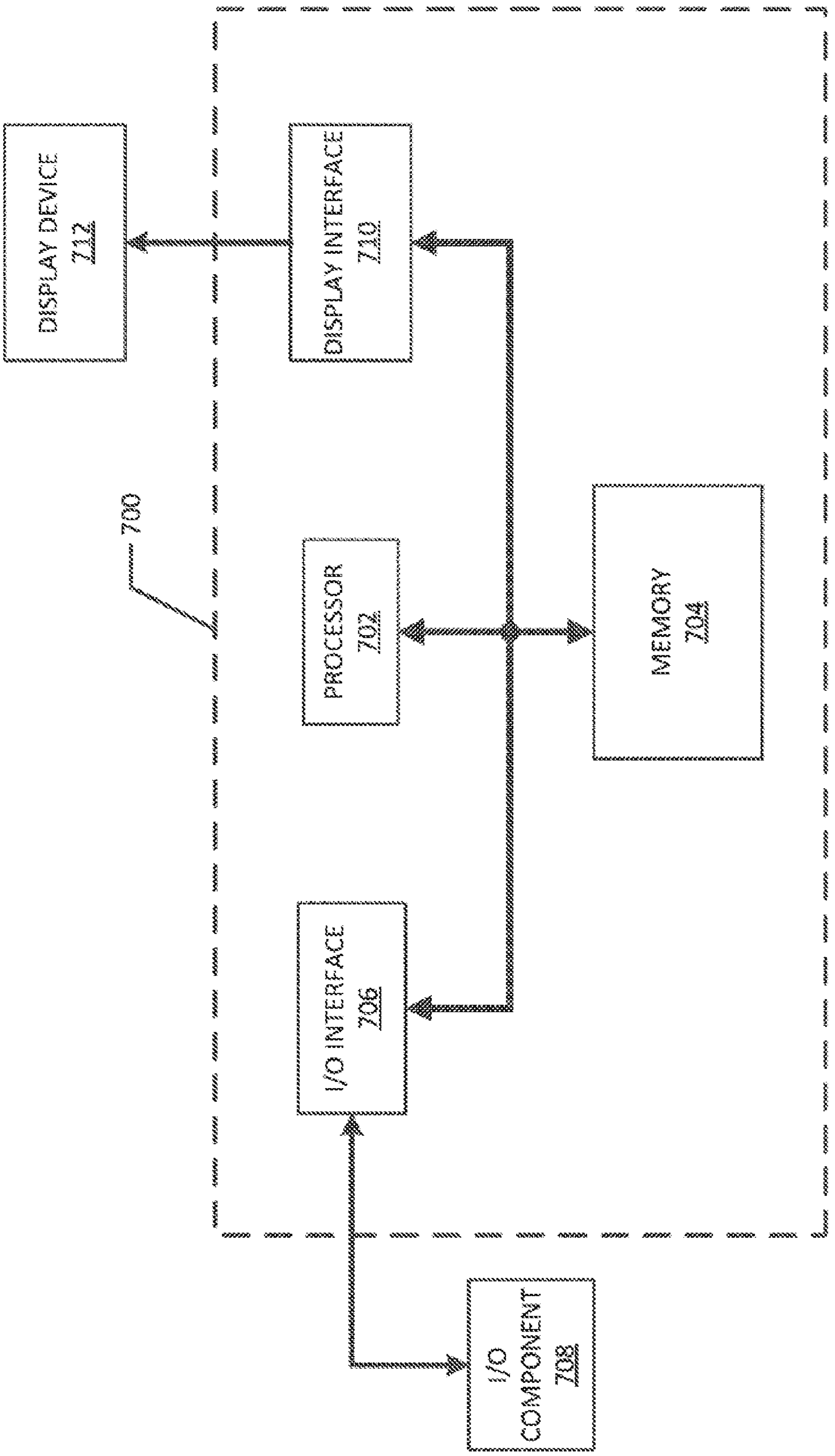
FIG. 7 illustrates a computer system enabling or comprising the systems and methods in accordance with some embodiments.

FIG. 7 illustrates an architecture of the computer 203 that can provide aspects of the operational historian data pattern detection and communication services system 200 (FIG. 2) via a software environment. In this embodiment, the computer 203 (FIG. 3) can include at least one processor 702, at least one memory 704, and at least one input/output (I/O) interface 706 that interfaces with at least one I/O component 708. In some embodiments, the memory 704 includes the operational historian interface 202, reporting service 204, a report database 206, curating service 208, user-specific report collection 210, general report collection 212, alert service 214, and search service 216 each embodied in processor-executable instructions for executing by processor 702. In some embodiments, the processor 702, memory 704, and I/O interface 706 are communicatively connected and/or electrically connected to each other. In some embodiments, the I/O interface 706 is communicatively and/or electrically connected to the I/O component 708. In some embodiments, the processor 702 can be adapted to execute processor-executable instructions stored in the memory 704 for implementing the operational historian interface 202, and/or the reporting service 204, and/or the report database interface 206, and/or the curating service 208, and/or the user-specific report collection 210, and/or the general report collection 212, and/or the alert service 214, and/or search service 216. In some embodiments, the I/O interface 706 of FIG. 7 provides a physical data connection between computer 103 and I/O component 708. In an embodiment, I/O interface 706 is a network interface card ("NIC") or modem and I/O component 708 is a telecommunications network.

In some embodiments, the operational historian interface 202 of FIG. 7 can be adapted to provide a connection between computer 203 and operational historian 202. In some embodiments, operational the historian interface 202 can retrieve and/or receive data from operational historian 202 via I/O interface 706, as further described herein. In some embodiments, the report database interface 206 of FIG. 7 can be adapted to provide a connection between computer 203 and a computer-readable storage medium capable of storing report databases 206. In some embodiments, report database interface 206 facilitates publishing of reports from reporting service 204 to report database 206 via I/O interface 706, as further described herein. In another embodiment, report database interface 206 facilitates access to report database 206 by curating service 208 and search service 216 via I/O interface 706, as further described herein.

Figure 8:
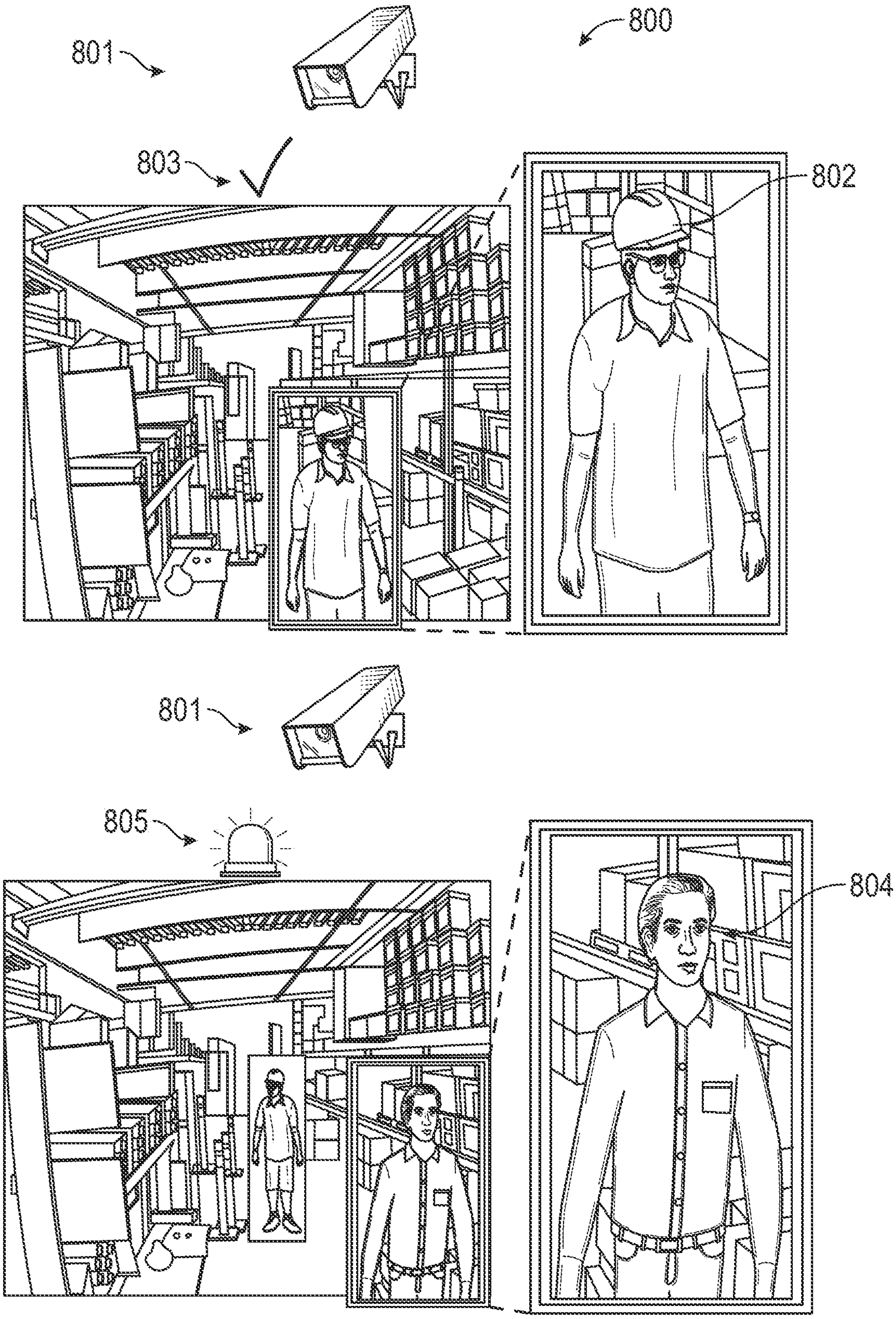
FIG. 8 shows the system being used for a safety compliance application according to some embodiments.

FIG. 8 shows the system being used for a safety compliance application according to some embodiments. In some embodiments, the AI is trained to classify images from a camera 801 and determine if personnel are wearing hard hats in a safety zone. In some embodiments, if a user is wearing a hardhat 802 the system classifies the image as compliant 1803 and no action is taken. In some embodiments, if a user not wearing a hardhat 1804 is classified as non-compliant 1805 and an alarm is generated. Training the AI using images is discussed in further detail below.

Figure 9:
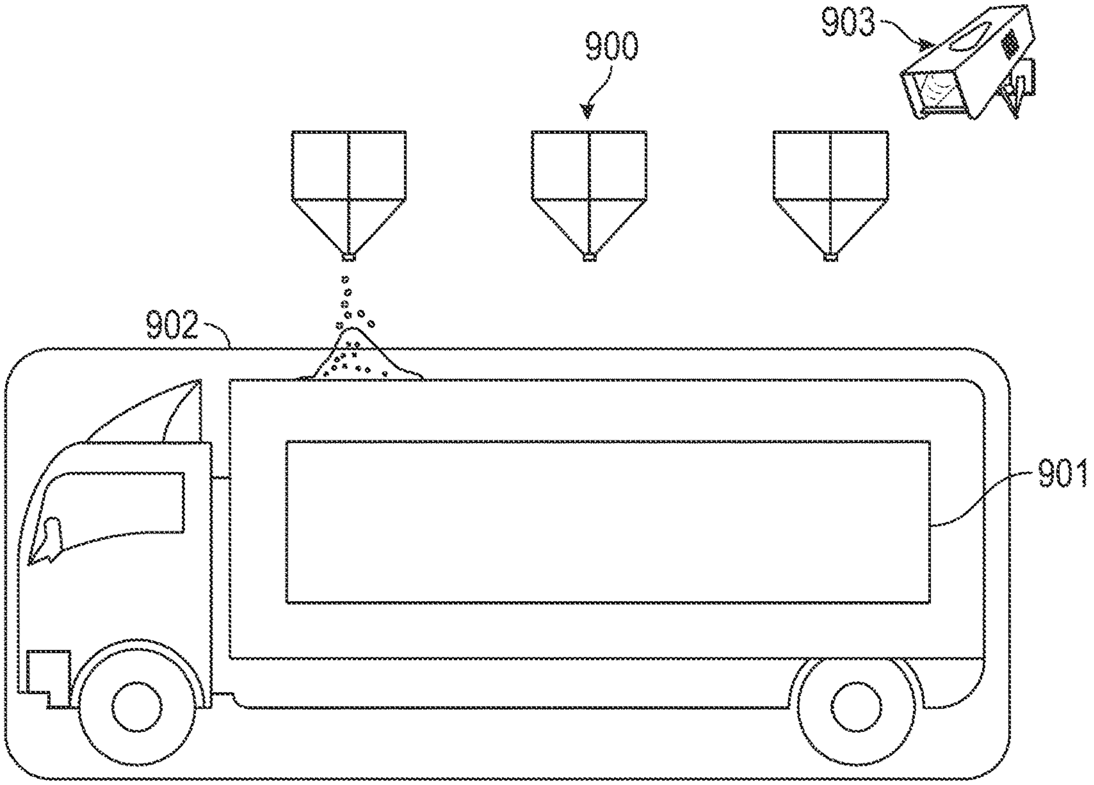
FIG. 9 depicts using the system for detecting correct placement and filling of a truck 900 according to some embodiments.

FIG. 9 depicts using the system for detecting correct placement and filling of a truck 900 according to some embodiments. In some embodiments, the system is trained to determine if a truck 901 is within a boundary 902 using images from camera 903. In some embodiments, an alarm is generated if the truck is outside the boundaries. In some embodiments, the system controls a light or image displaying an indication that the truck is correctly placed and/or incorrectly place that both the driver and facility personnel can see. In some embodiments, an alarm is generated by the system when a filling operation begins. In some embodiments, the system is trained to recognize a filling operation using the system's camera and AI. In some embodiments, the system prevents a truck filling operation if a truck 901 is outside the boundary 902.

Figure 10:
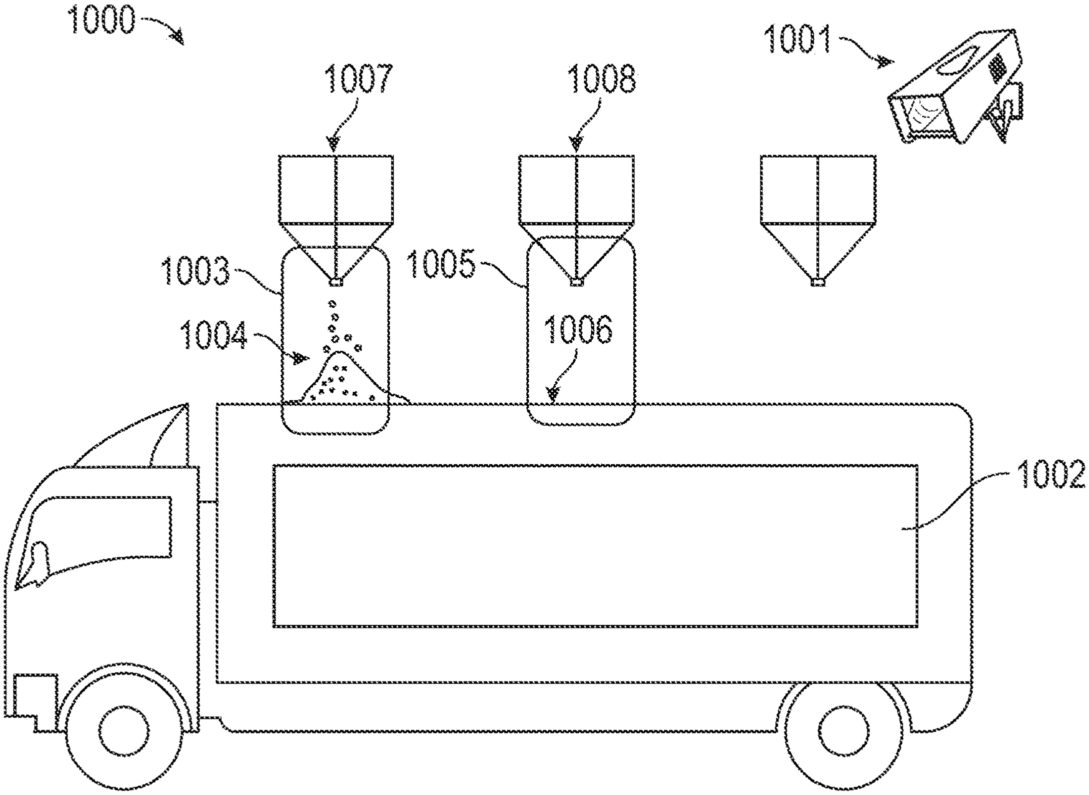
FIG. 10 illustrates using the system to insure proper filling of a truck according to some embodiments.

FIG. 10 illustrates using the system to insure proper filling of a truck 1000 according to some embodiments. In some embodiments, the system uses a camera 1001 to monitor an area 1003 to determine when a level of material 1004 reaches a certain height. In some embodiments, when the level of material 1004 reaches a certain height an alarm and/or alert is provided by the system. In some embodiments, when the level of material 1004 reaches a certain height 1004 the system stops the hopper 1007. In some embodiments, when the level of material 1004 reaches a certain height 1004 a different hopper 1008 (or any hopper) begins a filling operation. In some embodiments, all hoppers run simultaneously and the system stops the filling operation for each respective hopper when a respective area below the hopper accumulates a pretrained material height.

Figure 11:
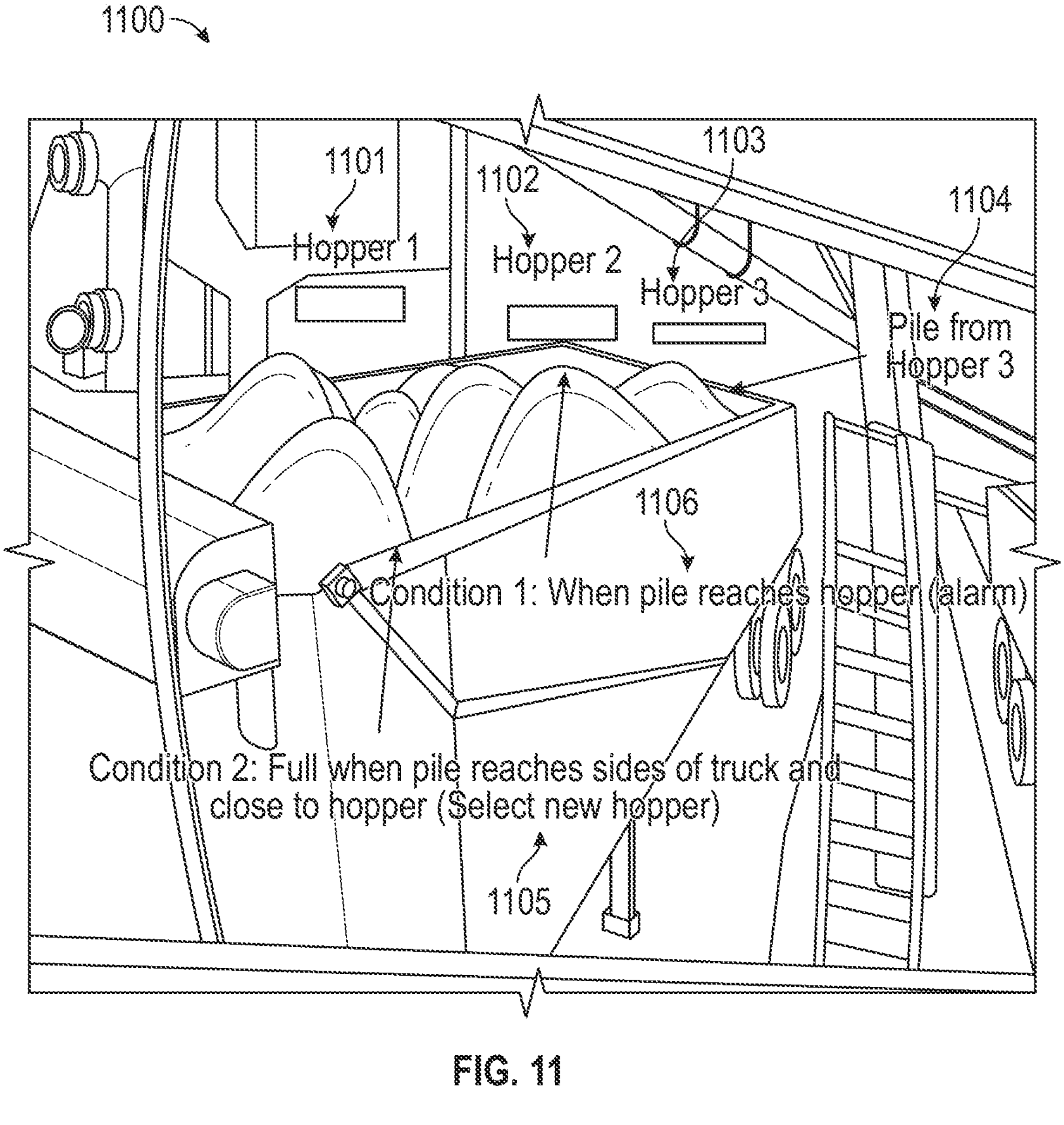
FIG. 11 shows a camera feed using the system to control a truck filling operation according to some embodiments.

FIG. 11 shows a camera feed using the system to control a truck filling operation 1100 according to some embodiments. In some embodiments, there are three hoppers 1101, 1102, and 1103 that the system has been trained to recognize. In some embodiments, the system outlines each hopper and/or monitoring area with a box (or any shape) on the camera feed so a user is able to verify that the system recognizes the hoppers and/or monitoring areas. In some embodiments, the system provides an alarm for when a material pile reaches the hopper as shown in condition 1106. In some embodiments, the system alarms and/or alerts when a pile reaches the sides of the truck and/or is close to the hopper as shown in condition 1105. In some embodiments, the system starts and/or stops a hopper when condition 1105 and/or 1106 occurs. In some embodiments, the system can monitor a pile 1104 from hopper 1103 and apply the same rules as other hoppers 1104.

Figure 12:
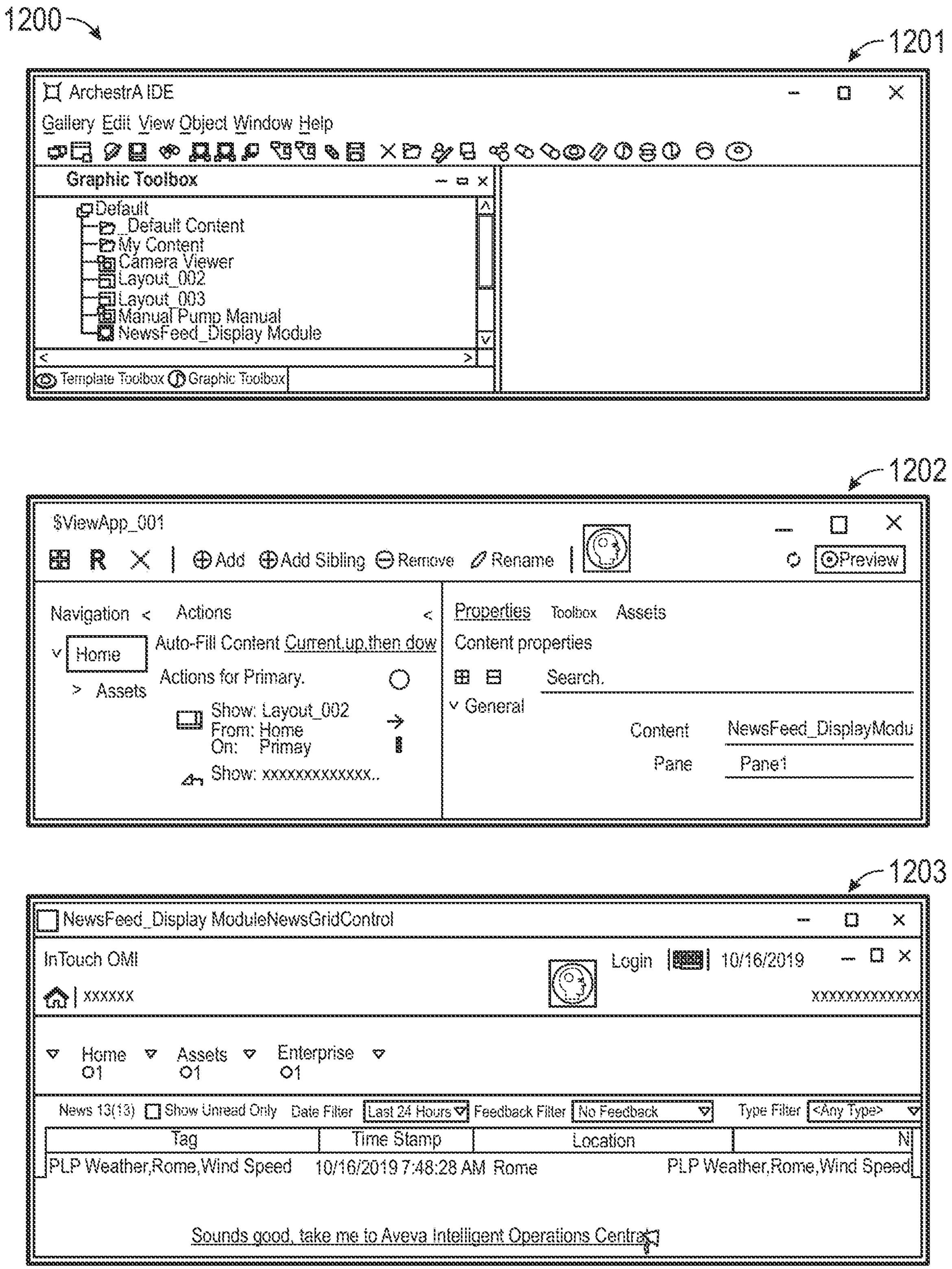
FIG. 12 shows one or more programs that the system can be loaded on and/or connected to according to some embodiments.

FIG. 12 shows one or more programs that the system can be loaded on and/or connected to according to some embodiments. In some embodiments, the system can be configured to model and monitor one or more process parameters where data is recorded as tags. In some embodiments, the system can be loaded onto one or more platforms 1201, 1202, 1203. In some embodiments, the one or more platforms include any software that monitors one or more camera feeds and/or has access to one or more system tags from one or more real-time sources and/or databases. In some embodiments, the one or more platforms include ArchestrA®, Avantis®, DYNSIM®, eDNA®, EYESIM®, InBatch®, InduSoft®, InStep®, IntelaTrac®, InTouch®, PIPEPHASE®, PRiSM®, PRO/II®, PROVISION®, ROMeo®, SIM4ME®, SimCentral®, SimSci®, Skelta®, SmartGlance®, Spiral Software®, VISUAL FLARE®, WindowMaker®, WindowViewer®, and/or Wonderware®, which are all trademarks of AVEVA®, its subsidiaries, and/or affiliated companies.

Figure 13:
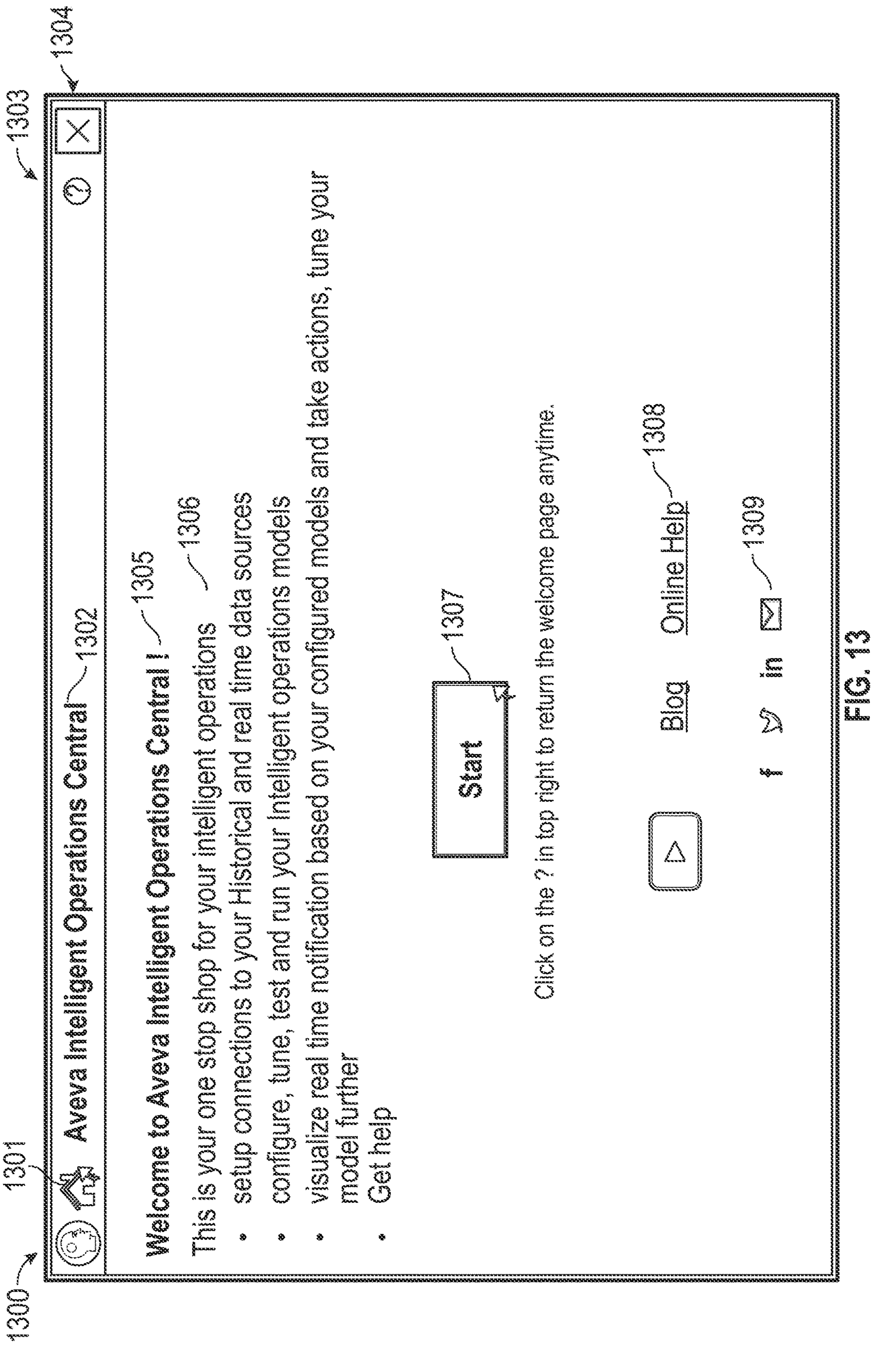
FIG. 13 shows an interface for implementing the system according to some embodiments.

FIG. 13 shows an interface for implementing the system according to some embodiments. In some embodiments, the system provides a welcome page 1300. In some embodiments, the welcome page 1300 and/or one or more other displays supplied by the system are provided through a conventional browser. In some embodiments, the homepage 1300 and/or one or more other displays provided by the system are provided through a system browser. In some embodiments, the term "browser," "window," and/or "display" is a reference to a conventional browser and/or a browser provided by the system. In some embodiments, the term "page" is a reference to a browser and/or a display showing system information. In some embodiments, the browser includes a home button 1301, a header section 1302, a welcome page link 1303, a browser close button 1304, a start button 1307, links to online help, blogs, and/or tutorial videos 1308, and/or links to social media 1309. In some embodiments, the welcome page 1300 includes a welcome message 1305 and/or a program description 1306.

Figure 14:
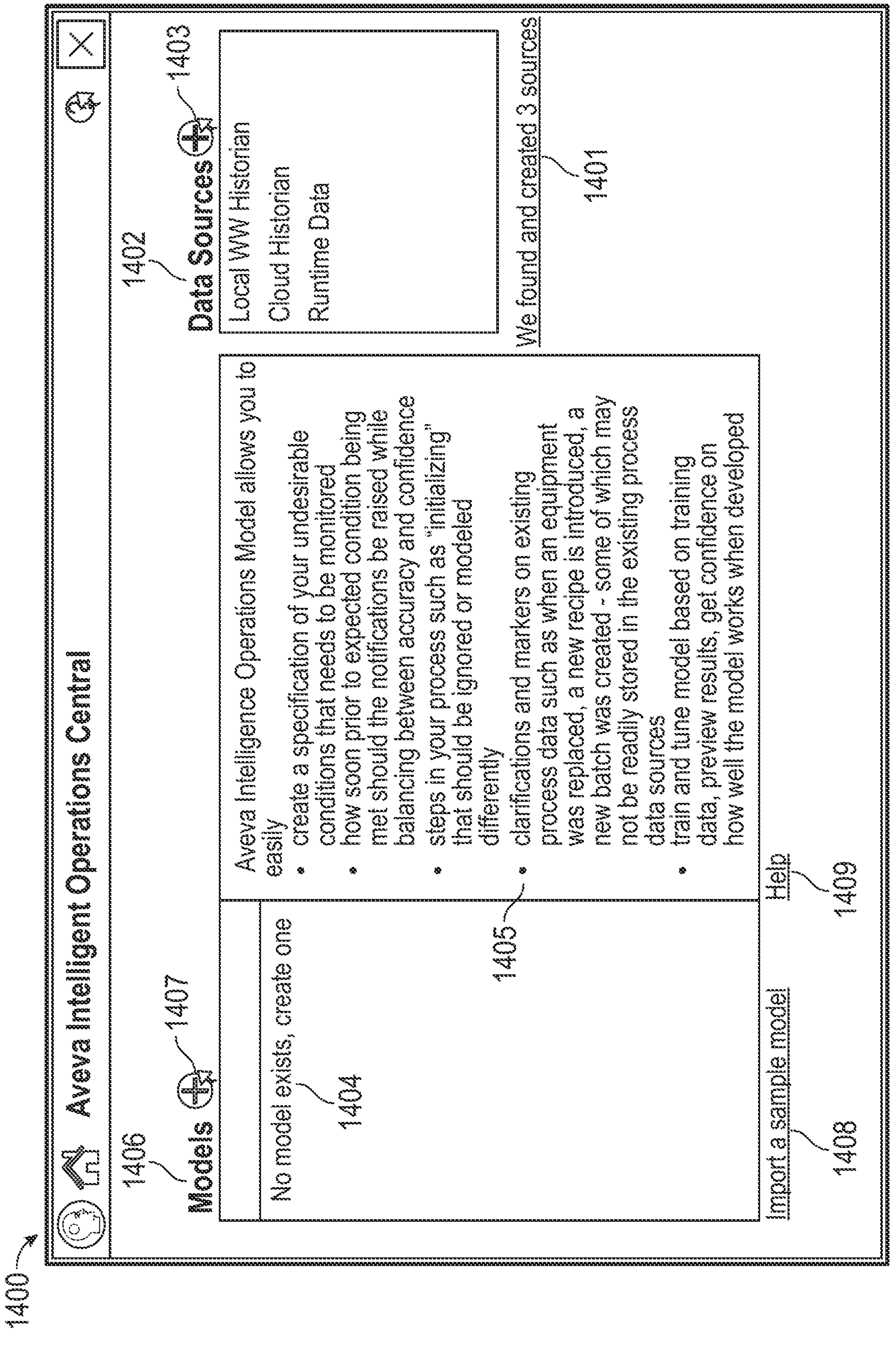
FIG. 14 shows a browser page for starting the modeling process according to some embodiments.

FIG. 14 shows a browser page for starting the modeling process 1400 according to some embodiments. In some embodiments, the system provides condition detection and future condition projection and/or prediction using real-time data streams while considering the low latency requirements for operations. In some embodiments, by virtue of the system being connected to one or more monitoring platforms, the system automatically detects one or more historian databases and/or runtime data sources 1401 and displays them in the data source section 1402. In some embodiments, the system automatically connects to the one or more historian databases and/or runtime data sources 1401. In some embodiments, a user manually connects the one or more historian databases and/or runtime data sources 1401 to the system. In some embodiments, the user can add one or more historian databases and/or runtime data sources using the add button 1403. In some embodiments, the system indicates that no model exists 1404 and/or provides information about the modeling process 1405 in the models section 1406. In some embodiments, a user can start the modeling process by selecting the create model button 1407. In some embodiments, the system provides a link to import a sample model 1408 and/or to request help 1409.

Figure 15:
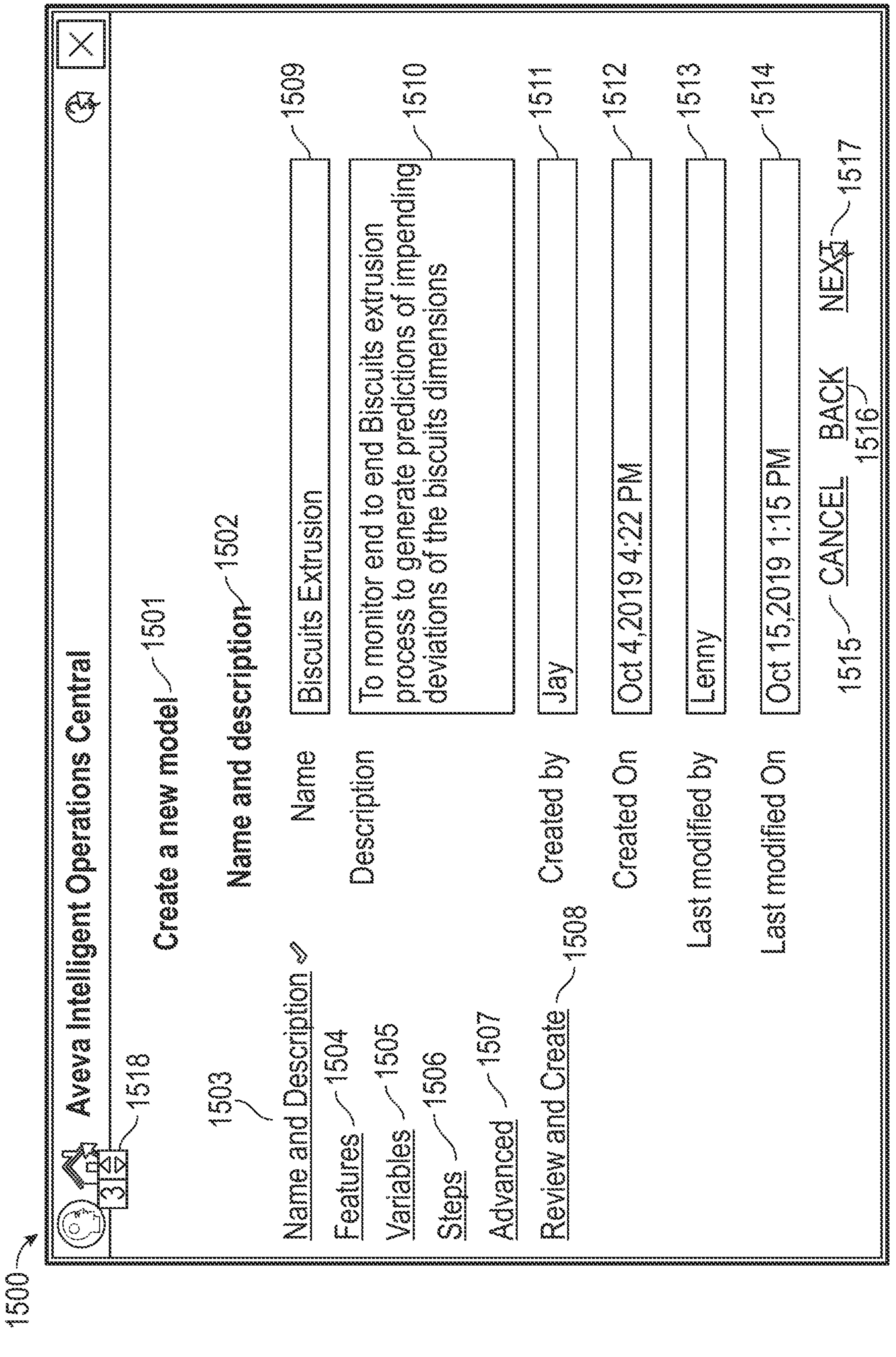
FIG. 15 illustrates a model description page according to some embodiments.

FIG. 15 illustrates a model description page 1500 according to some embodiments. In some embodiments, after selecting the create model button 1407 the user is directed to model description page 1500. In some embodiments, the model description page 1501 includes a title section 1501 and/or a name and description section 1502. In some embodiments, the model description page 1500 includes links 1503-1508 to each page used in the model creation process. In some embodiments, pages used in the model creation process includes name and description 1503, features 1504, variables 1505, steps 1506, advanced 1507 (which also includes the predictions pages described later), and/or review and create 1508. In some embodiments, one or more links 1503-1508 are displayed on every page in the model creation process. In some embodiments, the name and description section 1502 includes input sections for a name 1509, description 1510, created by 1511, created on 1512, last modified by 1513, and/or last modified on 1514. In some embodiments, the system provides a cancel button 1515, a back button 1516, and/or a next button 1517. In some embodiments, the system provides breadcrumbs and/or a page selection icon 1518 that allows for choosing a different model creation page.

Figure 16:
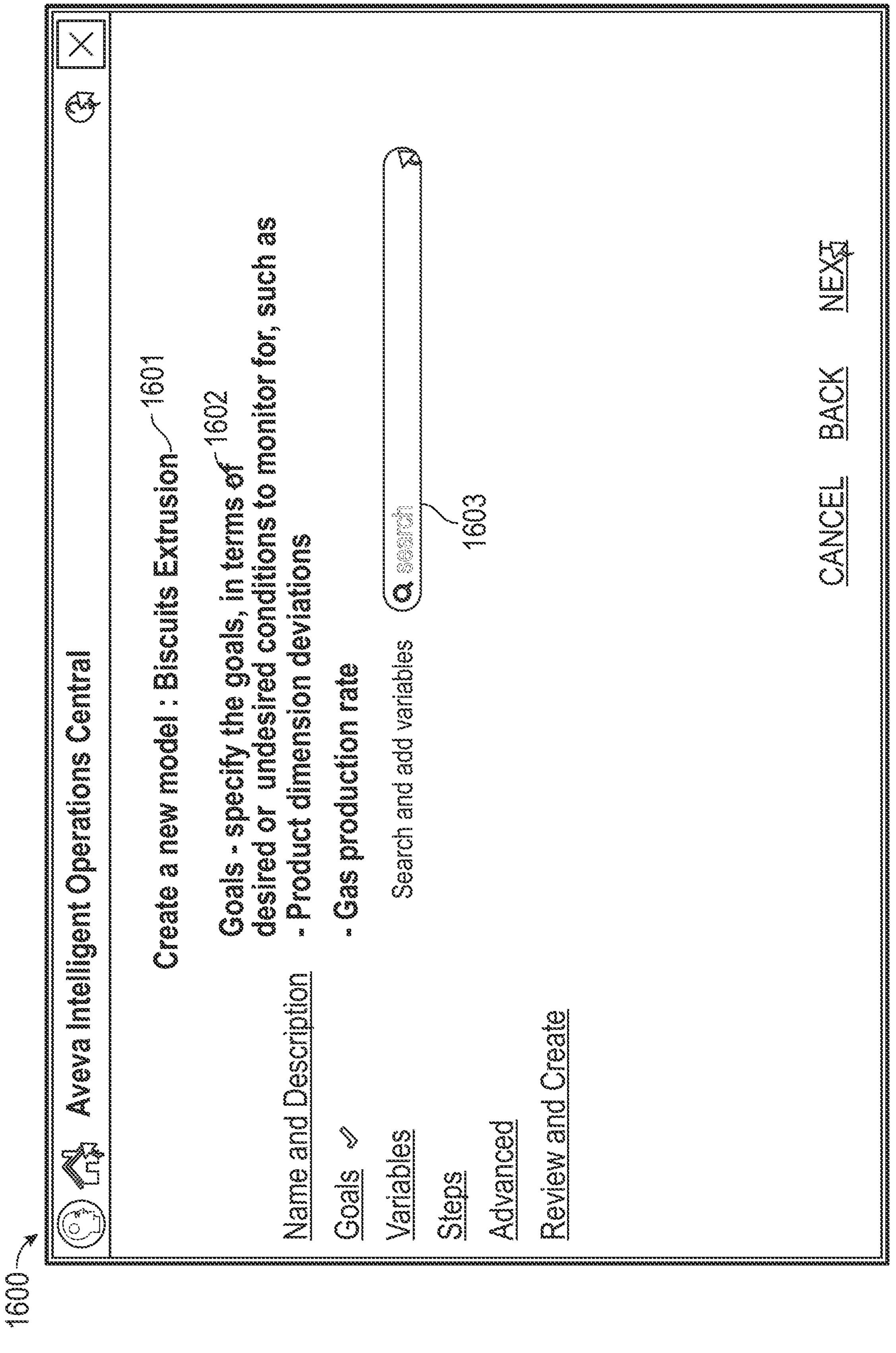
FIG. 16 show the goals page of the model creation process according to some embodiments.

FIG. 16 show the goals page 1600 of the model creation process according to some embodiments. In some embodiments, the goals page 1600 includes the name 1601 entered in the name section 1509 on the previous page. In some embodiments, the goals page prompts a user to consider the goals of the model in terms of desirable or undesirable conditions 1602. In some embodiments, once a user has an understanding of the goals of the model, the user can start a search 1603 for tags that are associated with achieving that goal.

Figure 17:
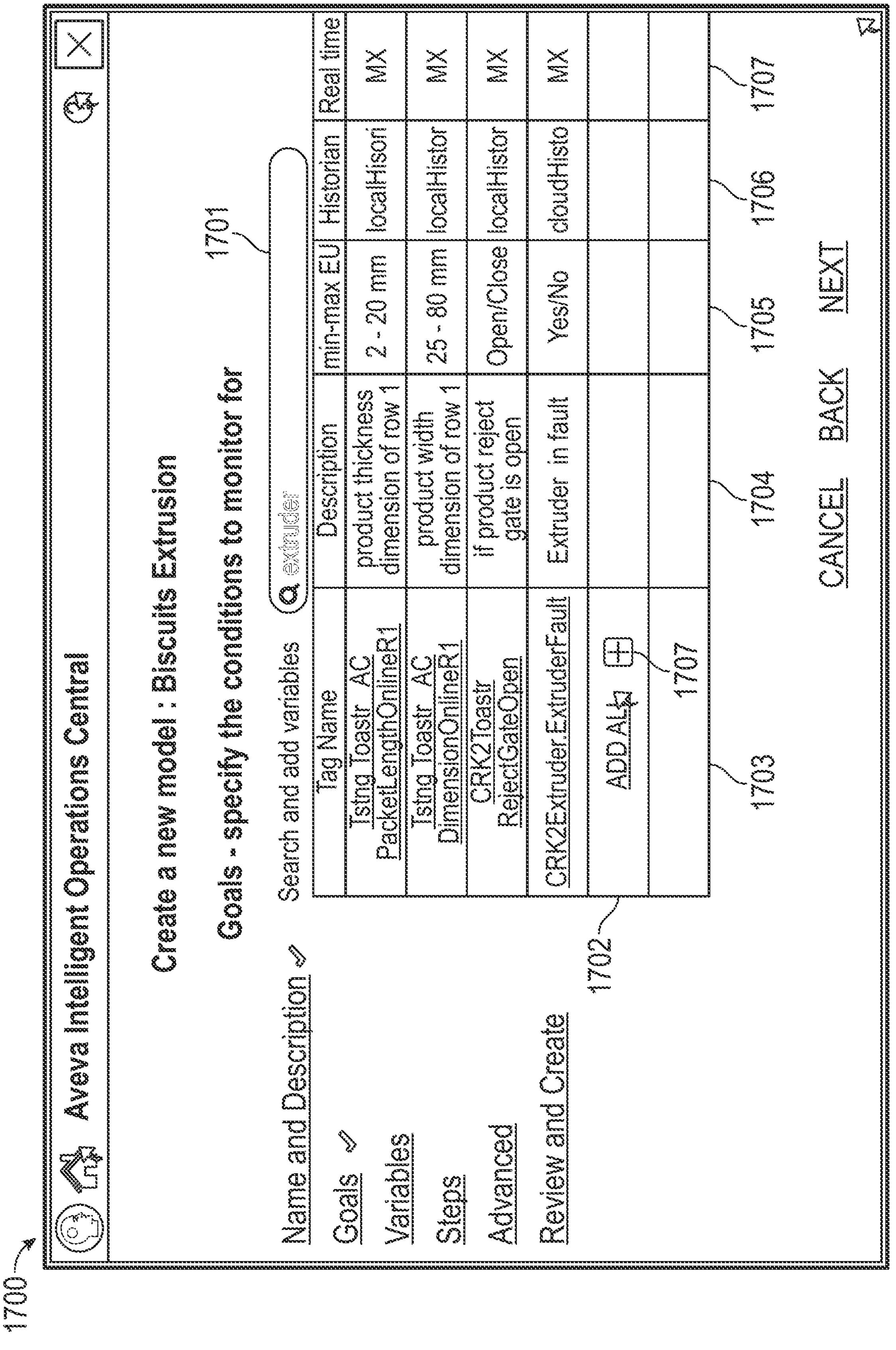
FIG. 17 shows a goals page after a user has entered search criteria into the variable search according to some embodiments.

FIG. 17 shows a goals page 1700 after a user has entered search criteria into the variable search 1603 according to some embodiments. In some embodiments, a user can enter a tag and/or process description into the variable search 1701 to search for tags containing the descriptive name and/or associated with the descriptive name. In some embodiments, one or more tags located can be added to a features tag list 1702. In some embodiments, the tag list 1702 comprises sections for one or more of a tag name 1703, description 1704, min-max values 1705, database location 1706, and/or real-time data source 1707. In some embodiments, after a user has selected all the tags to satisfy the goals, the tags can be added to the model by selecting an add button 1707.

Figure 18:
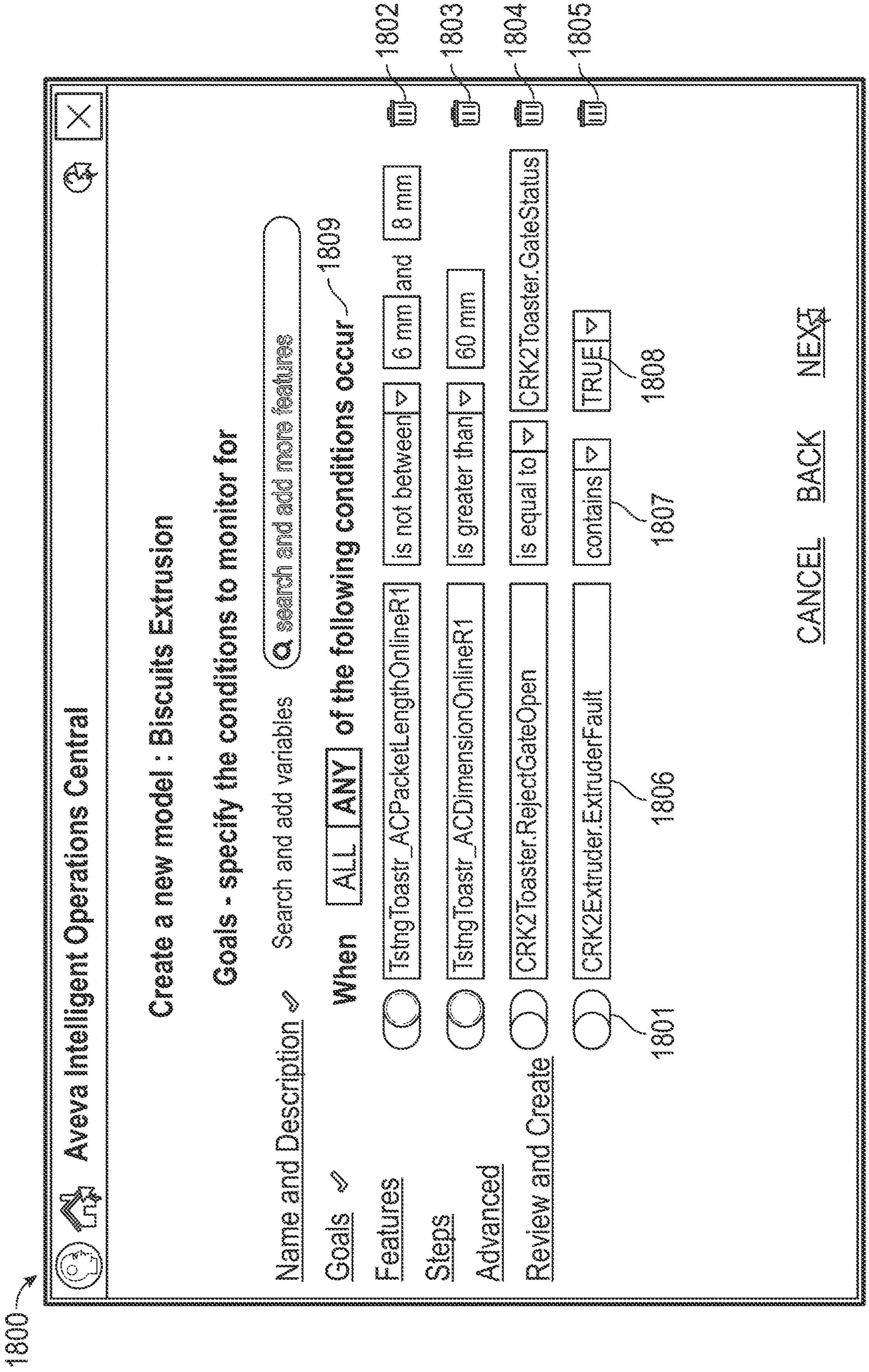
FIG. 18 shows a goals page after a user has selected the add button according to some embodiments.

FIG. 18 shows a goals page 1800 after a user has selected the add button 1707 according to some embodiments. In some embodiments, the goals page 1800 includes toggle switches 1801 for turning off and on tag conditions 1802-1805 (similar toggle switches represented by this basic shape are used on multiple pages). In some embodiments, tag conditions include a tag name section 1806, a condition statement section 1807, and a condition value section 1808 for setting alarms and/or alerts. In some embodiments, the system provides an additional condition section 1809 that allows a user to choose alarms/alerts ("alarms/alerts" is a reference to any notification that the system supports as described in this disclosure) for when any or all of the conditions 1802-1805 are met. In some embodiments, each of the tag conditions are configurable by the user to parameters used by the tags. In some embodiments, the system automatically selects the appropriate condition statement based parameters used by the tag. For example, in some embodiments, tag condition 1802 is based on a length parameter, and the condition provides an alarm when the length is not between (set in section 1807) a length of 6 and 8 millimeters (set in section 1808). In some embodiments, exemplary tag condition 1803 is based on a width parameter, and the condition provides an alarm when the width is greater than (set in section 1807) 60 millimeters (set in section 1808). In some embodiments, exemplarity tag condition 1803 is based on a value of one tag being equal to (set in section 1807) the value of another tag (set in section 1808). In some embodiments, exemplarity tag condition 1805 is based on an alarm tag containing (section 1807) a true value (section 1808) which indicates the alarm is active. In some embodiments, one or more conditions are conditions that the system's AI uses for decision making when monitoring the process. In some embodiments, any condition can be set for any system tag.

FIG. 19 shows a features page 1900 according to some embodiments. In some embodiments, the features page 1900 includes additional tags based on one or more of the previous user selected tags on the goals page 1700. In some embodiments, the features page is automatically populated with tags related to each of the user selected tags automatically. In some embodiments, the automatic tag selection is based on correlation analysis performed by the system. In some embodiments, the automatic tag selection is based on attribute mapping created manually and/or by the system using AI. In some embodiments, a user can add additional tags to the variables tag list 1901 using the variable search 1902. In some embodiments, the system monitors and provides analysis and counter measures as additional information to alarms as described previously and/or within embodiments presented below.

Figure 20:
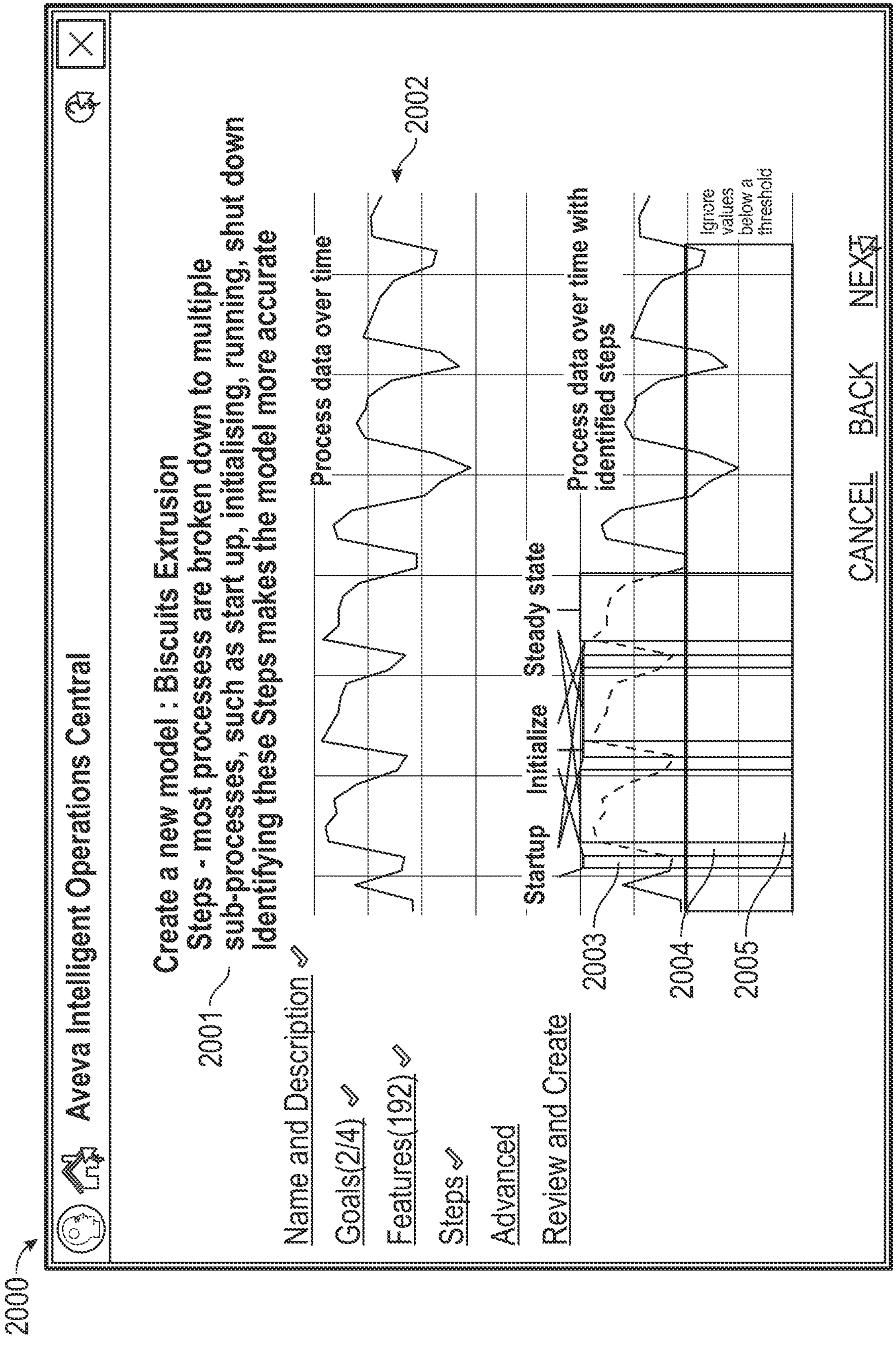
FIG. 20 shows the model creation steps page according to some embodiments.

FIG. 20 shows the model creation steps page 2000 according to some embodiments. In some embodiments, steps page 2000 includes a description section 2001 that instructs users how to break down process data 2002 into process steps 2003-2005. In some embodiments, process step 2003 can be a startup time period. In some embodiments, process step 2004 may be an initialization period step. In some embodiments, process step 2005 can be a steady state step. In some embodiments, once steps are labeled in the model, the system can use data and/or images created from these steps to identify corresponding steps throughout the labeled tag and/or other tags that have not been labeled (i.e., repeating patterns can be labeled once and applied to each occurrence automatically). In some embodiments, the system uses AI to correlate the steps (or sub-steps) for a tag to other data in the same process and/or different processes to generate alarms/alerts when anomalous conditions are detected. For example, the system may correlated a product width parameter with data from an extruder temperature tag initialization step, where such a relationship was previously unknown, and provide the new relationship in the information section of an alarm/alert.

Figure 21:
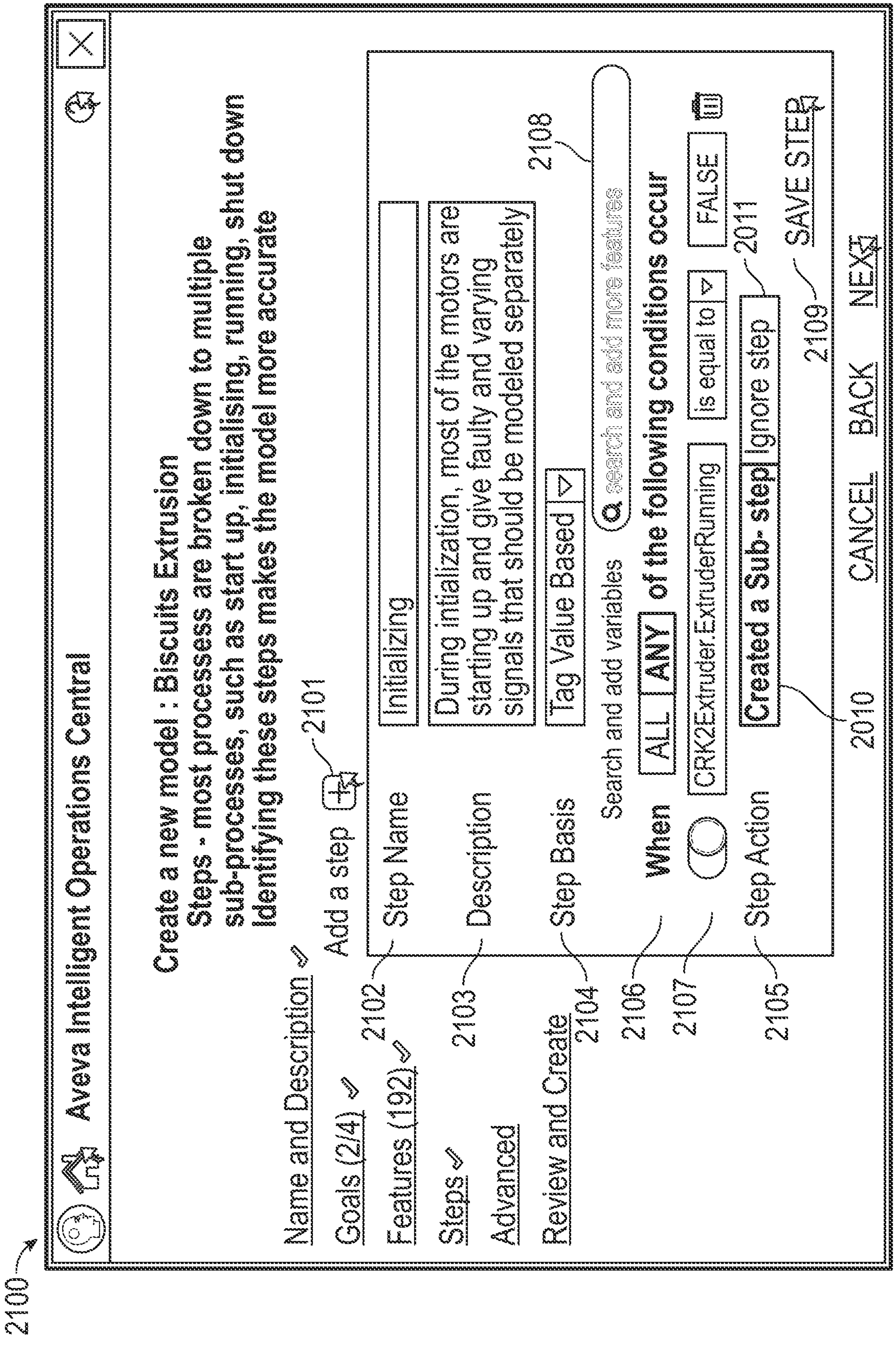
FIG. 21 shows adding steps to the model on the steps page according to some embodiments.

FIG. 21 shows adding steps to the model on the steps page 2100 according to some embodiments. In some embodiments, a user can add a step by selecting the add step button 2101. In some embodiments, the user is present with one or more sections to add a step name 2102 and/or description 2103. For example, the step name 2102 could be "initializing" and/or the description 2103 could state "during initialization, most of the motors are starting up and give faulty and varying signals that should be modeled separately" according to some embodiments. In some embodiments, the steps page 2100 includes inputs to establish step basis 2104, step action 2105, and/or an "any/all" condition 2106. In some embodiments, the steps page 2100 includes a condition 2107 that includes a toggle switch, additional features search 2108, and/or a save step button 2109. In some embodiments, the step name 2102 and description 2103 is used by the system to label current and/or different processes that match the data and/or image value associated with the step. In some embodiments, the step basis 2104 defines what type of data is being input into the model (e.g., tag data or image data). In some embodiments, the condition 2107 includes a tag name, a condition operator (e.g., "is equal to"), and a trigger value (e.g., "false") similar to that previously discussed. In some embodiments, the step action section 2105 can be used to label the step as a sub-step 2010 when the condition is met. In some embodiments, the time range defined by sub-step 2010 is excluded by the system when creating the model. In some embodiments, when the condition 2107 is not met the time frame defined by the tag condition 2107 is included in the model. In some embodiments, the data from the sub-step is excluded from the main model and stored in the database for use during system analysis and/or in a different model. In some embodiments, step action section 2105 includes a selectable ignore step 2011 option when condition 2107 is met. In some embodiments, ignore step 2011 excludes the condition 2107 data from the model. In some embodiments, the system uses the time range for when the condition 2107 is met and labels another tag's corresponding time range with the step name 2102 (i.e., the timeframe of the condition tag 2107 is used to label one or more tags from features list 1702 and/or variables list 1901).

Figure 22:
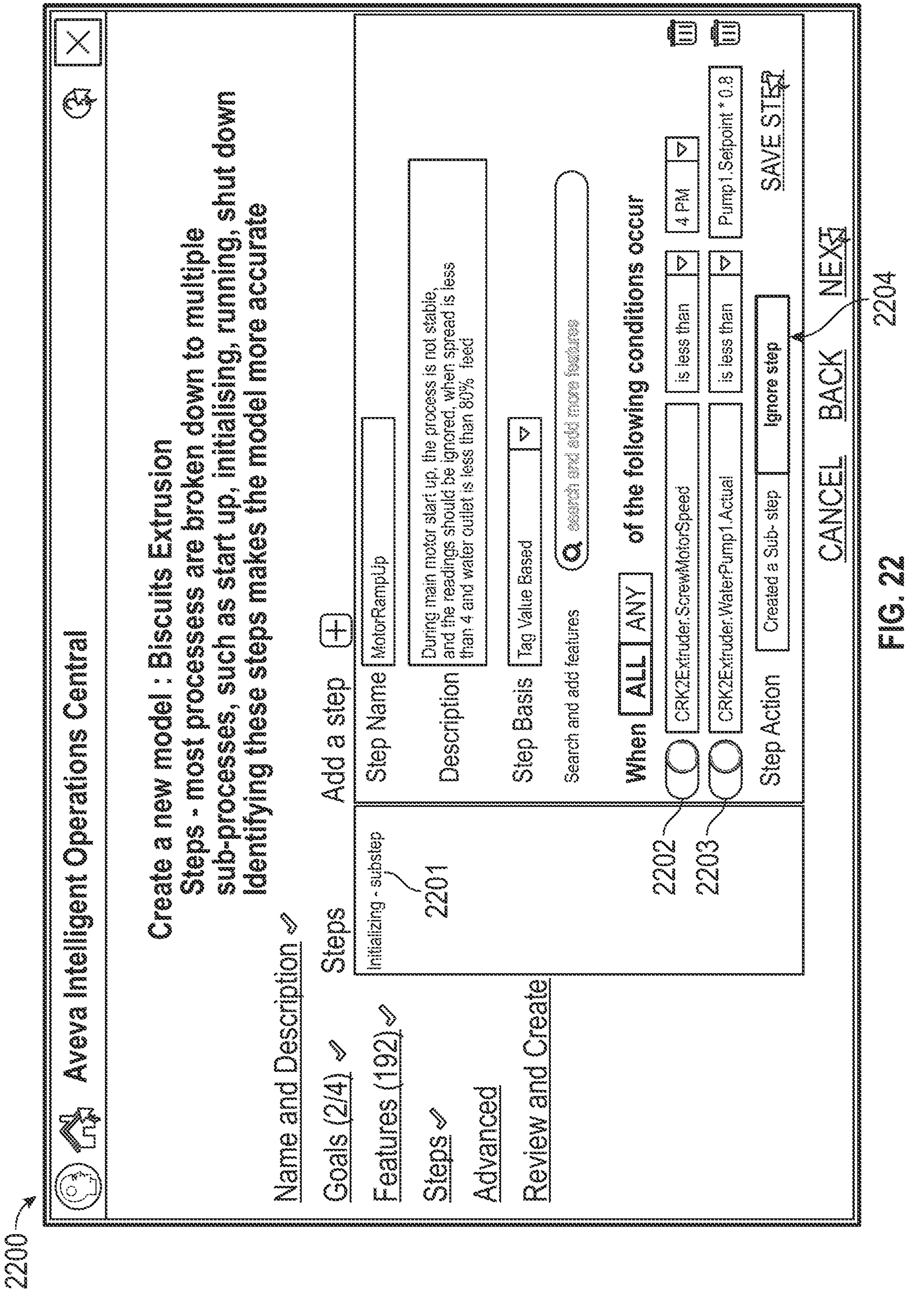
FIG. 22 shows an example of creating an additional step for the main model according to some embodiments.

FIG. 22 shows an example of creating an additional step 2200 for the main model according to some embodiments. In some embodiments, the browser is similar to steps page 2100. In some embodiments, previously created steps are listed in steps section 2201. In some embodiments, a step can be defined by multiple conditions 2202 and 2203. For example, a time period for the main model can be identified by the rpm of an extruder screw motor speed and/or by the actual value of a water pump tag (e.g., flowrate, amps, etc.) being some percentage of a setpoint. In some embodiments, when both conditions are met the model is configured to ignore the step 2204.

Figure 23:
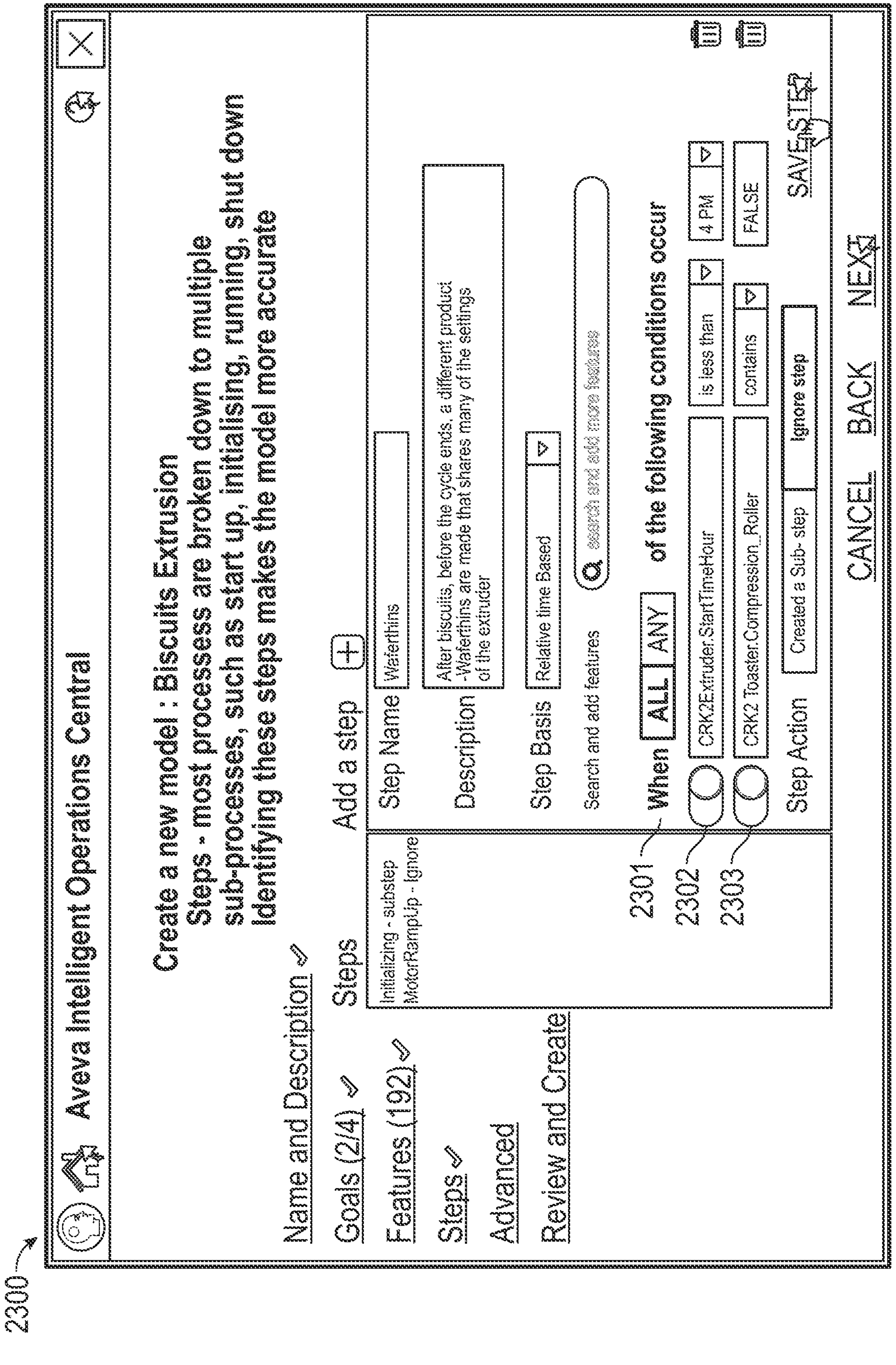
FIG. 23 depicts using the system to define steps where a different type of product is being run according to some embodiments.

FIG. 23 depicts using the system to define steps where a different type of product is being run 2300 according to some embodiments. In some embodiments, the equipment used to make the product in the main model is the same equipment used to make a different product. In some embodiments, the system allows the time period another product is made to be labeled as a sub-step and/or to be ignored. For example, a first condition 2302 can be when an extruder start time is less than a certain time. In some embodiments, a second condition 2303 can be when another component such as a roller is not running In some embodiments, when any/all condition 2301 is selected as "all," the system creates a sub-step (sub-steps are not used in the main model but still serves to identify a tag feature and are therefore saved in the database) and/or ignores the time period in the main model.

Figure 24:
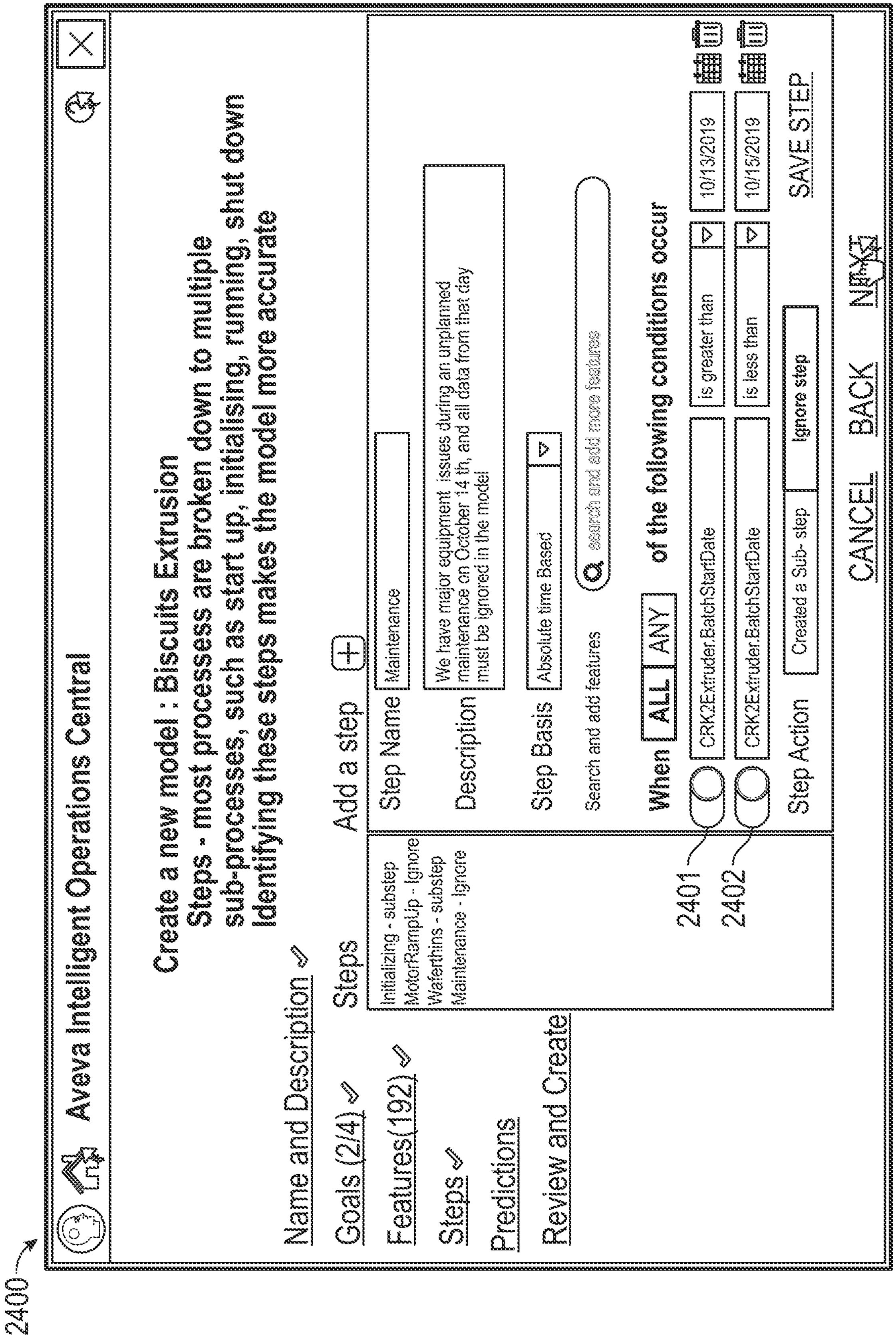
FIG. 24 shows a steps page used to exclude a specific period of time according to some embodiments.

FIG. 24 shows a steps page 2400 used to exclude a specific period of time according to some embodiments. In some embodiments, the specific period of time is a maintenance period. In some embodiments, a first condition 2401 can be used to set a start time (e.g, greater than some date) for the exclusion. In some embodiments, a second condition 2402 can be used to set an end time (e.g., less than some date) for the time period exclusions.

Figure 25:
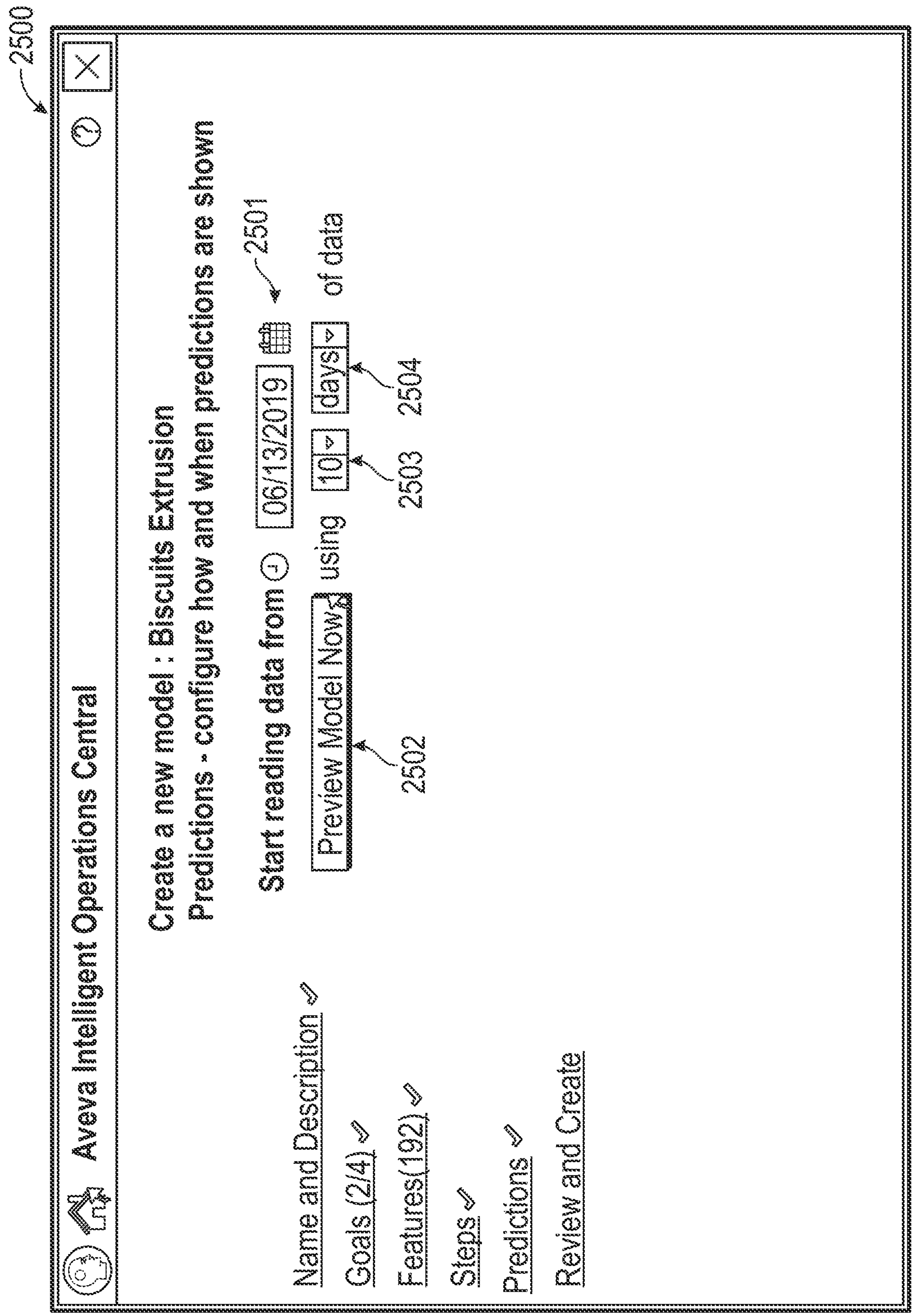
FIG. 25 shows a predictions page according to some embodiments.

FIG. 25 shows a predictions page 2500 according to some embodiments. In some embodiments, the predictions page. In some embodiments, the predictions page (labeled as advanced in some embodiments) allows a user to configure how and/or when predictions are shown. In some embodiments, the predictions page includes a "start reading data from" date and/or time selection 2501. In some embodiments, predictions page 2500 includes a preview button 2502 to preview the model and/or execute model training (using AI) by selecting a number 2503 for the time type 2504 (e.g., days, hours, minutes) of data. For example, the time and/or date selection 2501 may be 4 months previous to the current date according to some embodiments. In some embodiments, the number 2503 is set to 10 while the time type 2504 is set to days. In some embodiments, the values in the number 2503 and time type 2504 defines the amount of data used for training and/or previewing the model.

Figure 26:
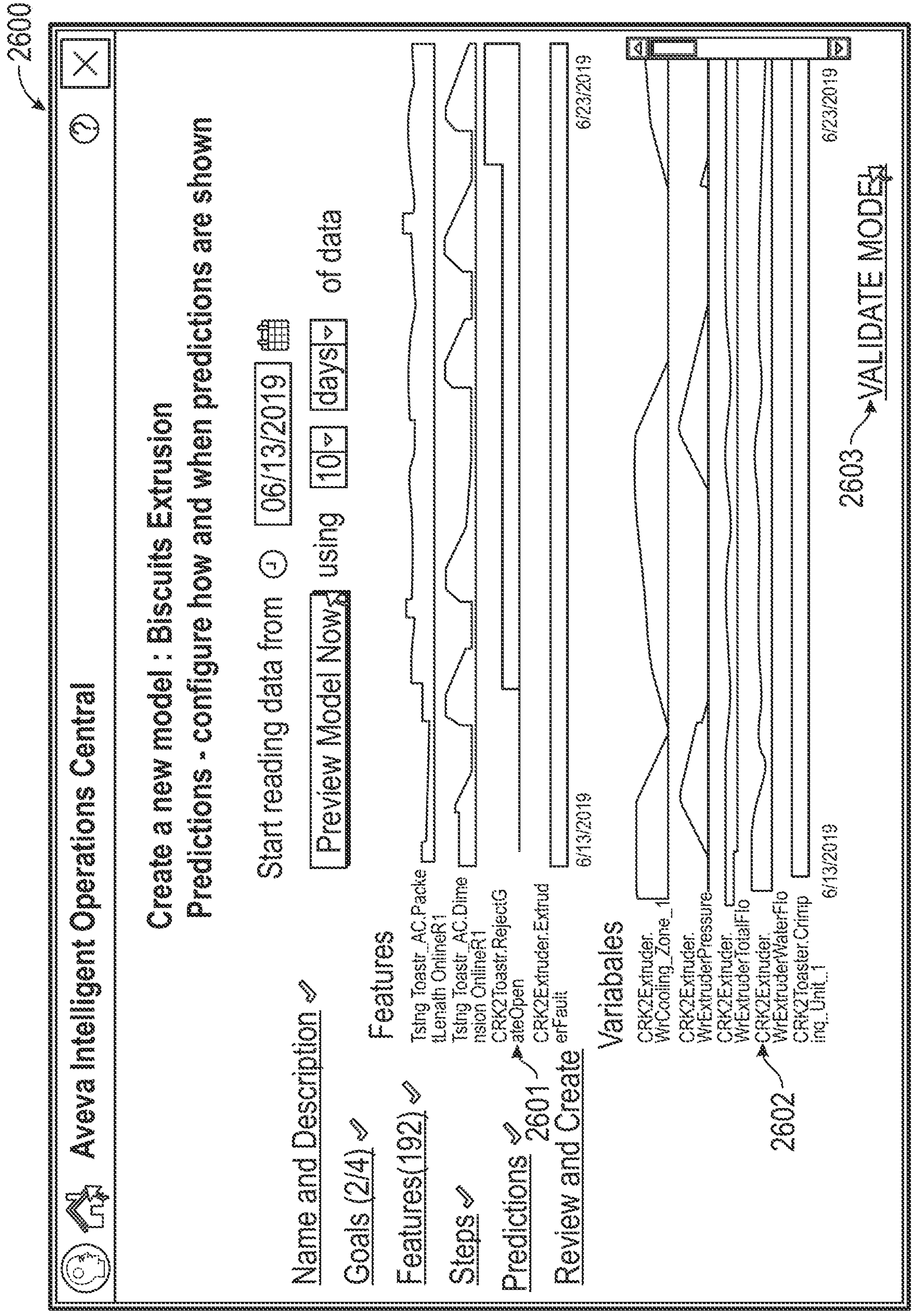
FIG. 26 shows a predictions page after the preview model now button has been selected according to some embodiments.

FIG. 26 shows a predictions page 2600 after the preview model now button 2502 has been selected according to some embodiments. In some embodiments, prediction page 2600 includes a features preview 2601 and a variables preview 2602. In some embodiments, the features preview 2601 includes the information from the tags listed in the features list 1702. In some embodiments, the variables preview includes the information from the variables list 1901. In some embodiments, after the model is created it can be validated using the validate model button 2603.

Figure 27:
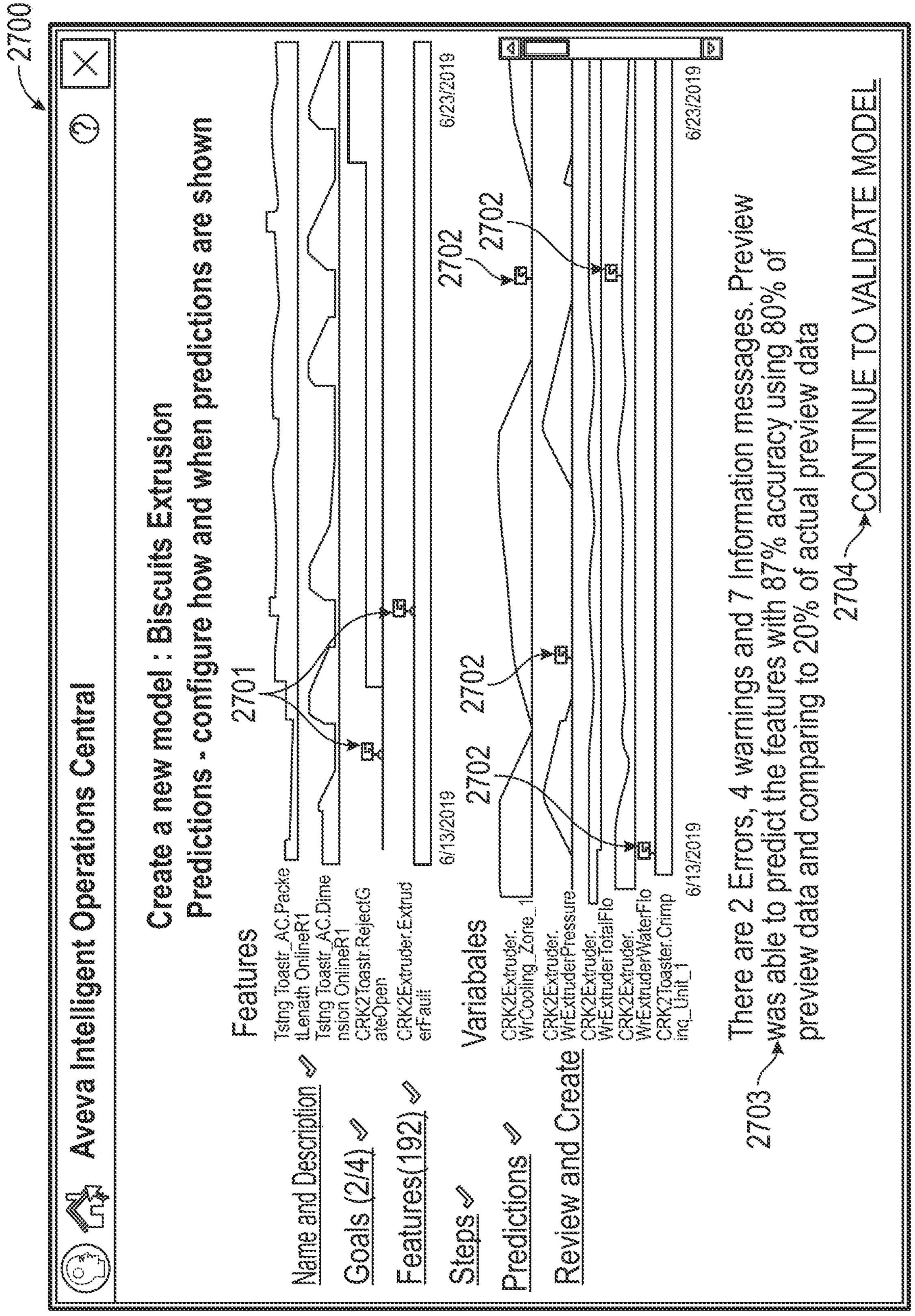
FIG. 27 shows a predictions page after a the validate model button has been selected according to some embodiments.

FIG. 27 shows a predictions page 2700 after a the validate model button 2603 has been selected according to some embodiments. In some embodiments, the system labels the tag information (e.g., spark lines) with one or more error icons 2701 at the location and/or time the error is associated with. In some embodiments, the system labels the tag information with one or more warning icons 2702. In some embodiments, the system provides information 2703 in the browser that describes the number of errors, warnings, and/or information messages. In some embodiments, the details for the errors, warnings, and/or information messages can be viewed by selecting the continue to validate button 2704.

Figure 28:
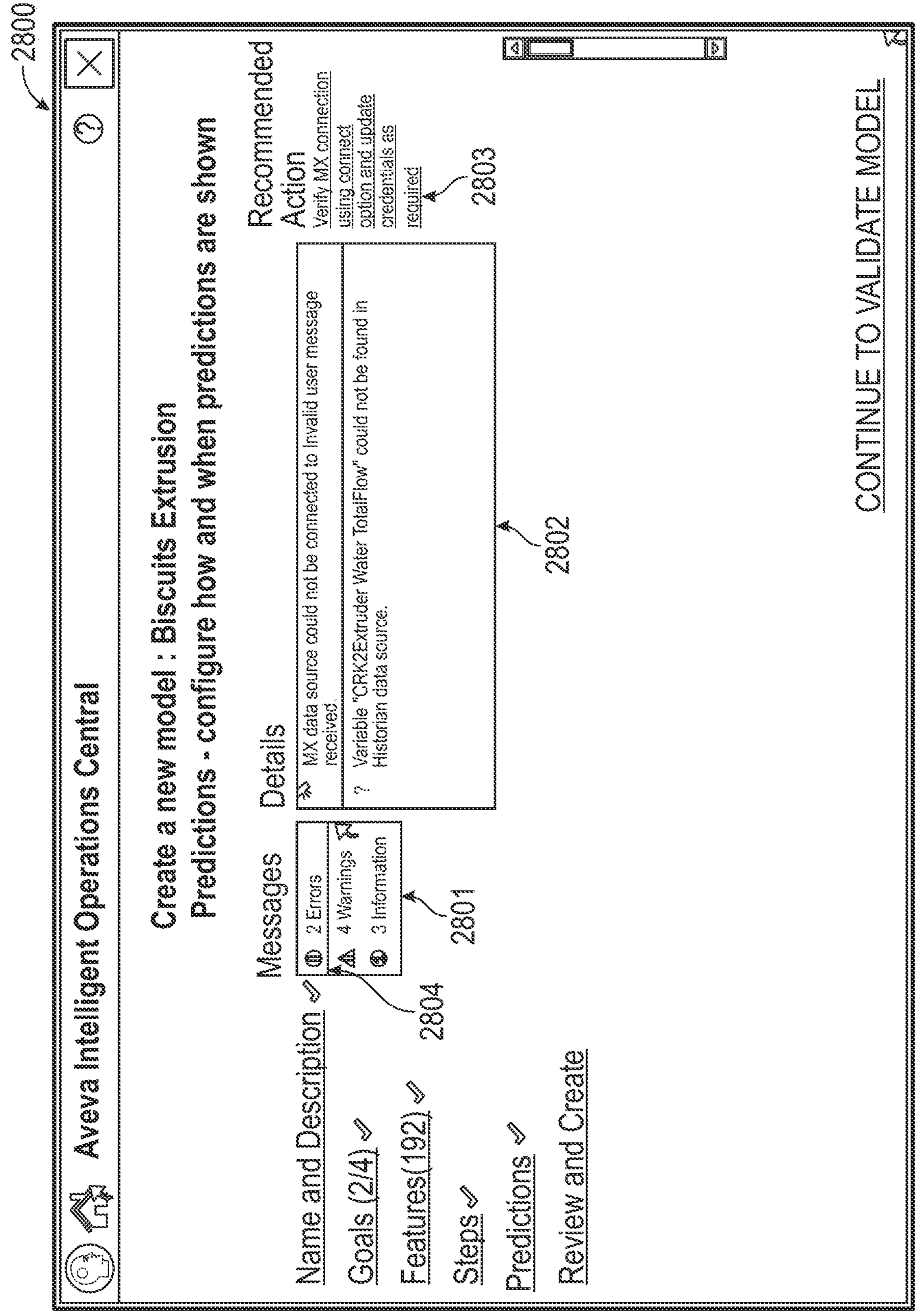
FIG. 28 show a predictions page after the continue to validate button has been selected according to some embodiments.

FIG. 28 show a predictions page 2800 after the continue to validate button 2704 has been selected according to some embodiments. In some embodiments, the predictions page 2800 comprises a messages section 2801, a details section 2802, and a recommended action section 2803. In some embodiments, the message selection 2801 allows a user to select the each of the errors, warnings, and/or information messages the system reported on predictions page 2700. For example, in some embodiments, the errors 2804 are selected for review. In some embodiments, the system provides a detailed explanation for the errors in the details box 2802. In some embodiments, the system provides countermeasures for the errors in the recommended action section 2803. In some embodiments, the details and/or recommended actions are a product of one or more of manual data entry and/or AI analysis using any of the techniques described in this disclosure. For example, the system could report that one or more data sources could not be connected in details section 2802 and recommend that the user verify the connection using a recommended software and/or update credentials according to some embodiments.

Figure 29:
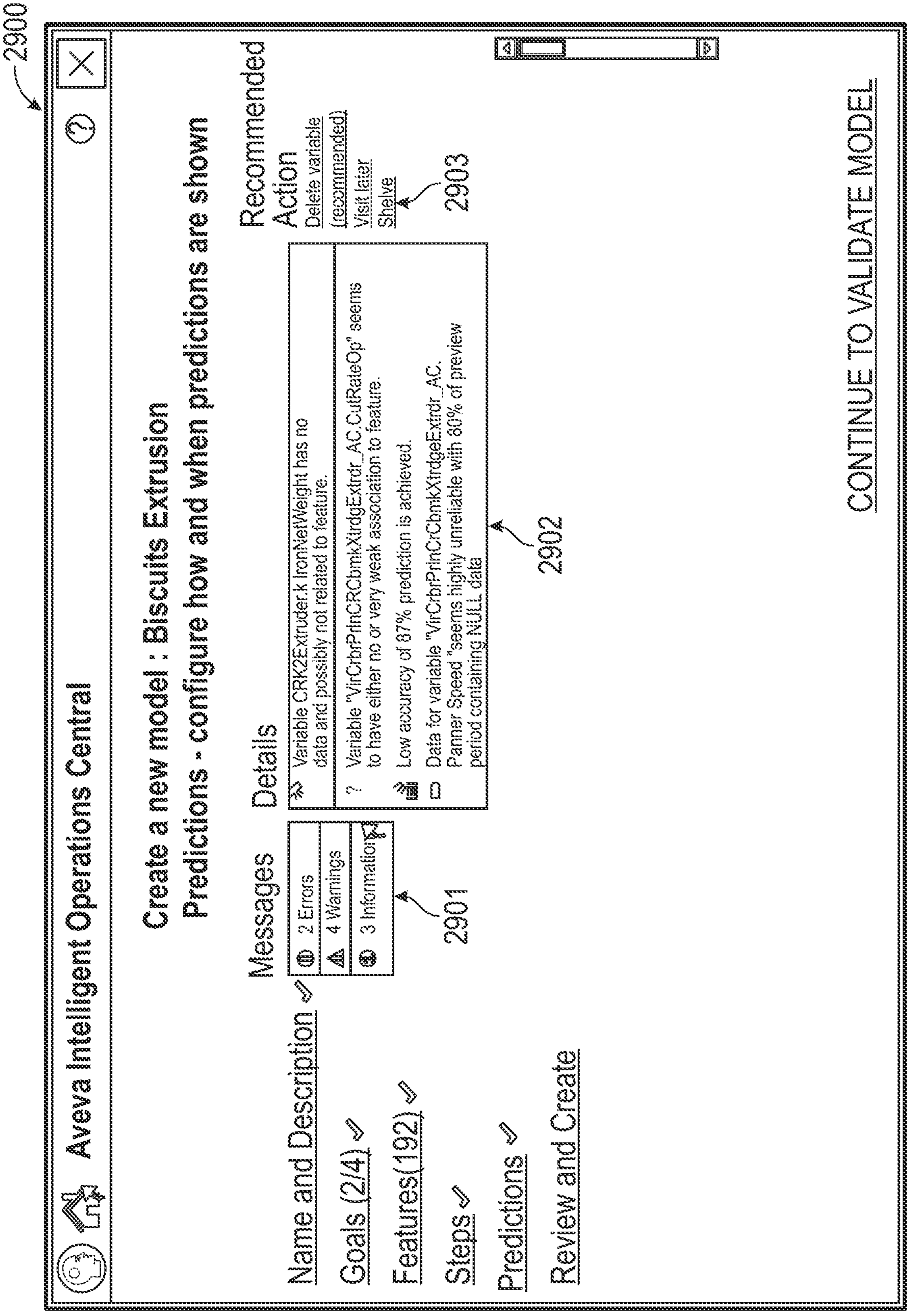
FIG. 29 shows the predictions page where a user has selected "warnings" in the messages section according to some embodiments.

FIG. 29 shows the predictions page 2900 where a user has selected "warnings" in the messages section 2901 according to some embodiments. In some embodiments, message section 2901, details section 2902, and a recommended action section 2903 present a similar information type as corresponding sections error section in the predictions page 2800 except specific to warning. For example, the details section 2902 can display information stating that a particular variable has no data associated with it and/or does not correlate to the goals (i.e., tags in features list 1702). In some embodiments, the recommended action section 2903 can suggest that the user delete the variable, review the variable at a later time, and/or keep the variable if it is determined that the tag may be populated with relevant data at some other time.

Figure 30:
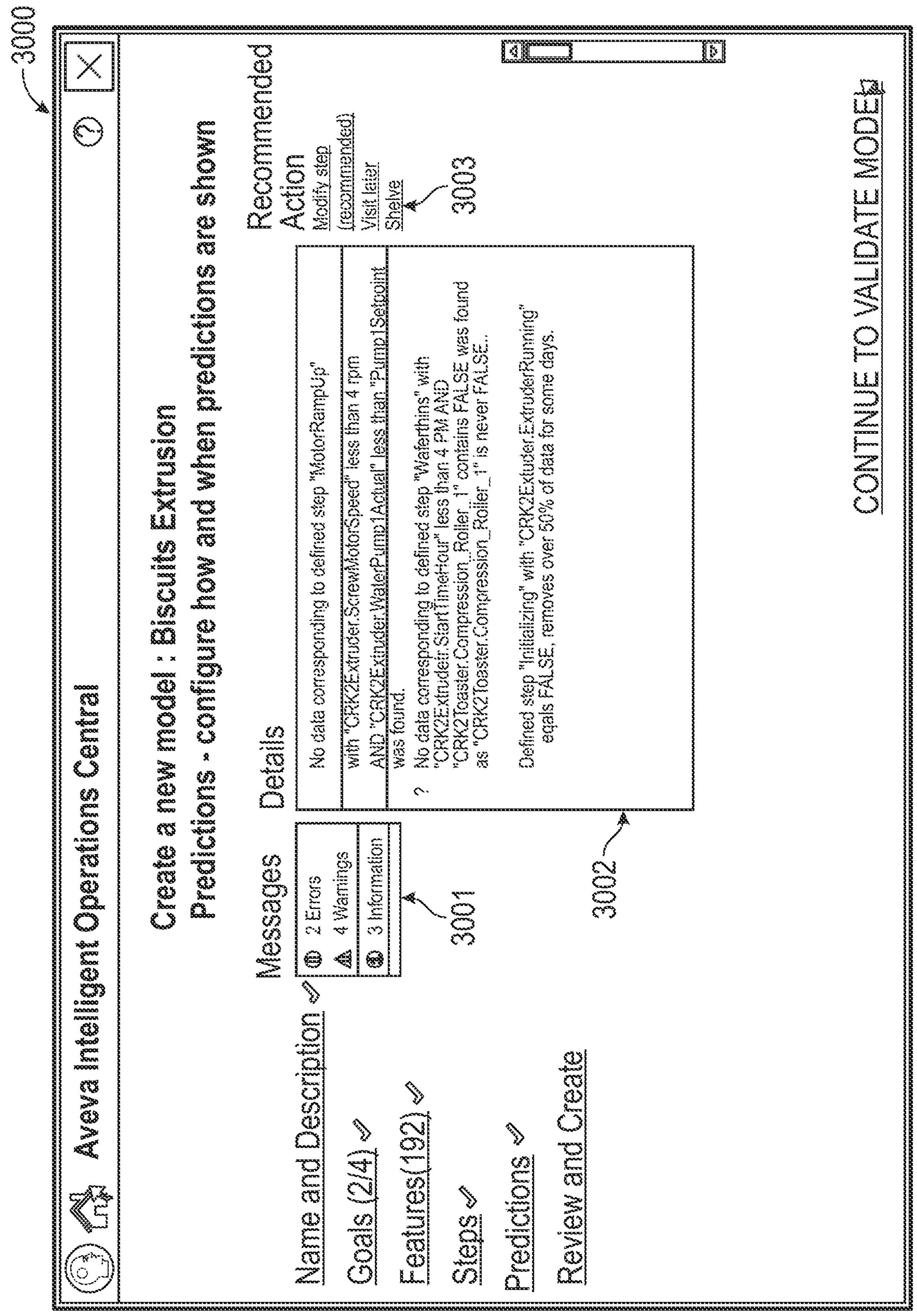
FIG. 30 shows a predictions page where a user has selected "information" in the messages section according to some embodiments.

FIG. 30 shows a predictions page 3000 where a user has selected "information" in the messages section 3001 according to some embodiments. In some embodiments, message section 3001, details section 3002, and a recommended action section 3003 present a similar information type as a corresponding "alarm" section in the predictions page 2800 except specific to information. For example, the details section 3002 for information selection 3001 can include a list of variables used to define steps that did not have any data to be omitted (e.g., a flatline graph) according to some embodiments. In some embodiments, the system can recommend modifying the step and/or defining a different time period in the recommended action section 3003 as non-limiting examples.

Figure 31:
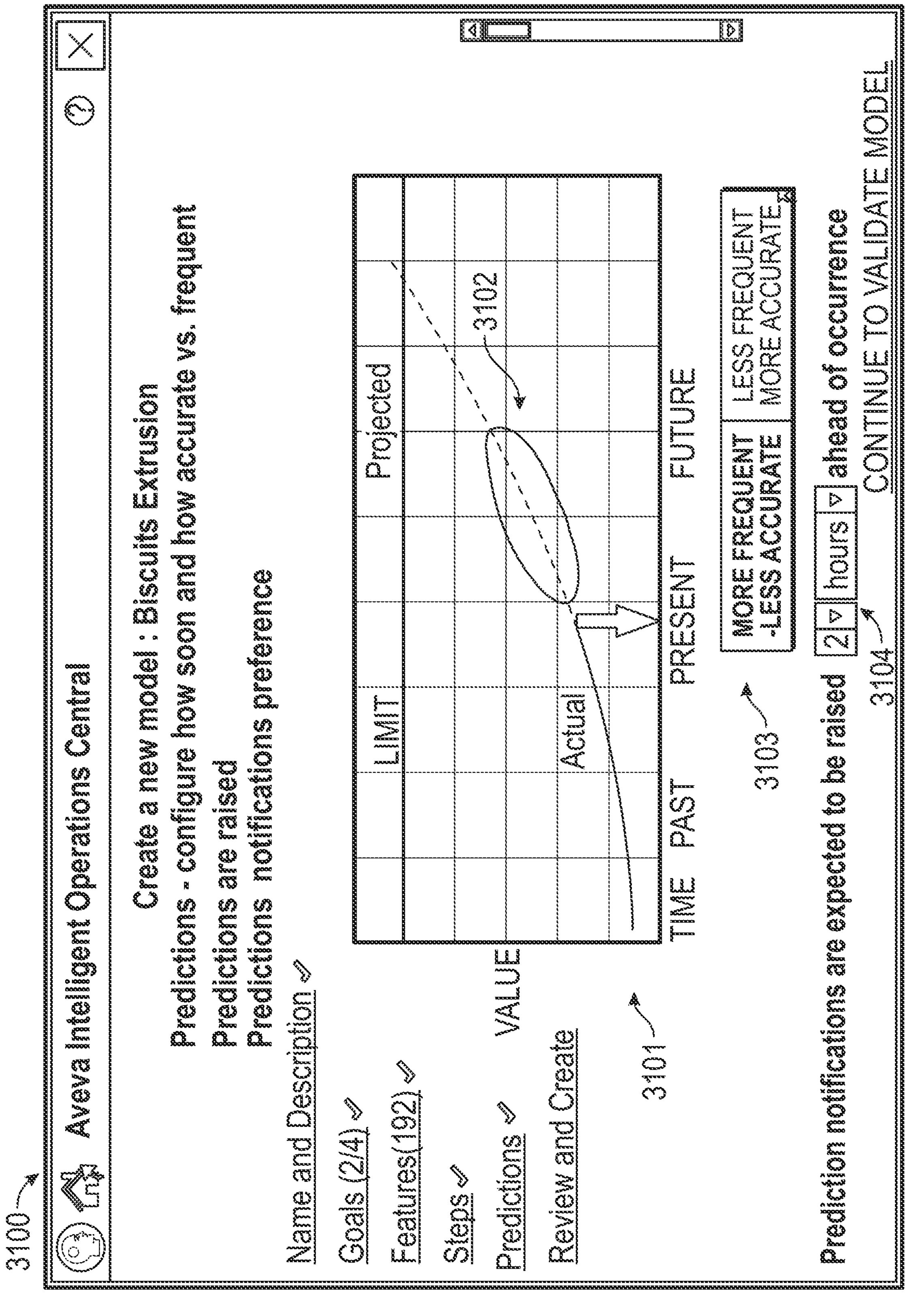
FIG. 31 shows a predictions page where the user can configure notification preferences for the way the system shows information according to some embodiments.

FIG. 31 shows a predictions page 3100 where the user can configure notification preferences for the way the system shows information according to some embodiments. In some embodiments, the notifications preference 3101 allows a user to choose a more frequent 3102 option using the preference button 3103. In some embodiments, more frequent option 3102 configures the system to notify a user by alarm/alert when a trend or value is projected to exceed a limit before a time set in time frame 3104. For example, the system can display an alarm/alert two hours before a limit is expected to be reached. In some embodiments, selecting the more frequent option is less accurate because the projected value extends over a greater period of time. In some embodiments, a more frequent setting gives a user more time to react.

Figure 32:
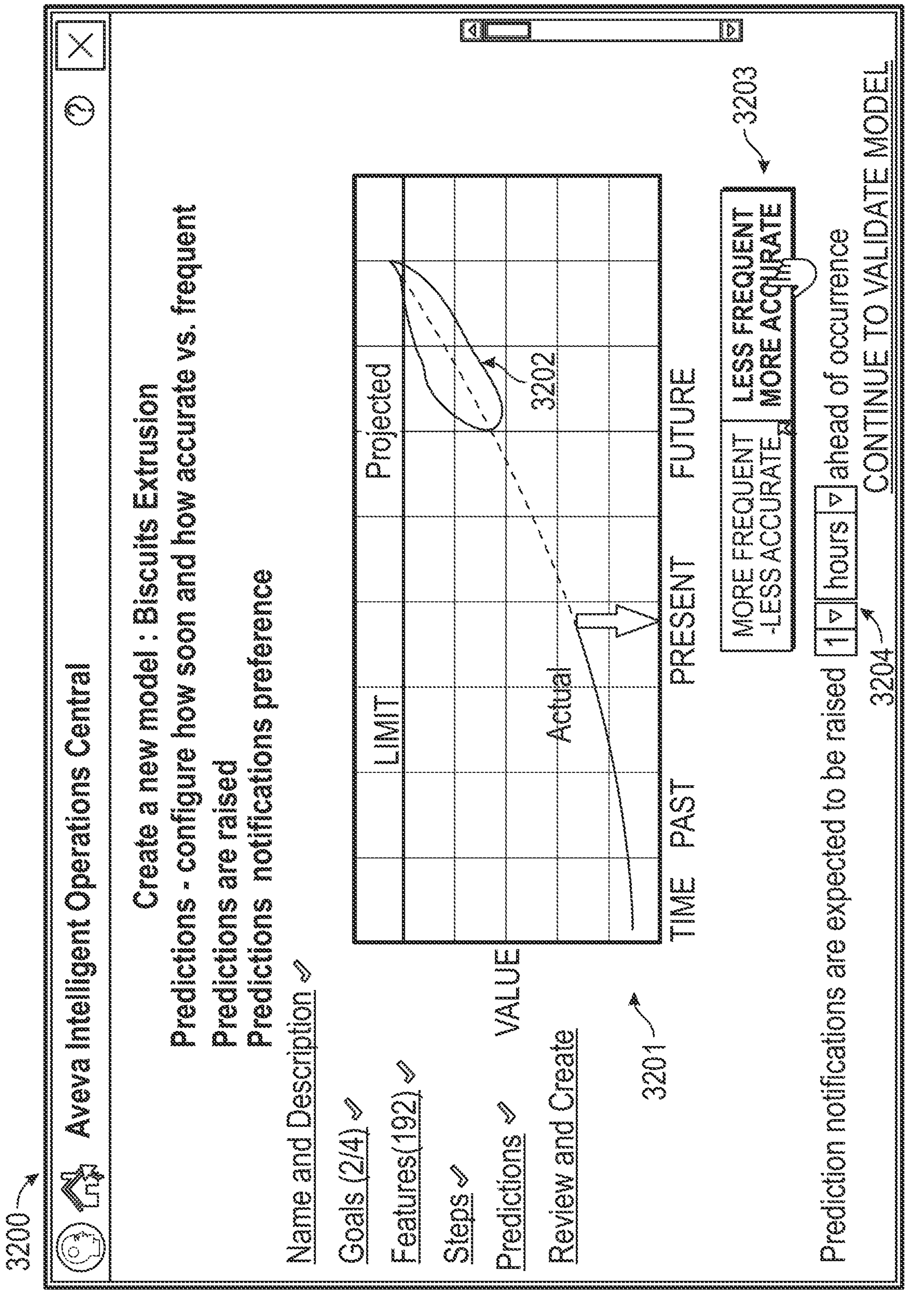
FIG. 32 shows a predictions page where a less frequent, more accurate preference has been selected according to some embodiments.

FIG. 32 shows a predictions page 3200 where a less frequent, more accurate preference has been selected. In some embodiments, the notifications preference 3201 allows a user to choose a less frequent 3202 option using the preference button 3203. In some embodiments, the less frequent option 3102 configures the system to notify a user by alarm/alert when a trend or value is projected to exceed a limit before a time set in time frame 3204 that is less than time from 3104. For example, the system can display an alarm/alert one hour before a limit is expected to be reached. In some embodiments, selecting the less frequent option is more accurate because the projected value used is closer to the tag's limit In some embodiments, a less frequent setting gives a user less time to react.

Figure 33:
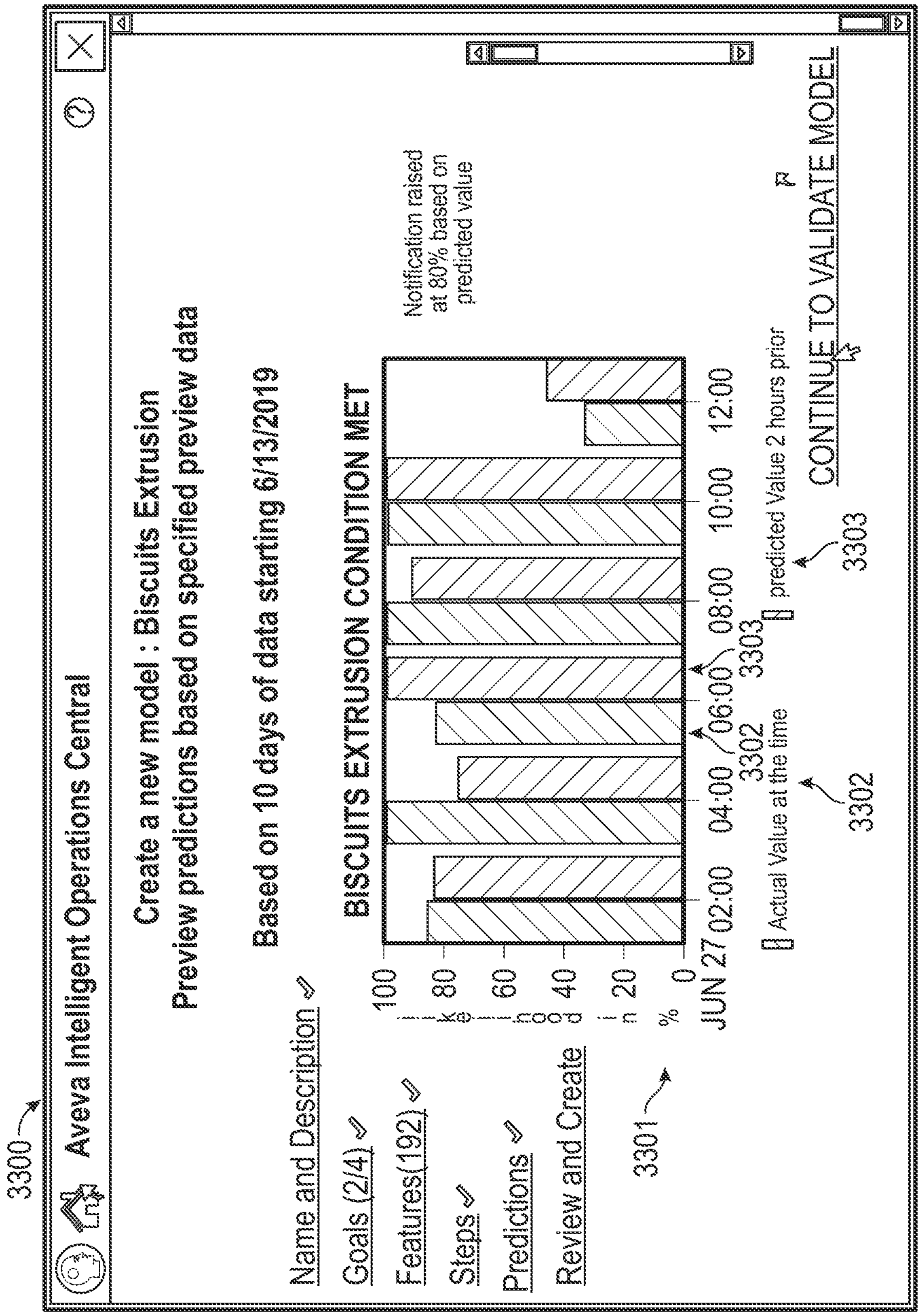
FIG. 33 shows a predictions page with some results of the main model's predicted values versus actual values according to some embodiments.

FIG. 33 shows a predictions page 3300 with some results of the main model's predicted values versus actual values according to some embodiments. In some embodiments, the system presents a display 3301 (e.g., a bar graph, pie graph, etc.) showing a projected value 3303 at a specified time for a trend prediction versus the actual value 3302 at the same specified time for a trend prediction. In some embodiments, each actual 3302 and predicted 3303 values on the display 3301 are associated with a different goal (i.e. one tag from features tag list 1702). In some embodiments, each actual 3302 and predicted 3303 values on the display 3301 are associated with a different goal. In some embodiments, each actual 3302 and predicted 3303 values on the display 3301 are associated with a mixture of same and different goals (e.g., two bar sections are associated with one tag while the other 3 bar sections are each associated with a different tag). In some embodiments, each actual 3302 and predicted 3303 values on the display 3301 are associated with the same and/or different tags from the variables tag list 1901. In some embodiments, each actual 3302 and predicted 3303 values on the display 3301 are associated with any possible combination of tags from the features tag list 1702 and/or variables tag list 1901. In some embodiments, the display 3301 shows likelihood of prediction occurring in percent versus time. In some embodiments, notifications and/or alarms/alerts are displayed by the system when the likelihood of occurrence reaches a certain percentage (e.g., 80%).

Figure 34:
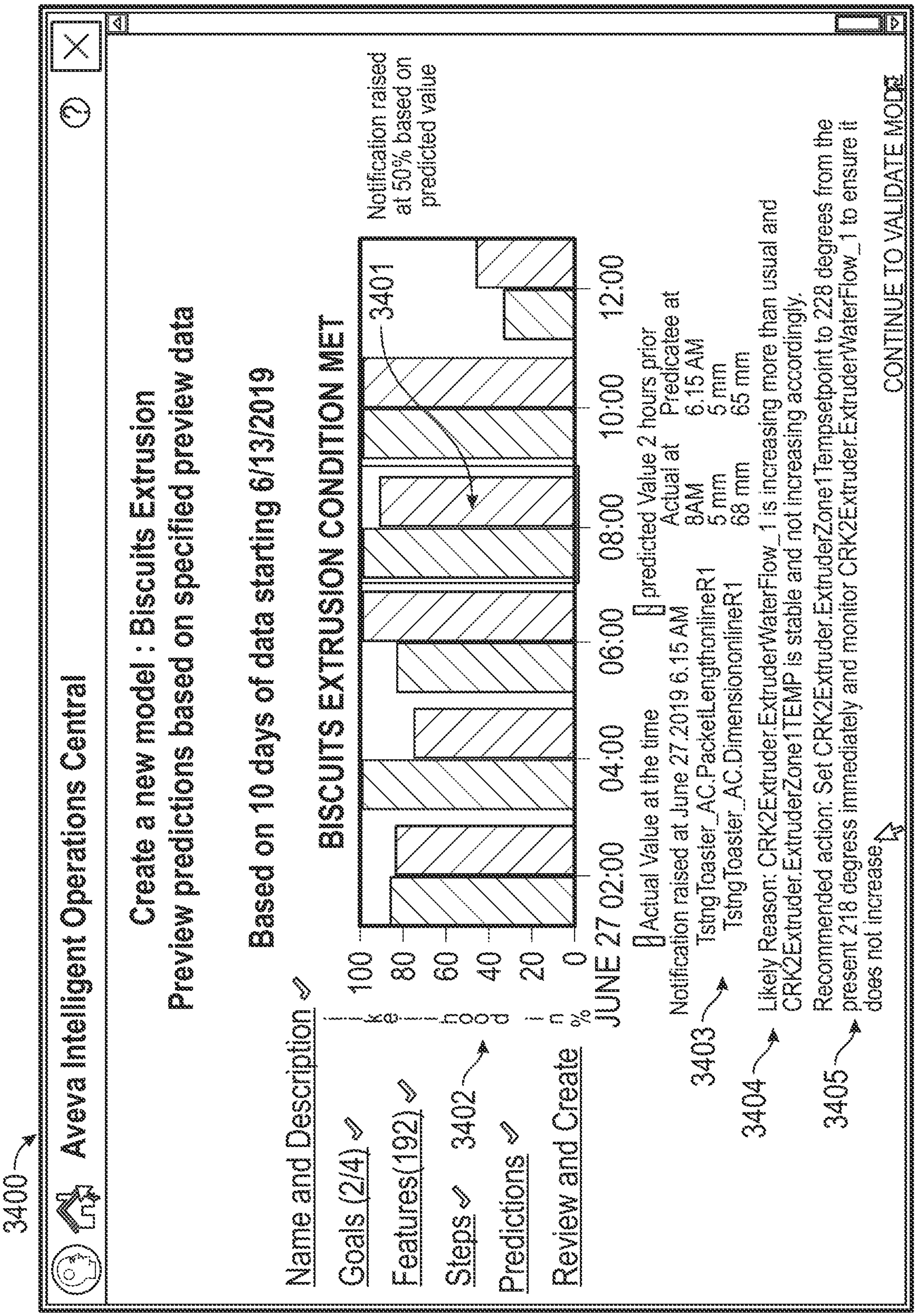
FIG. 34 shows a predictions page where a user has selected a portion of the display 3402 to receive details about the modeling results according to some embodiments.

FIG. 34 shows a predictions page 3400 where a user has selected 3401 a portion of the display 3402 to receive details about the modeling results according to some embodiments. In some embodiments, the details include an overview section 3403. In some embodiments, the overview section 3403 includes the time and/or date the notification was raised, a listing of the tags associated with the selection 3401, value at predicted time for each tag, and/or value at actual time for each tag. In some embodiments, analysis section 3404 displays one or more likely root causes for the alarm (using any system tools described in this disclosure). In some embodiments, recommendation section 3405 displays one or more recommended corrective actions for the alarms (using any system tools described in this disclosure).

Figure 35:
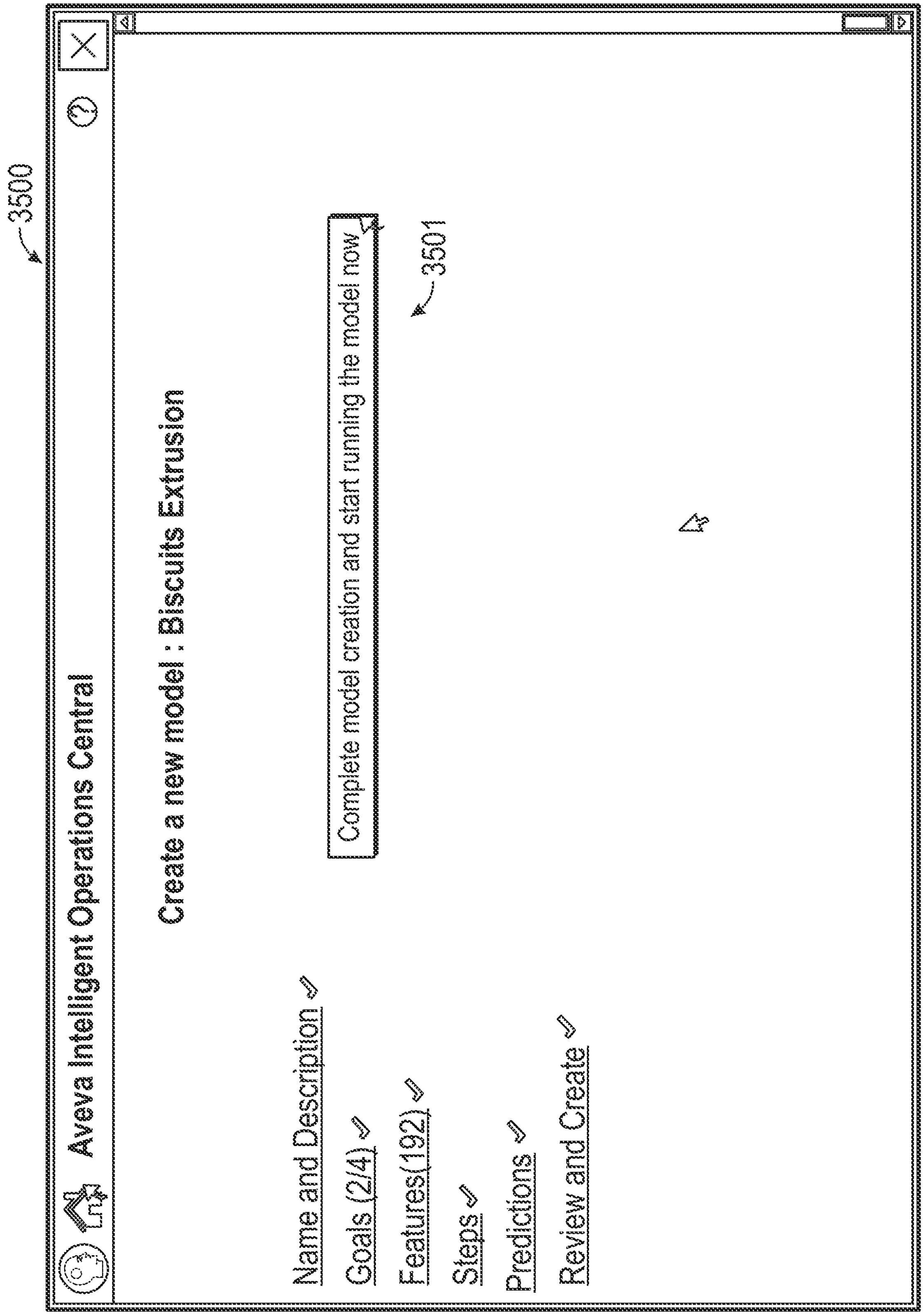
FIG. 35 shows a review and create page according to some embodiments.

FIG. 35 shows a review and create page 3500 according to some embodiments. In some embodiments, after the user is satisfied with the results of the model validation the user can select the create button 3501 which finishes the model creation process and starts running the model using real time production values.

Figure 36:
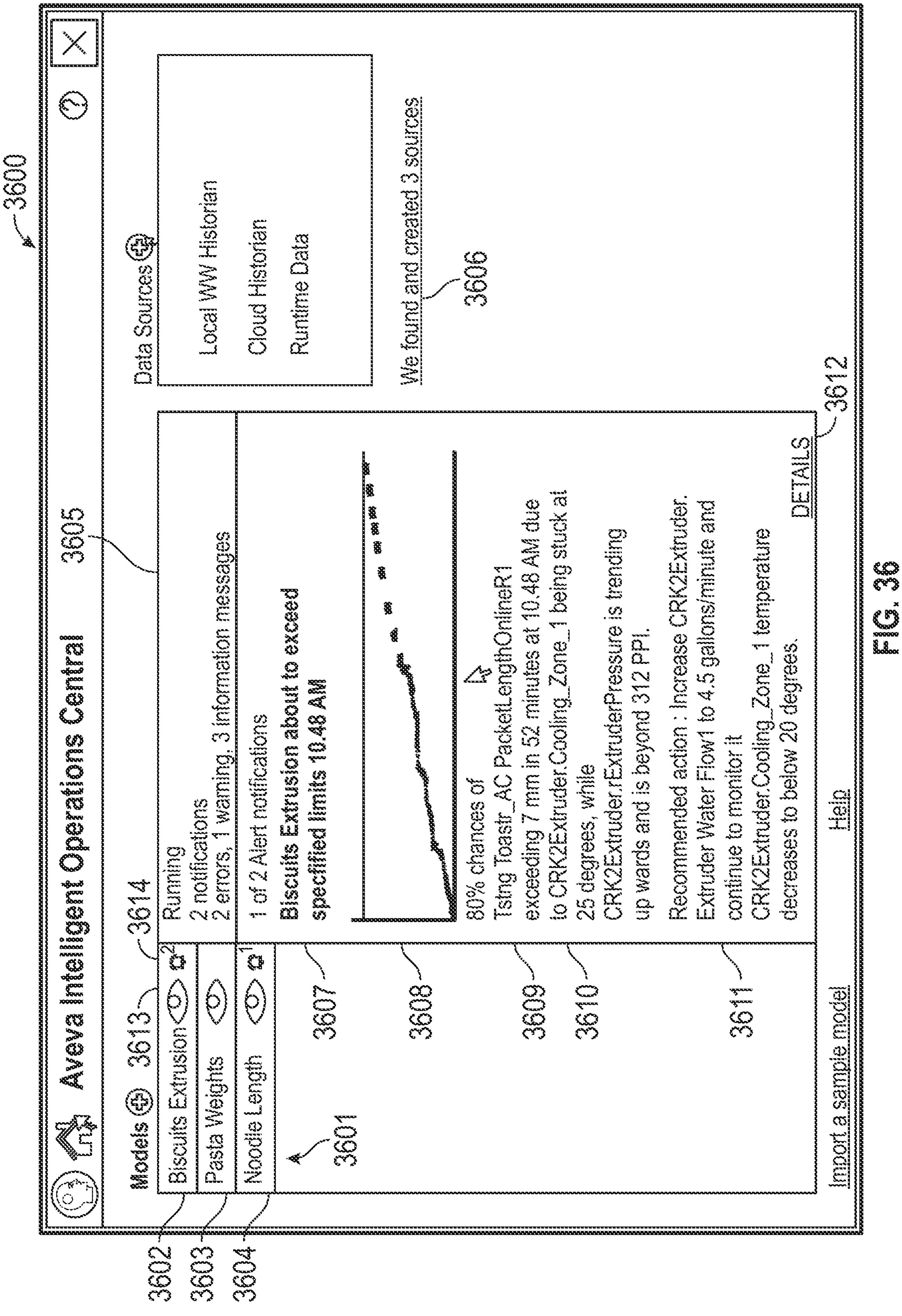
FIG. 36 shows a models page with all created models according to some embodiments.

FIG. 36 shows a models page 3600 with all created models 3601-3603 according to some embodiments. In some embodiments, models page 3600 is the same or similar to page 1400. In some embodiments, models page 3600 includes a model list 3601 that list all created models 3602-3604, an information section 3605 that list all information associated with a selected model from model list 3601. and/or a data source section 3606 listing all available data sources for the created models. In some embodiments, model list 3601 can include a model running status icon 3613 and/or a notification icon 3614. In some embodiments, information section 3605 can include one or more of a running status, number of notification, number of errors number of warnings, number of information messages, and/or any other information the user and/or system considers relevant. In some embodiments, the information section can include an alarm summary 3607, a chart (e.g., spark line) 3608, alarm details 3609, associated tag analysis 3610 (e.g., analysis performed by the system on tags from variables tag list 1901 or any other tag the system determines correlates with the alarm), a recommended action section 3611, and/or any other information the user and/or system considers relevant. In some embodiments, further and or full details associated with the alarms can be viewed by selecting details button 3612.

As a non-limiting example, an extrusion process model 3602 predicts with 80% certainty that a limit associated with tag (e.g., the tag listed in alarm summary 3607) will be violated in 52 minutes (as displayed in alarm details 3609). In some embodiments, the system displays that a cooling zone is stuck at 25° C. while pressure is increasing (in section 3610). In some embodiments, the system suggests increasing waterflow to the cooling zone to 4.5 gpm and continue to monitor to make sure the cooling zone temperature decreases to below 25° C.

In some embodiments, manufacturing facilities monitor remote equipment using one or more HMI (Human Machine Interfaces) displayed on one or more GUIs (Graphical User Interfaces). In some embodiments, remote monitoring is performed using SCADA (Supervisory Control and Data Acquisition) system. In some embodiments, SCADA system components include one or more of supervisory computers, remote terminal units, programmable logic controllers, communications infrastructure, and/or human-machine interfaces. In some embodiments, the SCADA system provides monitoring and command execution (e.g., changing setpoints, controlling scheduling, etc.). In some embodiments, the system uses conventional SCADA systems which are also referred to as RTUs (Remote Terminal Units). In some embodiments, the system is incorporated in SCADA systems provided by AVEVA®.

In some embodiments, facilities have various feeds that help monitor remote processes. In some embodiments, the feeds comprise digital information provided by conventional lens cameras, infrared cameras, digital cameras, visualization software (e.g., visualization software on an electron microscope that converts electronic signals and/or electromagnetic waves to a visual image) and/or video recording software and the like. As used herein, the term "camera" covers any of the aforementioned items and any conventional visualization hardware and/or software. As used herein, "alarm," "alert," "alarm/alert," and/or "notification" includes any information that the system is capable of providing, such as, but not limited to, past trends, future predictions, historical data, maintenance data, root cause analysis, equipment mapping, links between alarms and secondary equipment, AI training interfaces, and/or any other method disclosed herein. In some embodiments, facilities have various manual visual inspections that need to be performed. In some embodiments, manual visual inspections components include gauges, lights, component movement, component color, size, shape, depth, vibration, and/or any other physical properties that can be classified as a visual characteristic. In some embodiments, the system uses conventional audio collectors (e.g., microphones) and the data collected therewith to monitor a process. In some embodiments, the system uses stress-strain gauges (e.g., wheatstone bridges). In some embodiments, the system uses images from the feed to transform one or more manual inspection station monitored components into a digital representation on the SCADA HMI. In some embodiments, the system helps to capture and analyze monitored data for integration into the SCADA system.

Figure 37:
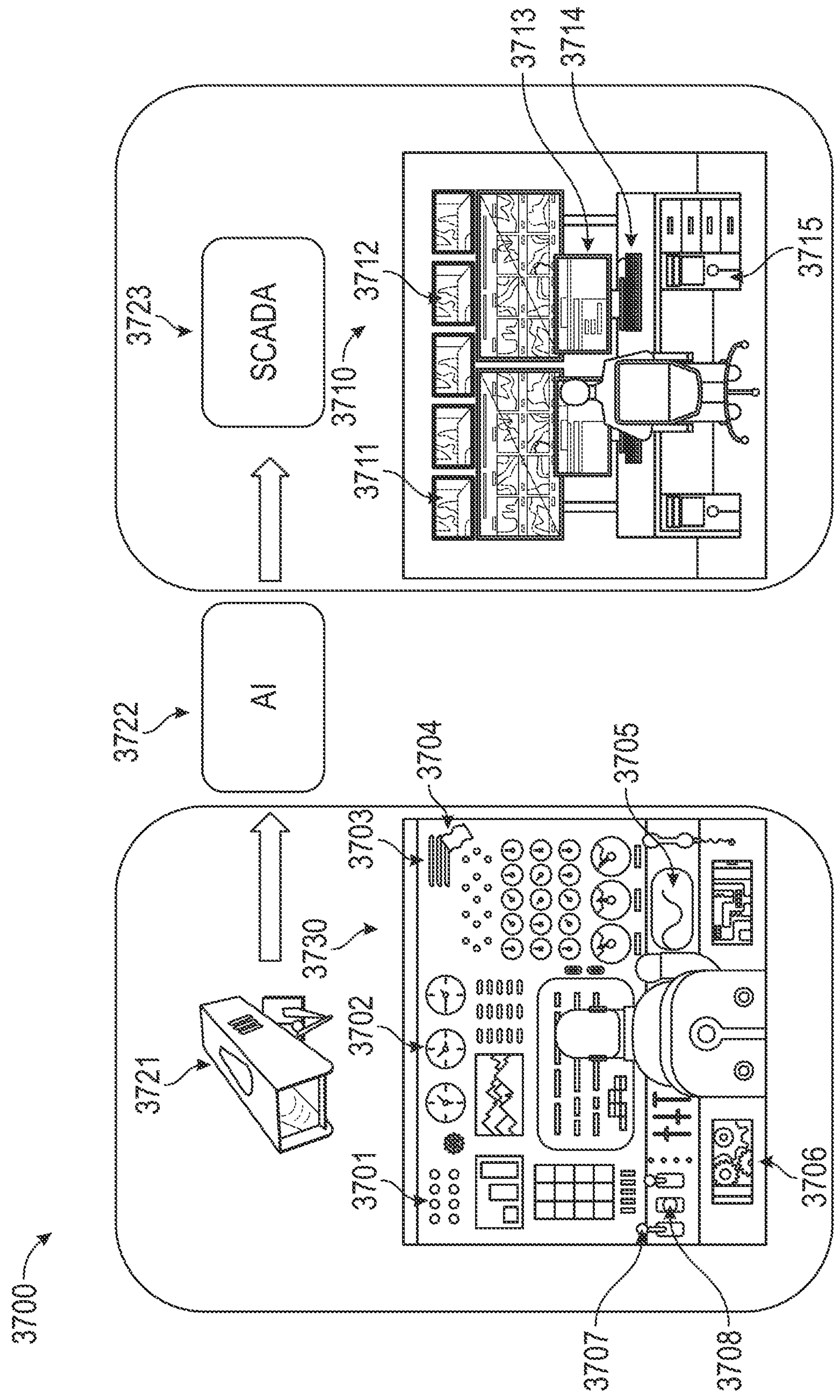
FIG. 37 show the transformation of images from a remote manual visual inspection station to a SCADA according to some embodiments.

FIG. 37 show the transformation of images from a remote manual visual inspection station 3700 to a SCADA 3710 according to some embodiments. Remote manual visual station 3730 may comprise lights 3701, gauges 3702, vents 3703 with fan tell 3704 (e.g., small string or paper that moves with the air coming out of the vent, which indicates the fan is running), an oscillation graph 3705, gears 3706, and/or levers 3707. Using a camera, for example, the system can be trained to recognize both a normal configuration and an abnormal configuration for each of these items. In some embodiments, the system compares an expected value for the lights 3701 to actual values obtained by the camera feed. In some embodiments, the comparison is specific to a product or operating condition. In some embodiments, the system checks certain tags and/or system setpoint configurations and determines what products are being run and/or the expected light patterns associated with those products. In some embodiments, the system will compare, using a camera, the current state of the lights 3701 to an expected condition and return an alarm if the system determines the lights 3701 are in an abnormal state. In some embodiments, the system uses AI in the comparison. System details for training AI to complete these types of task are described later with respect to some embodiments.

Similarly, in some embodiments, a camera visually monitoring gauges 3702 can send a digital representation to the system which then converts it to a digital value. The system is configured and arranged to convert the camera feed into digital representations continuously, intermittently, or upon changes in the gauges' 3702 positions, according to some embodiments. In some embodiments, the system is configured to compare a last received image with a current image, and only upload changes between the two images to a database, such as a historian database, for storage and/or analysis. In some embodiments, considerable memory capacity is saved by only storing changes in one or more process component images.

In some embodiments, remote components that require air vents 3703 are visually monitored using fan tells 3704 (e.g., paper that flaps, LEDs that light up, small veins that spin, and/or other conventional techniques) to ensure the fan is running and providing proper cooling. In some embodiments, components do not use fan tells and have sensors that send information to SCADA 3710. In some embodiments, the system is configured to receive a video feed from the camera and store the feed as a video clip. In some embodiments, the system uses a camera to take pictures at random time intervals of fan tell 3704. In some embodiments, the system is trained to interpret changes in the pictures to be an indication of a normal condition. In some embodiments, the system can be trained to interpret no change in the picture as an abnormal condition. In some embodiments, the system is trained to recognize motion in video clips and/or changes pictures as a normal condition. In some embodiments, the system uses this training to recognize an abnormal fan tell 3704 condition, such as when no movement of the vent tell 3704 is occurring. In some embodiments, the system reports the abnormal condition to the SCADA 3710 in the form of an alarm.

In some embodiments, the system uses a camera to monitor local electronic equipment such as oscilloscope 3705. In some embodiments, the remote electronic equipment such as oscilloscope 3705 does not send digital information to the SCADA 3710, and the system is used to transmit visual data for display and analysis. In some embodiments, the remote electronic equipment does send digital information to the SCADA 3710, and the system is used as redundancy to ensure what is displayed at the SCADA 3710 and what is displayed at the remote monitoring station 3700 are the same. In some embodiments, this redundancy can be applied to any electronic equipment that displays both a visual representation and/or reports signal data so that errors or loss of communication can be quickly detected and reported by the system as an alarm. In some embodiments, this feature is also desirable for gauges 3702 (and/or any analog device) that may have a display that is stuck and/or broken but is otherwise reporting correctly, in which case an alarm is reported by the system.

In some embodiments, the system monitors process hardware such as gears 3706, as a non-limiting example. In some embodiments, the system can monitor and record the movement of gears 3706 as a video clip and compares the current clip to a reference clip as described above. In some embodiments, the system monitors one or more components such as gears 3706 by taking pictures either intermittently or regularly. In some embodiments, videos and/or pictures can be compared to normal reference pictures stored during training and/or maintenance such that the system can determine if a physical component of the hardware is broken (e.g., a tooth is missing off of a gear). In some embodiments, the system can make predictions on how a defect in a physical component will affect the components operation, as well as the operation of any other component in the facility that is linked to the physical component's operation. In some embodiments, the system can use a change in a physical component to correlate to other unexpected anomalies in the process. For example, in some embodiments, the gears 3706 control the operation of levers 3707, 3708 when the remote station 3730 receives a signal from the SCADA 1110 according to some embodiments. In some embodiments, a broken tooth on a gear may result in a first lever 1107 raising as expected, but the lever 1107 only raising halfway. In some embodiments, the system monitoring both levers 3707, 3708 as well the gears 3706 correlates the lever abnormality to the gears abnormality and report the correlation with the alarm. In some embodiments, the system is capable of performing this type of correlation analysis using a combination of visual and electrically collected data.

In some embodiments, alarms are displayed on SCADA 3710. In some embodiments, SCADA 3710 includes one or more monitors 3711, televisions 3712, clients 3713, interfaces 3714 (e.g., keyboard, mouse, pad, etc.), computers 3715, and/or remote displays (not shown but described later). One or more SCADA components can be in a central location, distributed across the onsite facility, embodied in a mobile computer, and/or be located offsite while still remaining within the scope of this disclosure.

In some embodiments, as shown in FIG. 37, information from camera 3721 is sent to the system 3722 for processing and analysis as described herein before being sent to the SCADA system 3723. In some embodiment, the system can utilize and leverage existing low-cost camera streams to automate the manual visual inspection process. In some embodiments, the system uses the data from the camera 3721 stream to train the AI 3722 to monitor the processes, and associate all visual data and analysis from a particular component with a respective component tag within the SCADA system 3723. In some embodiments, the system uses data from existing component tags (e.g., control limits, spec limits, current trends, historical trends, maintenance records, etc.) as inputs to train the AI and determine relevant information to display to a user in conjunction with an alarm.

Figure 38:
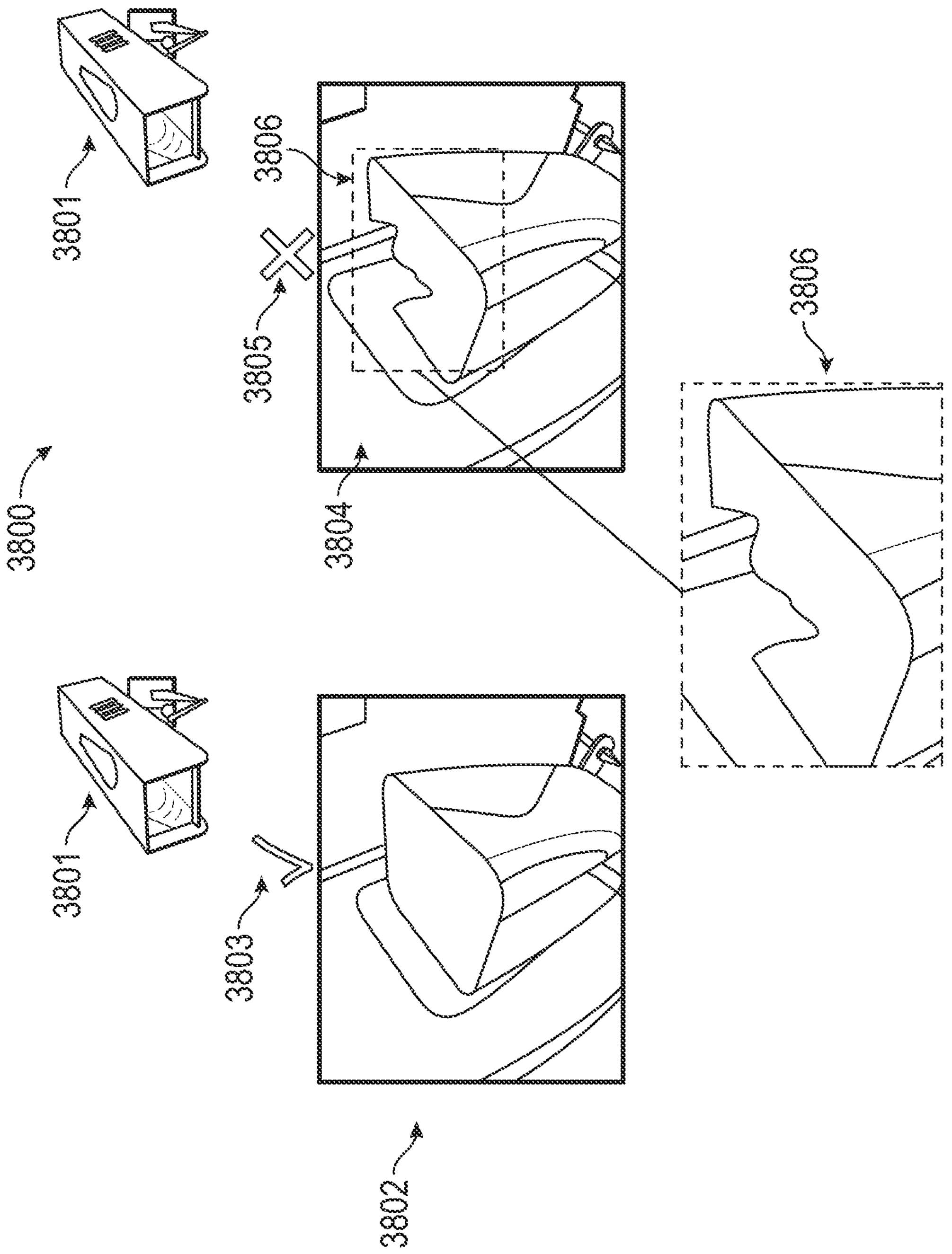
FIG. 38 shows the system being used to automate a quality control check for pots according to some embodiments.

FIG. 38 shows the system being used to automate a quality control check 3800 for pots according to some embodiments. In some embodiments, a camera 3801 monitors a defect checkpoint and uses AI to process images to determine if a pot is defective. In some embodiments, a pot with no defects 3802 is classified as accepted 3803 by the system. In some embodiments, defective pots 3804 with defects 3806 are classified as rejected by the system. Using the system in this way production speed can be dramatically increased since the system does not need to slow down a conveyor and/or create a bottleneck to inspect pots according to some embodiments. In some embodiments, the system improves quality assurance by performing an inspection on every pot produced, as opposed to only pulling a sample of pots as is current common in manufacturing. in addition, in some embodiments, personnel cost can be reduced because the system can inspect pots at a higher rate and accuracy that multiple people could working in unison. In some embodiments, the system can be trained to link a specific defect 3806 with one or more tags in the SCADA system to supplement alarm information and reporting as described herein.

Figure 39:
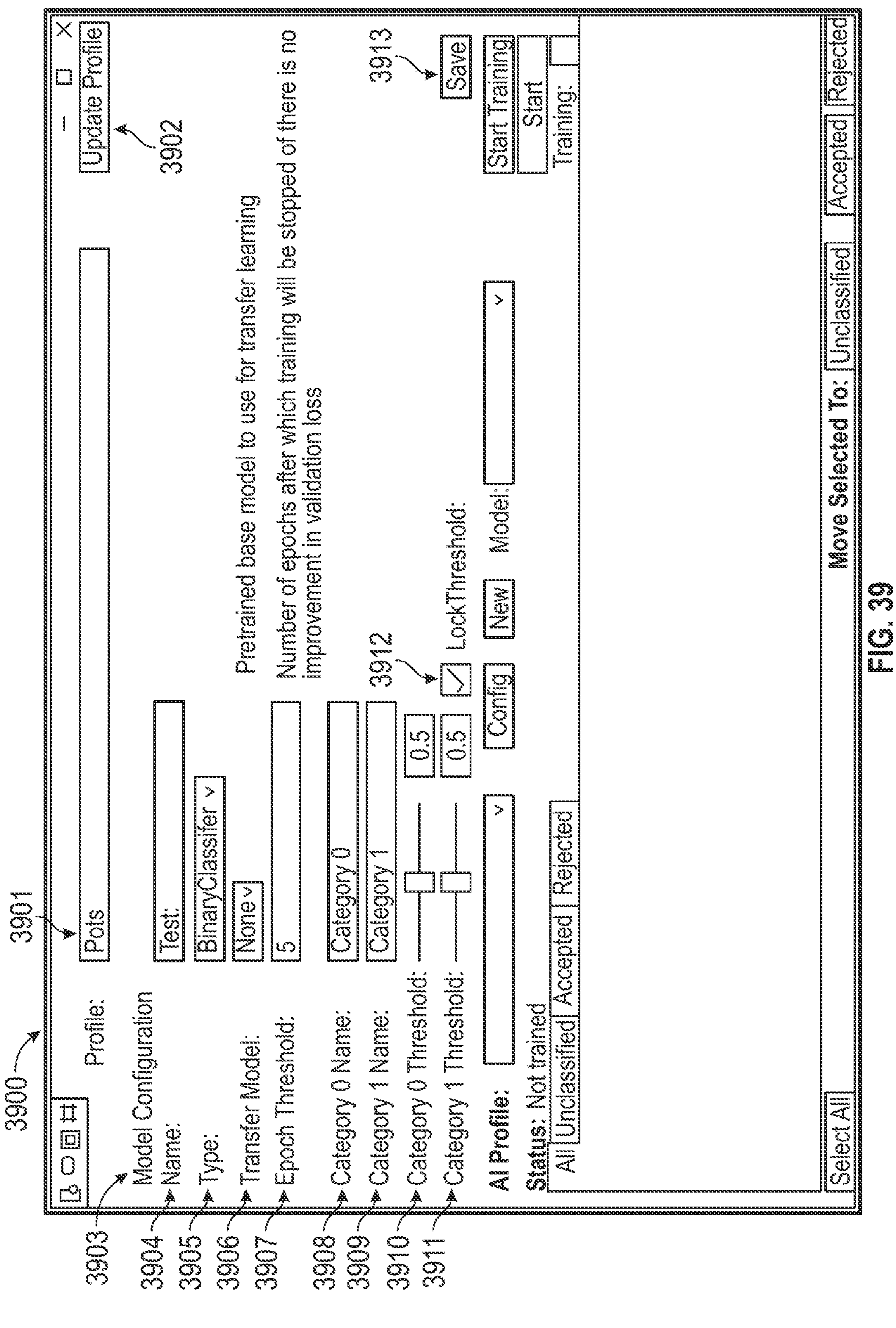
FIG. 39 depicts a training interface for training the system's AI to perform the pot defect monitoring according to some embodiments.

FIG. 39 depicts a training interface 3900 for training the system's AI to perform the pot defect monitoring according to some embodiments. In some embodiments, the training interface is imbedded in and/or part of the SCADA or other HMI that the system comprises. In some embodiments, the training process begins with a user creating a profile name 3901 and then selecting the update profile button 3902. In some embodiments, this will cause a model configuration section 3903 to appear. In some embodiments, the model configuration section 3903 includes one or more inputs for a name 3904, type 3905, transfer model 3906, epoch threshold 3907, category 0 name 3908, category 1 name 3909, category 0 threshold 3910, category 1 threshold 3911, lock threshold selection 3912, and/or save button 3913.

In some embodiments, the name 3904 serves to identify the AI profile that is created using the confirmation section 3903. In some embodiments, type 3905 defines the classification rule that the AI uses to assign each image. In some embodiments, such as shown in exemplary FIG. 39, the type is selected as a binary classifier (i.e. binomial classification). In some embodiments, a binary classifier classifies images into one of two groups (e.g., defective, not defective). In some embodiments, multiclass classification can be selected as type 3905. In some embodiments, multiclass classification uses a combination of multiple binary classifiers to sort images into multiple groups.

In some embodiments, transfer model 3906 can be selected to import an AI model previously trained. In some embodiments, the imported AI model may have been used in similar analysis. In some embodiments, the imported AI model may have been used for the same analysis at a different location or facility. For example, in some embodiments, there are multiple pot shapes that are being produced at the same factory. In some embodiments, the defects found in the multiple pot shapes are similar, such as defect 3806, for example. In some embodiments, the system's AI can learn to recognize defects in one product from previous defect classifications in a different product. In some embodiments, importing an AI model using transfer model 3905 can significantly improve the AI training process by reducing the amount of manual feedback that is required at for a new model; manual training is discussed further below.

In some embodiments, model configuration 3903 involves setting an epoch threshold 3907. In some embodiments, an epoch defines the number of iterations that the learning algorithm (i.e., AI) will run through a training sample. In some embodiments, the system provides an input for dividing a sample size into a number of batches, where the model weights are updated after each batch. In some embodiments, batch types include batch gradient descent, stochastic gradient decent, and/or mini-batch gradient descent, as non-limiting examples. In some embodiments, and epoch threshold 3907 determines the number of epochs after which training will be stopped if there is no improvement in validation loss. In some embodiments, category 0 name 3908 and category 1 name 3909 are used to name each group created when type 3905 was selected (e.g., defective, not defective). In some embodiments, the model configuration is saved by selecting the save button 3913.

Figure 40:
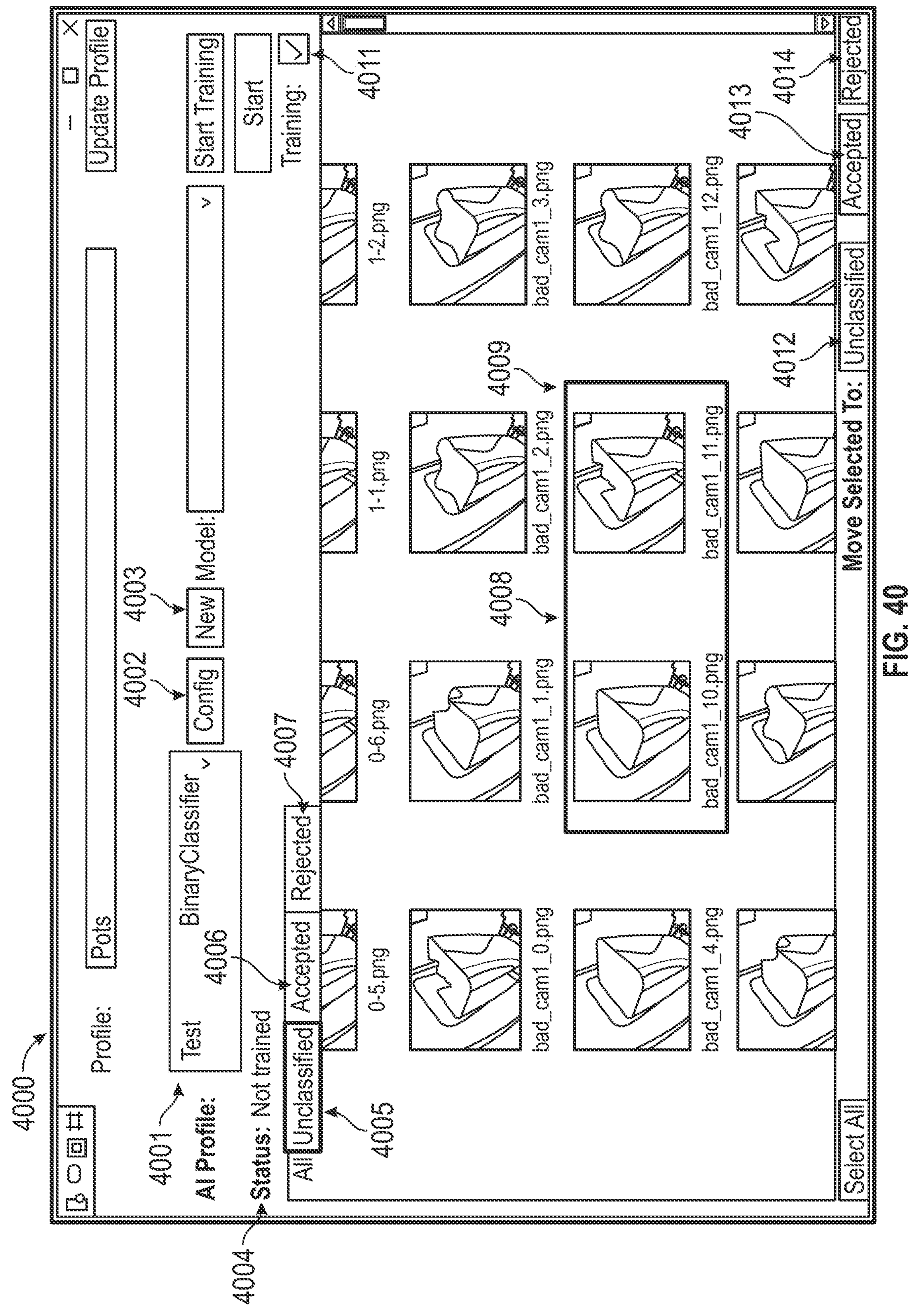
FIG. 40 shows a training interface after the model configuration has been saved according to some embodiments.

FIG. 40 shows a training interface 4000 after the model configuration has been saved according to some embodiments. In some embodiments the system saves the information input into the model configuration section 3903 as an AI profile 4001. In some embodiments, selection of the config button 4002 allows a user to modify one or more model configuration parameters. In some embodiments, new button 4003 allows a user to create a new AI profile. In some embodiments, the training interface 4000 includes a status indicator 4004. In some embodiments, the status indicator indicates whether a model has been trained or not trained. In some embodiments, the training interface 4000 includes tabs 4006, 4007, and/or 4008 that display images from a defect checkpoint and/or location in the production line. In some embodiments, unclassified tab 4005 shows images coming from the camera feed that have not been classified. In some embodiments, the images appear on the unclassified tab because classification using AI has not been applied to images. In some embodiments, the unclassified images in the unclassified tab 4005 are used to train the AI model.

In some embodiments, to begin training the AI model the training checkbox 4011 is selected. In some embodiments, one or more images (e.g., 4008, 4009) are then manually chosen from the unclassified tab and classified (i.e, labeled defective or not defective) using one of the classification buttons 4012, 4013, 4015. In some embodiments, the classification buttons are an unclassified button 4012, an accepted button 4013, and/or a rejected button 4015. In some embodiments, once the one or more images are moved and/or copied from the unclassified tab 4005 to the accepted tab 4006 when the image is selected and the accepted button 4013 is chosen. In some embodiments, one or more images are moved and/or copied from the unclassified tab 4005 to the rejected tab 4007 when the image is selected and the accepted button 4014 is chosen. In some embodiments, the system uses manual classification to train the AI.

In some embodiments, the system uses one or more of a training set, a validation set, and/or a test set during training, tuning, model section, and/testing. In some embodiments, a majority of the images used for training are assigned to a training set. In some embodiments, the percentage of the images are assigned to a training set is between 40% and 80%. In some embodiments, the training sets are used to fit parameters for an adjusting weights process. In some embodiments, a minority of the images used for training are assigned to a validation set. In some embodiments, the percentage of the images are assigned to a validation set is between 10% and 30%. In some embodiments, the validation set is an intermediate phase in the AI training that is used for selecting the best model and/or optimizing the model. In some embodiments, a portion of the images used for training are assigned to a testing set. In some embodiments, the testing set comprises images that have been manually classified and is used for result testing and final model performance assessment.

In some embodiments the system uses a loss function to optimize the training process. In some embodiments, training sets and validation sets are used to calculate loss based on how well a model is performing using data from these two sets. In some embodiments, loss is the sum of the errors that occurred for each sample in the training sets or validation sets. In some embodiments, loss represents how desirable or undesirable a model behaves after each epoch iteration.

In some embodiments, the system uses an accuracy metric to interpret the AI model's performance. In some embodiments, accuracy represents the ratio of the number of correct predictions to the total number of predictions. In some embodiments, accuracy is used to gauge the model's prediction as compared to the true data.

In some embodiments, the system uses conventional algorithms and/or techniques for creating and/or testing an AI model. In some embodiments, the system uses proprietary algorithms and/or techniques for creating and/or testing an AI model.

Figure 41:
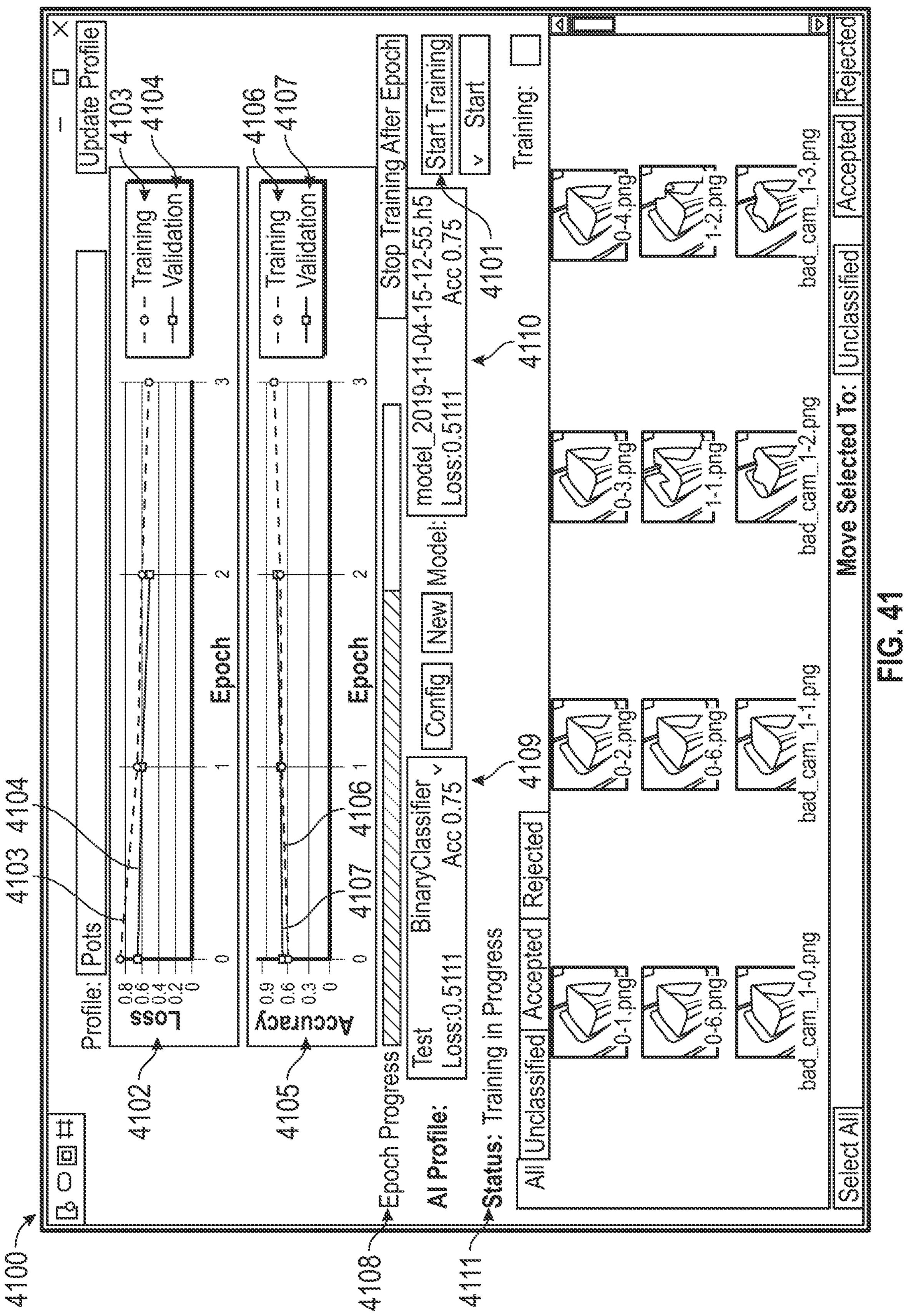
FIG. 41 shows the training interface as the AI model is being trained according to some embodiments.

FIG. 41 shows the training interface as the AI model is being trained 4100 according to some embodiments. In some embodiments, once the images have been classified the model can be trained by selecting the start training button 4101. In some embodiments, during training the system displays a loss graph 4102 displaying a training loss line 4103 and a validation loss line 4104. In some embodiments, during training the system displays an accuracy graph 4105 displaying a training accuracy line 4106 and a validation accuracy line 4107. In some embodiments, the system displays an epoch progress bar 4108 that fills during each epoch. In some embodiments, loss and/or accuracy values are also displayed in AI profile box 4109 and/or model box 4110. In some embodiments, the status 4111 indicates that training is in progress.

Figure 42:
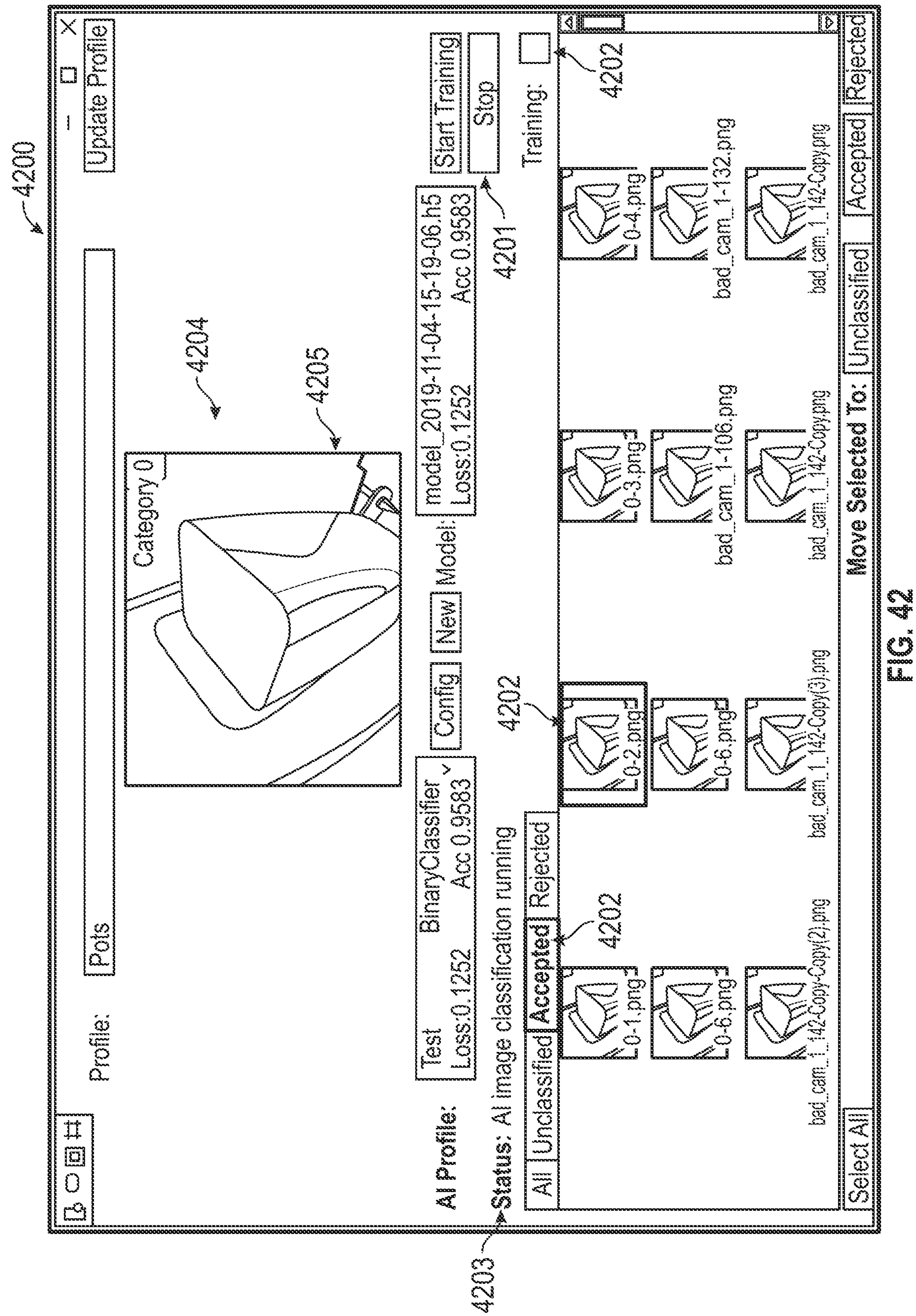
FIG. 42 shows a snapshot of the AI model running according to some embodiments. In some embodiments, once the training is complete the AI model can monitor start to monitor the feed by selecting start/stop button 4201 and unselecting training box 4202.

FIG. 42 shows a snapshot of the AI model running 4200 according to some embodiments. In some embodiments, once the training is complete the AI model can monitor start to monitor the feed by selecting start/stop button 4201 and unselecting training box 4202. In some embodiments, the status 4203 indicates that AI image classification is running In some embodiments, an image feed 4204 is displayed by the system. In some embodiments, an outline 4205 of the images in the image feed 4204 is a different for and accepted and a rejected image. In some embodiments, the image feed 4204 is color coded (e.g., green for accepted, red for rejected).

Figure 43:
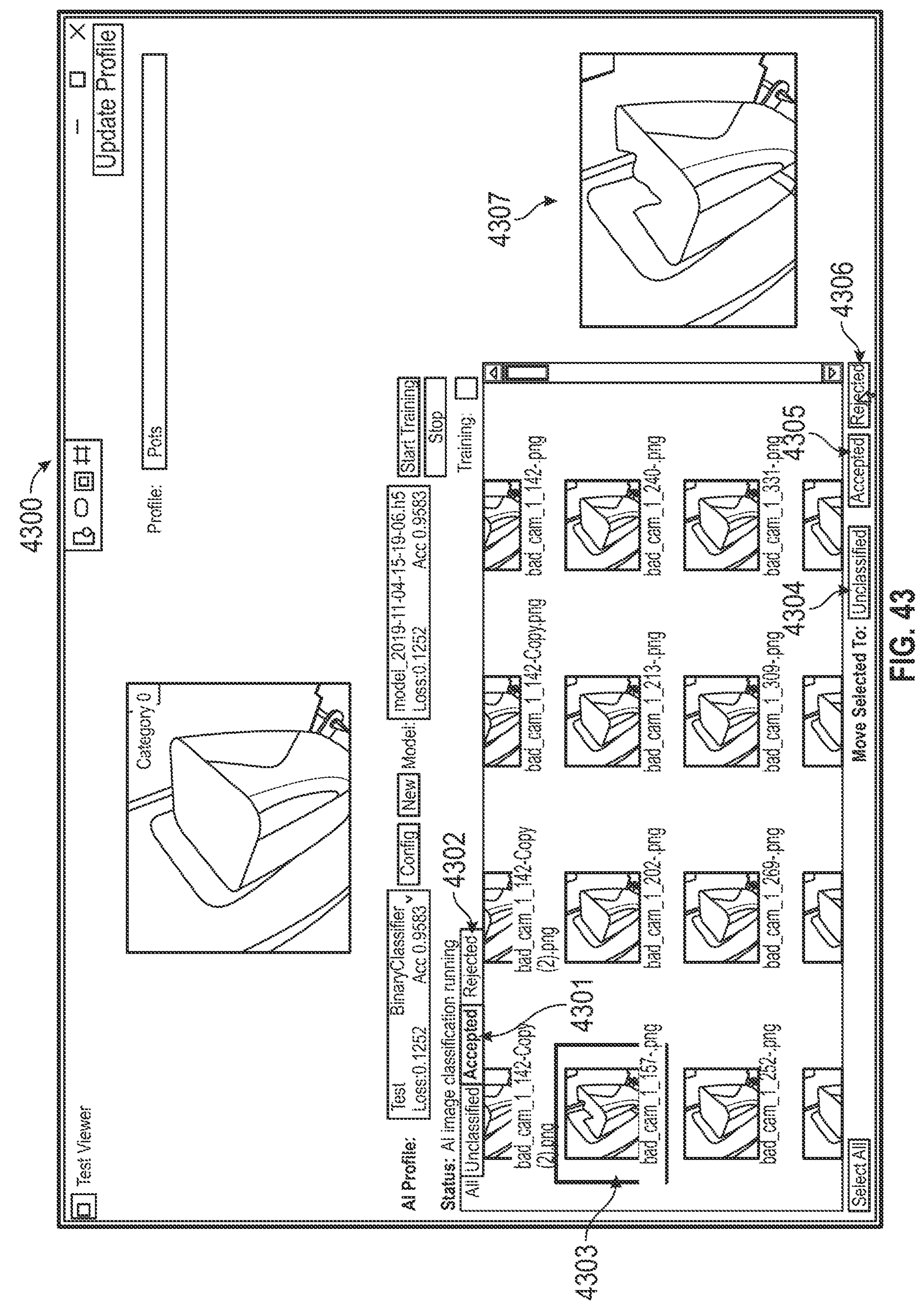
FIG. 43 shows manually classifying misclassified images according to some embodiments.

FIG. 43 shows manually classifying misclassified images 4300 according to some embodiments. In some embodiments, before, after, and/or during the image classification is running, a user can click on the accepted tab 4301 and/or the rejected tab 4302 to review the classified images. In some embodiments, if one or more images are misclassified, the user can reclassify the images using the unclassified button 4304, the accepted button 4305, and/or the rejected button 4306. In some embodiments, when a user manually reclassifies an image, the manual classification is used to further train the AI model. In some embodiments, a selected image 4303 is enlarged 4307 on another portion of the display.

In some embodiments, the same procedure for classifying defects as described above is also used to train the AI in any embodiment presented in this disclosure. In some embodiments, the same procedure for classifying defects as described above can be used to train the AI model for any application not disclosed herein.

Some embodiments may comprise a special purpose computer including a variety of computer hardware, as described in greater detail below. Some embodiments within the scope of the disclosure can also include computer-readable media for carrying or having computer-executable instructions or data structures stored thereon. In some embodiments, such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer according to some embodiments. When information is transferred or provided over a network or another communications connection (either hardwired, wireless, or a combination of hardwired or wireless) to a computer, the computer properly views the connection as a computer-readable medium according to some embodiments. Thus, in some embodiments, any such connection is properly termed a computer-readable medium and/or processor-readable medium. In some embodiments, combinations of the above should also be included within the scope of computer-readable media. In some embodiments, computer-executable instructions comprise, for example, instructions and data which cause a general-purpose computer, special purpose computer, or special purpose processor to perform a certain function or group of functions.

Some embodiments include a system for implementing aspects of the disclosure that includes a special purpose computer in the form of a conventional computer, including a processing unit, a system memory, and a system bus that can couple various system components including the system memory to the processing unit. In some embodiments, the system bus may be any of several types of bus structures including a memory bus or memory controller, a peripheral bus, and a local bus using any of a variety of bus architectures. In some embodiments, the system memory includes read only memory (ROM) and random-access memory (RAM). Further, some embodiments include a basic input/output system (BIOS), containing the basic routines that help transfer information between elements within the computer, such as during start-up, may be stored in ROM. Further, in some embodiments, the computer may include any computer (e.g., processor, desktop computer, laptop, tablet, PDA, cell phone, mobile phone, smart television, and the like) capable of receiving or transmitting an IP address wirelessly to or from the Internet.

In some embodiments, the computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. In some embodiments, the magnetic hard disk drive, magnetic disk drive, and optical disk drive can be connected to the system bus by a hard disk drive interface, a magnetic disk drive-interface, and an optical drive interface, respectively. In some embodiments, the drives and their associated computer-readable media can provide non-volatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including, but not limited to, magnetic cassettes, flash memory cards, digital video disks, Bernoulli cartridges, RAMs, ROMs, solid state drives (SSDs), and the like according to some embodiments.

In some embodiments, the computer typically includes a variety of computer readable media. In some embodiments, computer readable media can be any available media that can be accessed by the computer and includes both volatile and nonvolatile media, removable and non-removable media. By way of example, and not limitation, in some embodiments computer readable media may comprise computer storage media and communication media. Computer storage media include both volatile and nonvolatile, removable and non-removable media implemented in any method or technology for storage of information such as computer readable instructions, data structures, program modules or other data according to some embodiments. In some embodiments, computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can be accessed by the computer. In some embodiments, communication media typically embody computer readable instructions, data structures, program modules or other data in a modulated data signal such as a carrier wave or other transport mechanism and includes any information delivery media.

Some embodiments include program modules comprising program code that may be stored on the hard disk, magnetic disk, optical disk, ROM, and/or RAM, including an operating system, one or more application programs, other program modules, and program data. In some embodiments, a user may enter commands and information into the computer through a keyboard, pointer, or other inputs such as a microphone, joy stick, game pad, satellite dish, scanner, or the like. In some embodiments, these and other inputs are often connected to the processing unit through a serial port interface coupled to the system bus. In some embodiments, the inputs may be connected by other interfaces, such as a parallel port, a game port, or a universal serial bus (USB). In some embodiments, the monitor or another display is also connected to the system bus via an interface, such as a video adapter. In addition to the monitor, in some embodiments, personal computers typically include other peripheral outputs (not shown), such as speakers and printers.

In some embodiments, one or more aspects of the disclosure may be embodied in computer-executable (computer-readable) instructions (i.e., software), routines, or functions stored in system memory or non-volatile memory as application programs, program modules, and/or program data. In some embodiments, the software may be stored remotely, such as on a remote computer with remote application programs. In some embodiments, program modules include routines, programs, objects, components, data structures, etc. that perform particular tasks or implement particular data types when executed by a processor in a computer or other device. In some embodiments, the computer executable instructions may be stored on one or more tangible, non-transitory computer readable media (e.g., hard disk, optical disk, removable storage media, solid state memory, RAM, etc.) and executed by one or more processors or other devices, including any of the devices disclosed herein.

In some embodiments, the functionality of the program modules may be combined or distributed as desired. In some embodiments, the functionality may be embodied in whole or in part in firmware or hardware equivalents such as integrated circuits, application specific integrated circuits, field programmable gate arrays (FPGA), and the like. Further, in some embodiments, the computer may operate in a networked environment using logical connections to one or more remote computers. In some embodiments, the remote computers may each be another personal computer, a tablet, a PDA, a server, a router, a network PC, a peer device, or other common network node, and typically include many or all of the elements described above relative to the computer. In some embodiments, the logical connections include a local area network (LAN) and a wide area network (WAN) that are presented here by way of example and not limitation. In some embodiments, such networking environments are commonplace in office-wide or enterprise-wide computer networks, intranets and the Internet.

In some embodiments, when used in a LAN networking environment, the computer can be connected to the local network through a network interface or adapter. When used in a WAN networking environment, the computer may include a modem, a wireless link, or other means for establishing communications over the wide area network, such as the Internet according to some embodiments. In some embodiments, the modem, which may be internal or external, is connected to the system bus via the serial port interface. In some embodiments, in a network environment program modules depicted relative to the computer, or portions thereof, may be stored in the remote memory storage. It will be appreciated that the network connections shown are exemplary and other means of establishing communications over wide area network may be used in some embodiments.

In some embodiments, the computer-executable instructions are stored in a memory, such as the hard disk drive, and executed by the computer. Advantageously, in some embodiments, the computer processor has the capability to perform all operations (e.g., execute computer-executable instructions) in real-time. In some embodiments, the order of execution or performance of the operations in embodiments of the disclosure illustrated and described herein is not essential, unless otherwise specified. That is, in some embodiments, the operations may be performed in any order, unless otherwise specified, and embodiments of the disclosure may include additional or fewer operations than those disclosed herein. For example, in some embodiments, it is contemplated that executing or performing a particular operation before, contemporaneously with, or after another operation is within the scope of aspects of the disclosure.

Some embodiments of the disclosure may be implemented with computer-executable (i.e., processor-executable, processor-readable) instructions. In some embodiments, the computer-executable instructions may be organized into one or more computer-executable components or modules. In some embodiments, aspects of the disclosure may be implemented with any number and organization of such components or modules. For example, in some embodiments, aspects of the disclosure are not limited to the specific computer-executable instructions or the specific components or modules illustrated in the figures and described herein. Some embodiments of the disclosure may include different computer-executable instructions or components having more or less functionality than illustrated and described herein.

For the purposes of this disclosure in some embodiments the term "server" should be understood to refer to a service point which provides processing, database, and communication facilities in some embodiments. In some embodiments, a computer may be capable of sending or receiving signals, such as via a wired or wireless network, or may be capable of processing or storing signals, such as in memory as physical memory states, and may, therefore, operate as a server. Thus, in some embodiments, devices capable of operating as a server may include, as examples, dedicated rack-mounted servers, desktop computers, laptop computers, set top boxes, integrated devices combining various features, such as two or more features of the foregoing devices, or the like. By way of example, and not limitation, in some embodiments, the term "server" can refer to a single, physical processor with associated communications and data storage and database facilities, or it can refer to a networked or clustered complex of processors and associated network and storage, as well as operating software and one or more database systems and application software that support the services provided by the server. In some embodiments, servers may vary widely in configuration or capabilities, but generally a server may include one or more central processing units and memory according to some embodiments. In some embodiments, a server may also include one or more mass storage, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Washington.

For the purposes of this disclosure a "network" should be understood to refer to a network that may couple devices so that communications may be exchanged, such as between a server and a client, peer to peer communications, or other types of devices, including between wireless devices coupled via a wireless network, for example in some embodiments. In some embodiments, a network may also include mass storage, such as network attached storage (NAS), a storage area network (SAN), or other forms of computer or machine-readable media, for example. In some embodiments, a network may include the Internet, one or more local area networks (LANs), one or more wide area networks (WANs), wire-line type connections, wireless type connections, cellular or any combination thereof. Likewise, in some embodiments, sub-networks, which may employ differing architectures or may be compliant or compatible with differing protocols, may intemperate within a larger network. In some embodiments, various types of devices may, for example, be made available to provide an interoperable capability for differing architectures or protocols. In some embodiments, a router may provide a link between otherwise separate and independent LANs. In some embodiments, a communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, in some embodiments, a computer or other types of related electronics may be remotely coupled to a network, such as via a telephone line, cell line, and/or satellite link, for example.

For purposes of this disclosure, in some embodiments, a "wireless network" should be understood to couple a user and/or client with a network. A wireless network may employ stand-alone ad-hoc networks, mesh networks, wireless LAN (WLAN) networks, cellular networks, or the like according to some embodiments. In some embodiments, a wireless network may further include a system of terminals, gateways, routers, or the like coupled by wireless radio links, or the like, which may move freely, randomly or organize themselves arbitrarily, such that network topology may change, at times rapidly. In some embodiments, a wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. In some embodiments, network access technologies may enable wide area coverage for devices, such as clients with varying degrees of mobility. For example, in some embodiments, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. In some embodiments, a wireless network may include virtually any type of wireless communication mechanism by which signals may be communicated between devices, such as a client (i.e., a computer accessing a server) and/or a computer, between and/or within a network, or the like.

For purposes of this disclosure, in some embodiments, a client (or consumer or user) may include a computer capable of sending or receiving signals, such as via a wired or a wireless network. In some embodiments, a client may, for example, include a desktop computer or a portable device, such as a cellular telephone, a smart phone, a display pager, a radio frequency (RF) transmitter/receiver, an infrared (IR) transmitter/receiver, a near field communication (NFC) transmitter/receiver, a personal digital assistant (PDA), a handheld computer, a tablet computer, a phablet, a laptop computer, a set top box, a wearable computer, an integrated device combining various features, such as features of the forgoing devices, or the like.

In some embodiments, a client device may vary in terms of capabilities or features, and claimed subject matter is intended to cover a wide range of potential variations. In some embodiments, a web-enabled fixed or mobile device may include a browser application that is configured to receive and to send web pages, web-based messages, and the like. The browser application may be configured to receive and display graphics, text, multimedia, and the like, employing virtually any conventional web-based language according to some embodiments.

It is to be understood that the system is not limited in its application to the details of construction and the arrangement of components set forth in the previous description or illustrated in the drawings according to some embodiments. The system is capable of combining elements from some embodiments and of being practiced or of being carried out in various ways. Also, in some embodiments, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items according to some embodiments. Unless specified or limited otherwise, the terms "mounted," "connected," "supported," and "coupled" and variations thereof are used broadly and encompass both direct and indirect mountings, connections, supports, and couplings according to some embodiments. Further, in some embodiments, "connected" and "coupled" are not restricted to physical or mechanical connections or couplings. In some embodiments, the term "substantially" as used herein includes a range of ±10% of the unit of measure associated therewith unless otherwise indicated.

In some embodiments, the previous discussion is presented to enable a person skilled in the art to make and use the embodiments disclosed herein. Various modifications to the illustrated embodiments will be readily apparent to those skilled in the art, and the principles of one or more embodiments can be applied to other embodiments and applications without departing from the scope of the disclosure according to some embodiments. Thus, some embodiments of the invention are not intended to be limited to embodiments shown, but are to be accorded the widest scope consistent with the principles and features disclosed herein. In some embodiments, the previous detailed description is to be read with reference to the figures, in which like elements in different figures have like reference numerals. The figures, which are not necessarily to scale, depict some embodiments and are not intended to limit the scope of any embodiments of the invention. Skilled artisans will recognize the examples provided herein have many useful alternatives and fall within the scope of the disclosure according to some embodiments.

Some embodiments disclosed herein generally describe non-conventional approaches for systems and methods for process data management and visualization of data alarms that are not well-known, and further, are not taught or suggested by any known conventional methods or systems. Moreover, in some embodiments, the specific functional features are a significant technological improvement over conventional methods and systems, including at least the operation and functioning of a computing system that are technological improvements. In some embodiments, these technological improvements include one or more aspects of the system and methods described herein that describe the specifics of how a machine operates, and improvements to the machine operation with respect to the prior art, which the Federal Circuit makes clear is the essence of statutory subject matter.

In some embodiments, one or more of the embodiments described herein include functional limitations that cooperate in an ordered combination to transform the operation of a data repository in a way that improves the problem of data storage and updating of databases that previously existed. Some embodiments described herein include a system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, of the system described herein is not directed to an abstract idea and provides a significant tangible innovation. Moreover, the functionalities described herein were not imaginable in previously-existing computing systems, and did not exist until the disclosed system solved the technical problem described earlier.

In some embodiments, it is recognized in the disclosure herein that enabling a user to visualize all related alarms for or related to an asset based on one or more asset searches, coordinating an automatic grouping of alarms, and/or a correlation between groups and individual alarm instances causes a new computing function, and is a technical problem for network communication and other server based technologies according to some embodiments. Some embodiments herein provide one or more technological solutions in the realm computer implementations of one or more graphical displays of grouped and correlated data with analysis of alarms in real-time with communications across a network, computers, databases, and/or the Internet to improve the performance of, and technology of representing hierarchical assets and properties of those assets in ways that cannot effectively be done, or done at all, manually.

It will be appreciated by those skilled in the art that while the system has been described above in connection with some embodiments and examples, the system is not necessarily so limited, and that numerous embodiments, examples, uses, modifications and departures from some embodiments, examples and uses are intended to be encompassed by the description, figures, and claims attached hereto.

Having described aspects of the disclosure in detail, it will be apparent that modifications and variations are possible without departing from the scope of aspects of the disclosure as defined in the appended claims according to some embodiments. In some embodiments, as various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for improving emergency information delivery comprising:

at least one processor, at least one non-transitory processor readable medium with instructions stored thereon configured and arranged to:

compare asset data of a primary asset in an industrial system to one or more alarm limits, the asset data of the primary asset including at least one parameter;

identify at least a second asset in the industrial system having a relationship with the primary asset by performing a statistical analysis on asset data of multiple assets within the industrial system, in response to the at least one parameter exceeding the one or more alarm limits;

determine correlation links between attributes of the primary asset and attributes of the at least second asset by executing a process simulation of the industrial system to anticipate effects of the at least one parameter exceeding the one or more alarm limits on the at least second asset, the correlation links being used to generate an attribute map;

generate secondary information for display in a graphical user interface (GUI) in conjunction with alarm information by processing a set of attributes from the attribute map through an artificial intelligence (AI) model, the secondary information being produced as an output of the AI model;

generate a display on the GUI based on the parameter of the primary asset exceeding the one or more alarm limits, the display including alarm information and the secondary information, the alarm information being continuously updated in the display as the current system time changes, by applying one or more system-defined rules, including grouping alarm records by alarm identifier, determining a display end time based on a comparison between a current system time and a predefined time control end time.

2. The system of claim 1, wherein the AI model selects the secondary information to display based on one or more attributes of the primary asset.

3. The system of claim 1, wherein the AI model selects the secondary information to display based on one or more attributes of the at least second asset.

4. The system of claim 1, wherein one or more correlation links comprise at least one of correlation analysis and/or a manual link.

5. The system of claim 4, wherein the system is configured and arranged to identify anomalies in one or more assets within the industrial system and display the anomalies as at least part of the secondary information.

6. The system of claim 4, wherein determining secondary information to display in conjunction with the alarm comprises creating separate groups;

wherein each separate group comprises at least a different portion of the secondary information; and wherein the system is configured and arranged to allow a user to select each one of the separate groups to display the secondary information associated therewith.

7. The system of claim 1, wherein the system is configured and arranged to provide a root cause analysis based on historical data; and wherein the root cause analysis is as at least part of the secondary information.

8. A system for improving emergency information delivery comprising:

at least one processor, at least one non-transitory processor readable medium with instructions stored thereon configured and arranged to:

compare asset data of a primary asset in an industrial system to one or more alarm limits, the asset data of the primary asset including at least one parameter;

generate an alarm when a primary asset's parameter exceeds the one or more alarm limits;

identify at least a second asset in the industrial system having a relationship with the primary asset by performing a statistical analysis on asset data of all the assets within the industrial system, in response to the primary asset's parameter exceeding the one or more alarm limits;

determine correlation links between attributes of the primary asset and attributes of the at least second asset by executing at least one process simulation of the industrial system, the correlation links being used to generate an attribute map;

generate secondary information for display in a graphical user interface (GUI) in conjunction with alarm information by processing a set of attributes from the attribute map through a AI model, the secondary information being produced as an output of the AI model; and generate a display comprising a visual representation of the alarm and the secondary information based on the primary asset's parameter exceeding the one or more alarm limits, the alarm information being continuously updated in the display as the current system time changes, by applying one or more system-defined rules, including grouping alarm records by alarm identifier, determining a display end time based on a comparison between a current system time and a predefined time control end time.

9. The system of claim 8, wherein the display comprises a header, breadcrumbs, a chart area, a grid area, and a time control.

10. The system of claim 9, wherein the breadcrumbs comprise an asset hierarchy;

wherein each asset in the asset hierarchy is separated by a special token;

wherein pressing the special token will show a list of one or more child assets;

wherein selecting a child asset will refresh the breadcrumbs to include the child asset's hierarchy;

wherein selecting a child asset will update the header, chart area, grid area, and time control with child asset information.

11. The system of claim 8, wherein information comprises primary information about a primary asset; and wherein information comprises secondary information about the at least second asset.

12. The system of claim 11, wherein secondary information comprises at least the one second asset alarm.

13. The system of claim 8, wherein the one or more correlation links comprise at least one of correlation analysis and/or a manual link.

14. A system for improving emergency information delivery comprising:

at least one processor, at least one non-transitory processor readable medium with instructions stored thereon configured and arranged to:

compare asset data of a primary asset in an industrial system to one or more alarm limits, the asset data of the primary asset including at least one parameter;

identify at least a second asset in the industrial system having a relationship with the primary asset by performing a statistical analysis on asset data of all the assets within the industrial system, when the at least one parameter exceeds the one or more alarm limits;

determine correlation links between attributes of the primary asset and attributes of the at least second asset by executing at least one process simulation of the industrial system, the correlation links being used to generate an attribute map;

generate secondary information for display in a graphical user interface (GUI) in conjunction with alarm information by processing a set of attributes from the attribute map through a AI model, the secondary information being produced as an output of the AI model;

generate a display on the GUI based on the parameter of the primary asset exceeding the one or more alarm limits, the display including alarm information, asset data information, and the secondary information, the alarm information being continuously updated in the display as the current system time changes, by applying one or more system-defined rules, including grouping alarm records by alarm identifier, determining a display end time based on a comparison between a current system time and a predefined time control end time, the asset data information being displayed in a plurality of sections, each section being ranked based on importance, wherein displaying of a section during resizing of the display is dependent on the ranking of the section.

15. The system of claim 14, wherein the determining the importance ranking for each of the plurality of sections is based at least in part on analysis performed by the system; and wherein the importance ranking and the analysis can differ for different asset alarms.

16. The system of claim 14, wherein the determining which section to keep on the display and which section to hide upon a resizing of the display is based at least in part on an analysis performed by the system; and wherein the determining which section to keep on the display and which section to hide upon a resizing of the display can differ for different asset alarms.

17. The system of claim 14, wherein the determining which section to keep on the display and which section to hide upon a resizing of the display comprising the system displaying at least one of a new graph and/or chart representing at least a portion of the asset data information in the kept section.

18. The system of claim 14, wherein the determining which section to keep on the display and which section to hide upon a resizing of the display comprising the system displaying at least one of a new graph and/or chart representing at least a portion of the asset data information in the hidden section.

19. The system of claim 14, wherein the determining which section to keep on the display and which section to hide upon a resizing of the display is based on one or more links between one or more attributes of the primary asset and one or more attributes of second asset; and wherein one or more links comprise at least one of correlation analysis and/or a manual link.

* * * * *